(12) United States Patent
Isoda et al.

(10) Patent No.: US 6,806,486 B2
(45) Date of Patent: Oct. 19, 2004

(54) RADIATION IMAGE READ-OUT METHOD AND APPARATUS

(75) Inventors: Yuji Isoda, Kanagawa-ken (JP); Sumihiro Nishihata, Kanagawa-ken (JP); Satoshi Arakawa, Kanagawa-ken (JP); Kenji Takahashi, Kanagawa-ken (JP); Ichirou Miyagawa, Kanagawa-ken (JP); Katsuhiro Kohda, Kanagawa-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/885,069

(22) Filed: Jun. 21, 2001

(65) Prior Publication Data

US 2001/0032944 A1 Oct. 25, 2001

Related U.S. Application Data

(62) Division of application No. 09/329,320, filed on Jun. 10, 1999, now Pat. No. 6,326,636.

(30) Foreign Application Priority Data

| Jun. 10, 1998 | (JP) | .......................................... 10-162311 |
| Jun. 12, 1998 | (JP) | .......................................... 10-164572 |
| Jun. 15, 1998 | (JP) | .......................................... 10-167012 |
| Jun. 22, 1998 | (JP) | .......................................... 10-174521 |
| Jul. 13, 1998 | (JP) | .......................................... 10-197408 |
| Jul. 24, 1998 | (JP) | .......................................... 10-209479 |
| Mar. 29, 1999 | (JP) | .......................................... 11-087285 |
| Mar. 29, 1999 | (JP) | .......................................... 11-087286 |

(51) Int. Cl.$^7$ .............................................. G03B 42/02

(52) U.S. Cl. ..................... 250/586; 250/585; 250/584

(58) Field of Search .............................. 250/586, 584, 250/585, 484.4; 313/504

(56) References Cited

U.S. PATENT DOCUMENTS

| 4,535,238 | A | * | 8/1985 | Takahashi et al. | .......... 250/585 |
| 4,752,557 | A | | 6/1988 | Tsuchino et al. | ........... 430/496 |
| 4,767,927 | A | * | 8/1988 | Ohyama et al. | ............ 250/585 |
| 4,816,679 | A | | 3/1989 | Sunagawa et al. | .......... 250/585 |
| 4,831,626 | A | * | 5/1989 | Watanabe et al. | ......... 372/29.02 |
| 4,883,961 | A | * | 11/1989 | Arakawa et al. | ............ 250/584 |
| 4,914,294 | A | * | 4/1990 | Fukai et al. | ................. 250/585 |
| 4,922,103 | A | | 5/1990 | Kawajiri et al. | ............ 250/586 |
| 5,028,783 | A | * | 7/1991 | Arakawa | ..................... 250/587 |
| 5,038,037 | A | * | 8/1991 | Saotome | ..................... 250/583 |
| 5,371,377 | A | * | 12/1994 | Struye et al. | ................ 250/588 |
| 5,427,858 | A | * | 6/1995 | Nakamura et al. | .......... 428/421 |

(List continued on next page.)

FOREIGN PATENT DOCUMENTS

| JP | 62-36599 | 2/1987 | ............ G21K/4/00 |
| JP | 1-101540 | 4/1989 | ........... G03B/42/02 |
| JP | 2-129600 | 5/1990 | ............ G21K/4/00 |

*Primary Examiner*—David V. Bruce
*Assistant Examiner*—Irakli Kiknadze
(74) *Attorney, Agent, or Firm*—Sughrue Mion, PLLC

(57) ABSTRACT

Stimulating rays produced by a line light source are linearly irradiated onto an area of a stimulable phosphor sheet, on which a radiation image has been stored, the stimulating rays causing the sheet to emit light in proportion to an amount of energy stored thereon during its exposure to radiation. Light emitted from the exposed linear area of the sheet is received with a line sensor comprising photoelectric conversion devices arrayed along each of a length direction of the linear area of the stimulable phosphor sheet and a direction normal to the length direction. The sheet is moved with respect to the line light source and the line sensor and in a direction different from the length direction of the linear area of the sheet. Operation processing is performed on outputs of the photoelectric conversion devices, which outputs have been obtained at respective positions of movement and correspond to an identical site on the sheet.

32 Claims, 42 Drawing Sheets

U.S. PATENT DOCUMENTS

| | | | | |
|---|---|---|---|---|
| 5,483,081 A | * | 1/1996 | Hosoi | 250/585 |
| 5,591,982 A | * | 1/1997 | Kohda | 250/484.4 |
| 5,602,402 A | * | 2/1997 | Yasuda | 250/587 |
| 5,661,306 A | * | 8/1997 | Arakawa | 250/484.4 |
| 5,747,825 A | * | 5/1998 | Gilblom et al. | 250/586 |
| 5,877,508 A | * | 3/1999 | Arakawa et al. | 250/588 |
| 5,880,476 A | * | 3/1999 | Suzuki | 250/484.4 |
| 5,949,532 A | * | 9/1999 | Schrof et al. | 356/73 |
| 5,965,897 A | * | 10/1999 | Elkind et al. | 250/585 |
| 6,072,855 A | * | 6/2000 | Arakawa | 378/98.11 |
| 6,075,250 A | * | 6/2000 | Fukui et al. | 250/484.4 |
| 6,204,495 B1 | * | 3/2001 | Iwabuchi | 250/208.1 |
| 6,239,448 B1 | * | 5/2001 | Kawai | 250/586 |
| 6,310,357 B1 | * | 10/2001 | Fuchs et al. | 250/587 |
| 6,313,477 B1 | * | 11/2001 | Yasuda et al. | 250/587 |
| 6,392,249 B1 | * | 5/2002 | Struye et al. | 250/585 |

* cited by examiner

→ IMAGE PROCESSING UNIT

SECT. I-I

FIG. 2
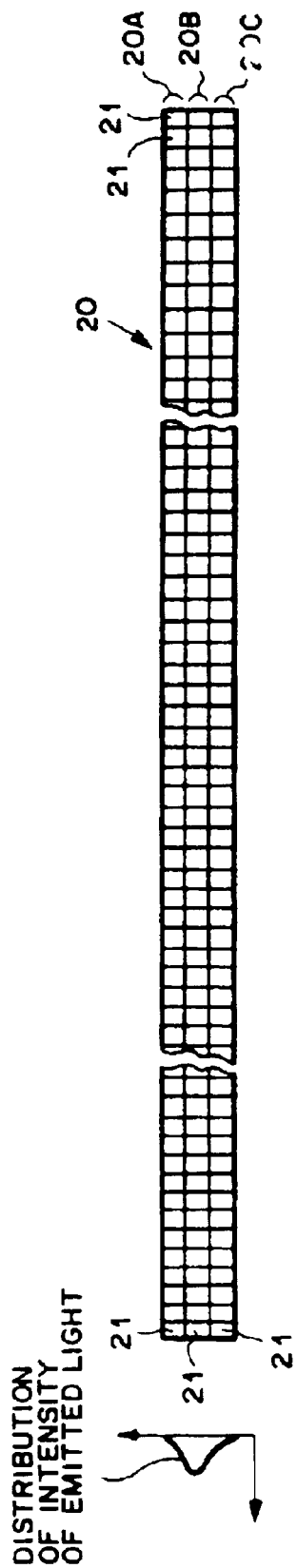
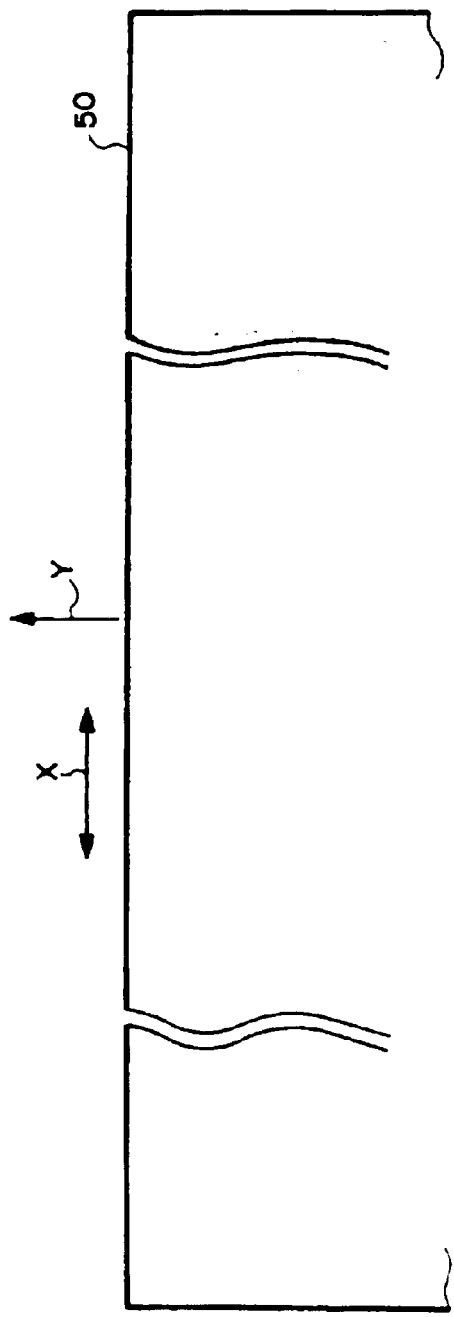

F I G. 4A
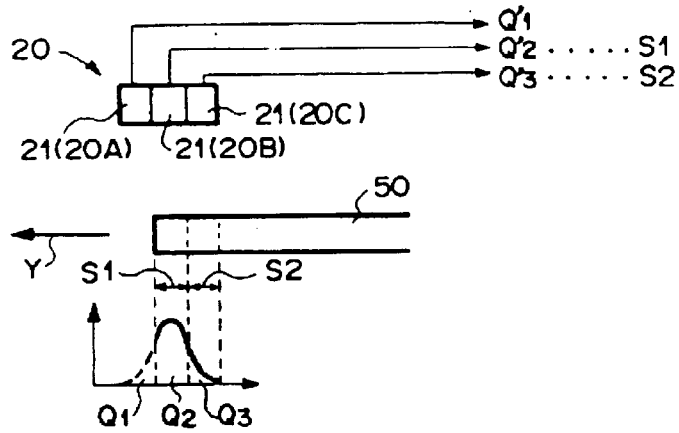
F I G. 4B
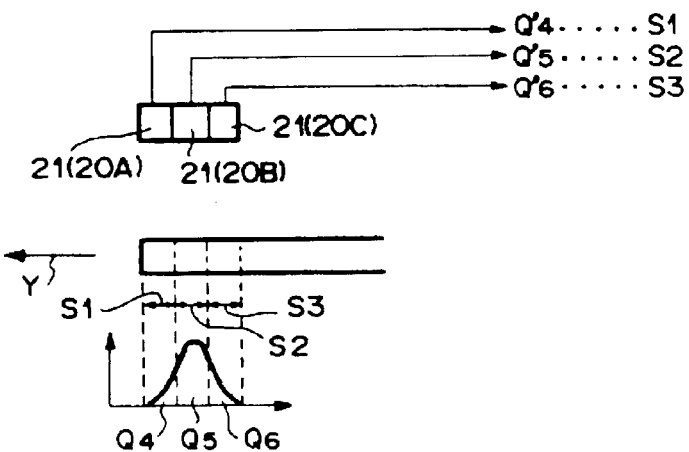
F I G. 4C
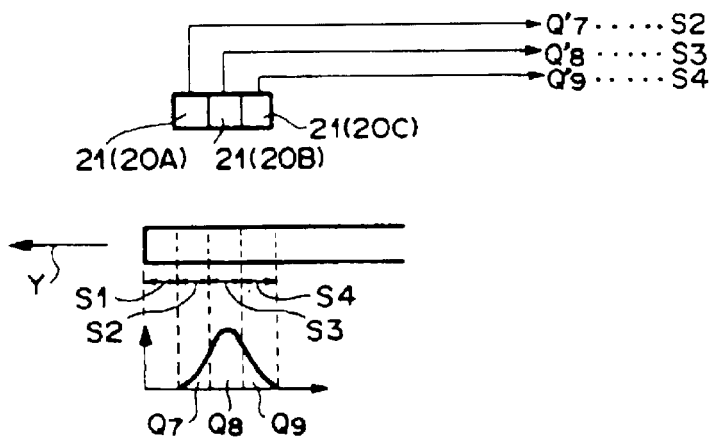

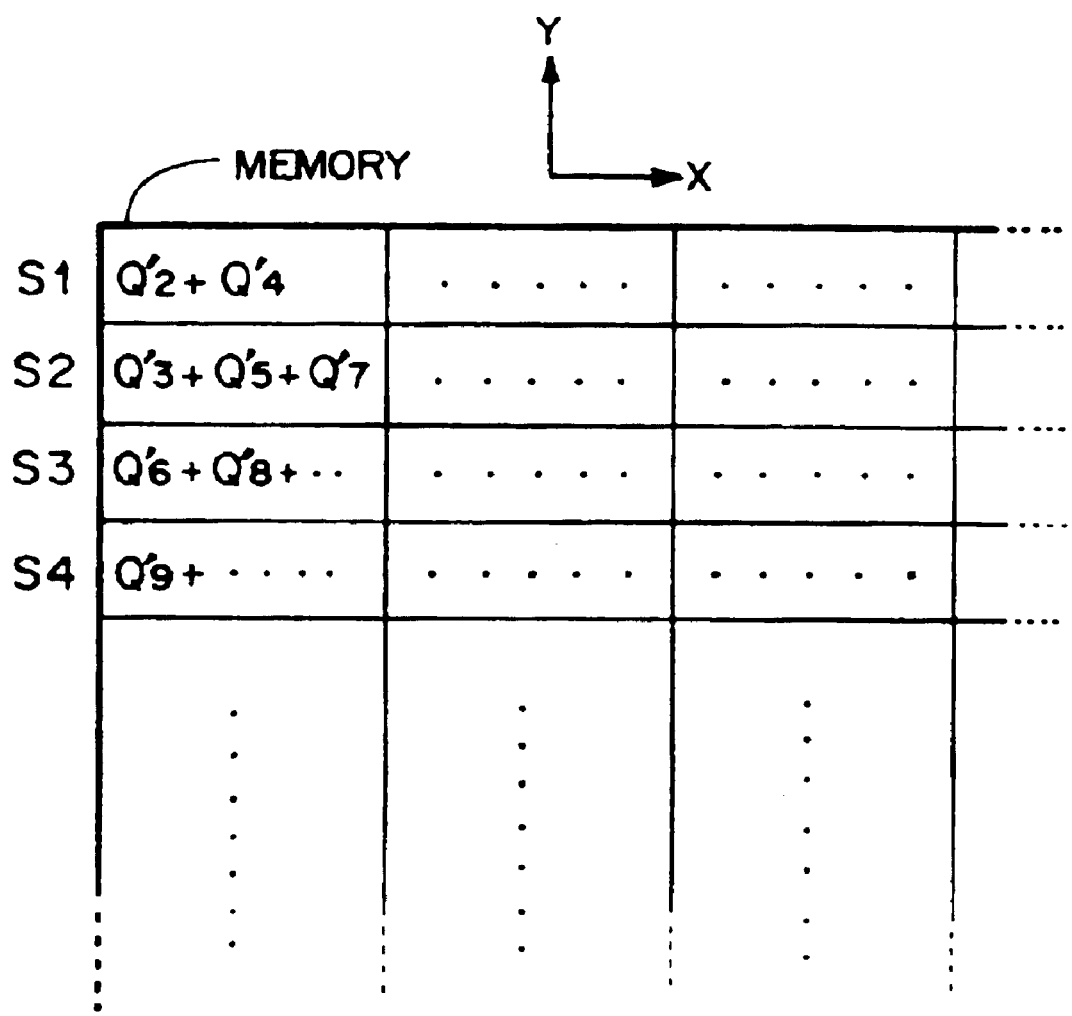

F I G. 7A
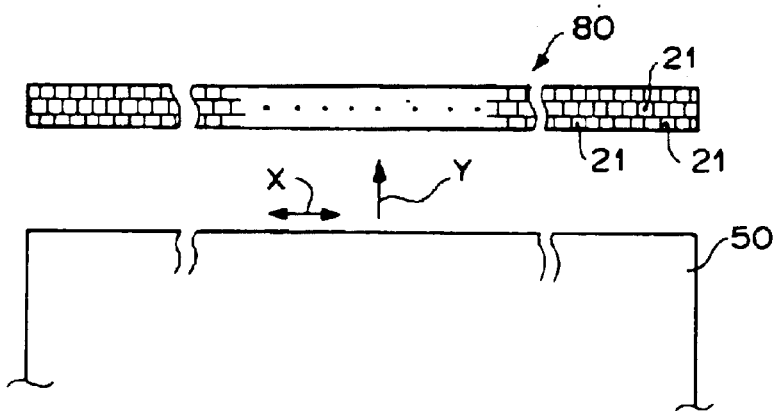
F I G. 7B
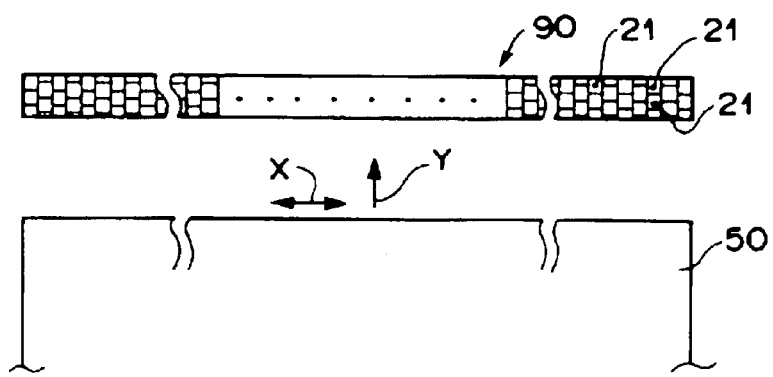
F I G. 8
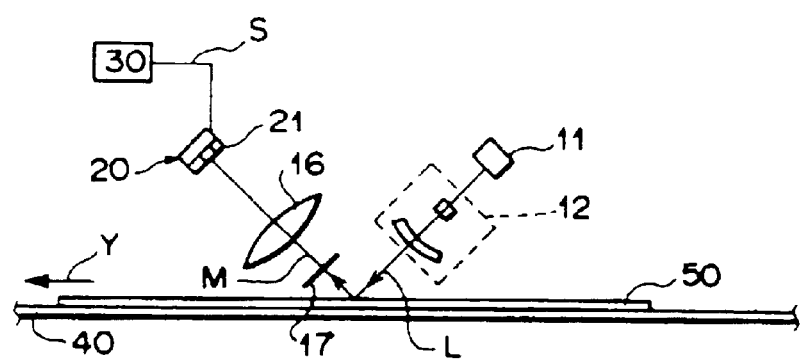

FIG.10A
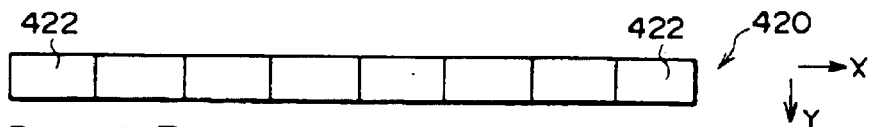
FIG.10B
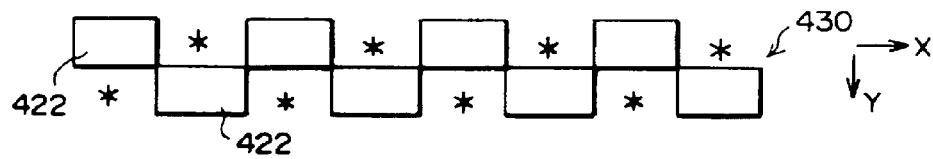
FIG.10C
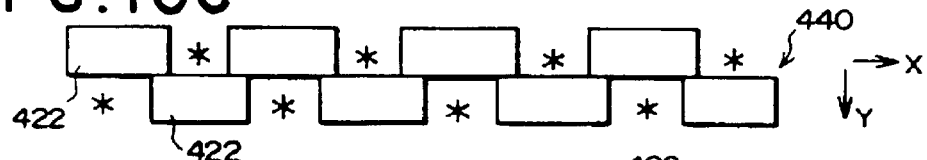
FIG.10D
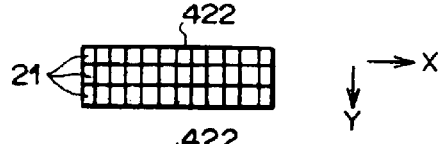
FIG.10E
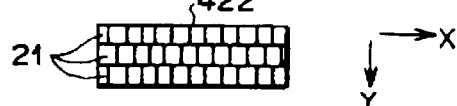
FIG.10F
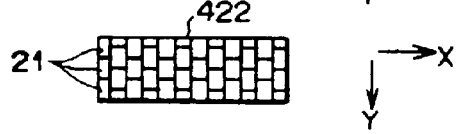
FIG.10G      FIG.10H      FIG.10I
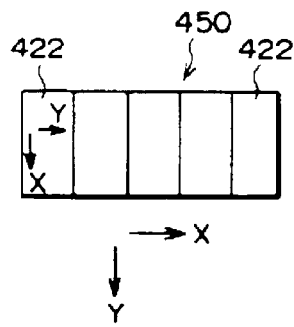 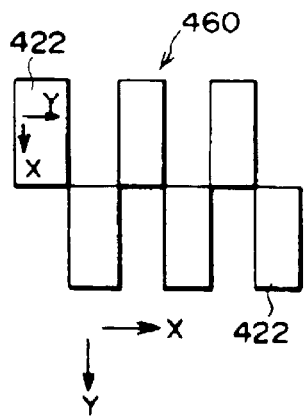 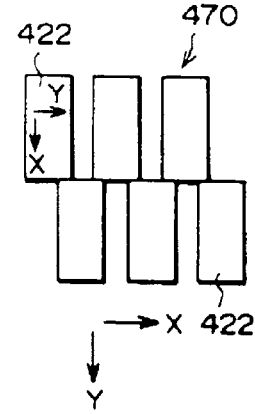

SECT. I-I

F I G . 13
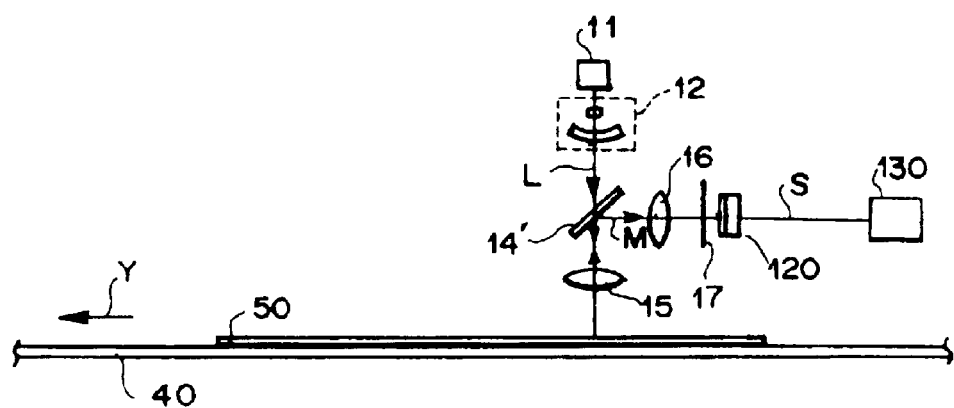

SECT. I-I

SECT. II-II

SECT. II-II

F I G. 18A
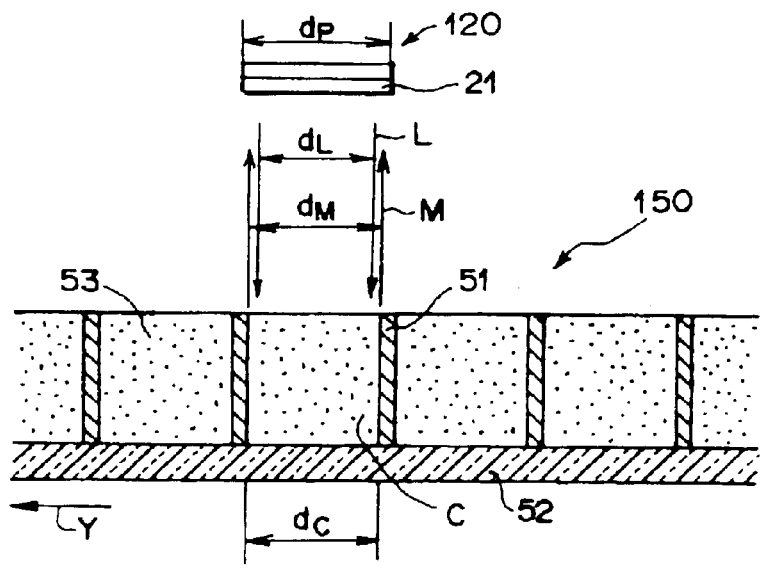
F I G. 18B
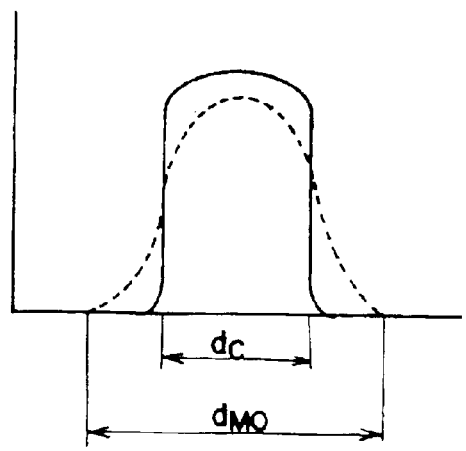

F I G. 22
|  | MEMORY | | |
|---|---|---|---|
| C1 | $Q'_1 + Q'_3$ | ..... | ..... |
| C2 | $Q'_2 + Q'_4 + Q'_6$ | ..... | ..... |
| C3 | $Q'_5 + Q'_7 + ..$ | ..... | ..... |
| C4 | $Q'_8 + ....$ | ..... | ..... |
F I G. 23
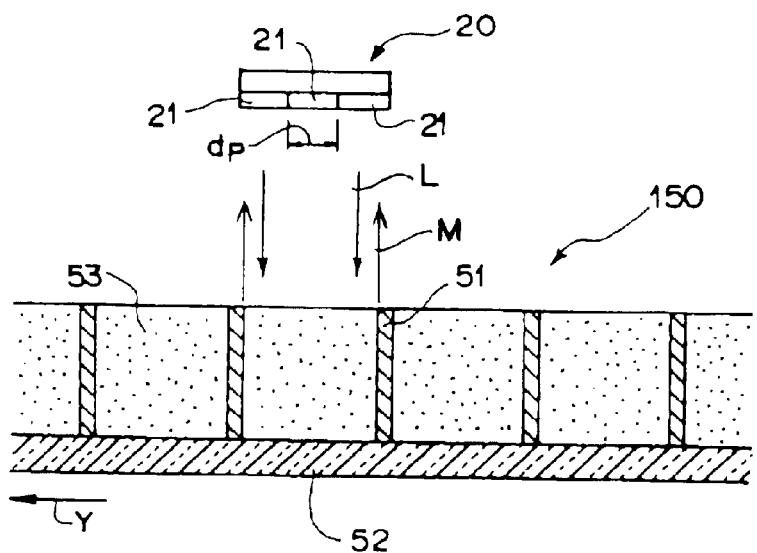

F I G. 25
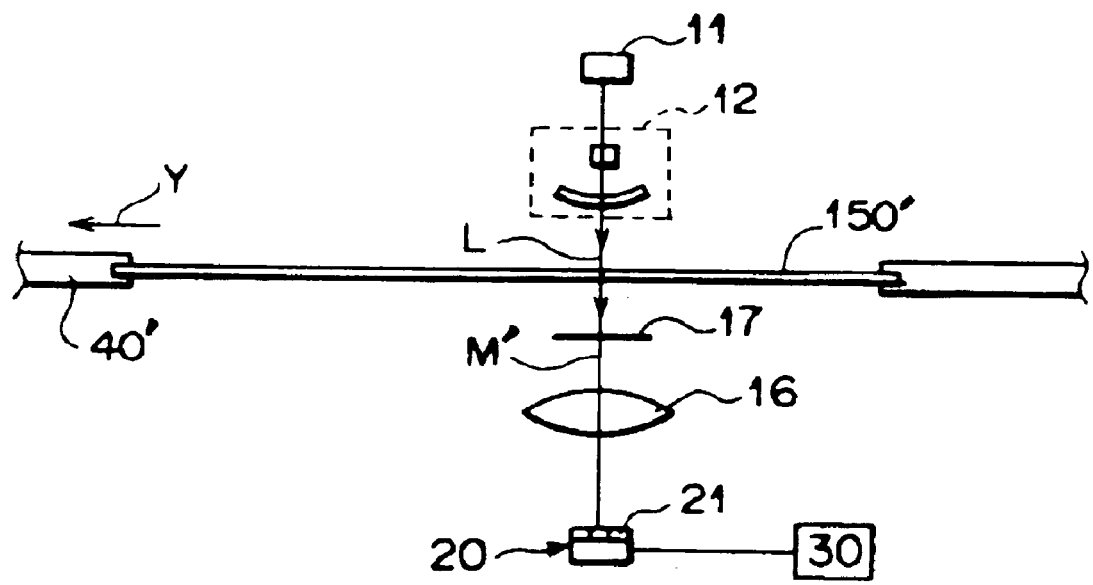

F I G. 26A
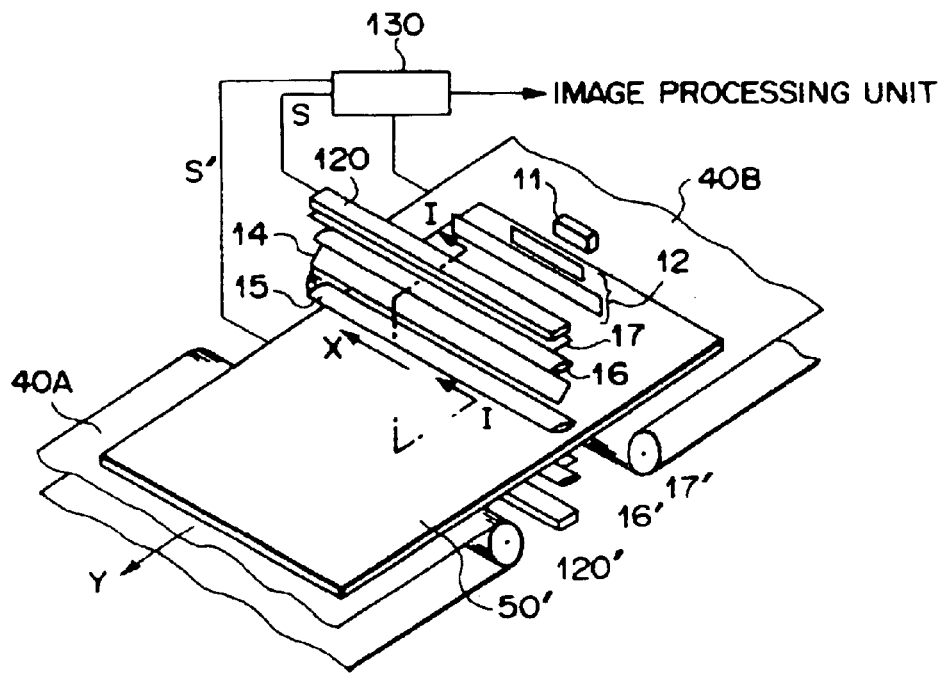
F I G. 26B
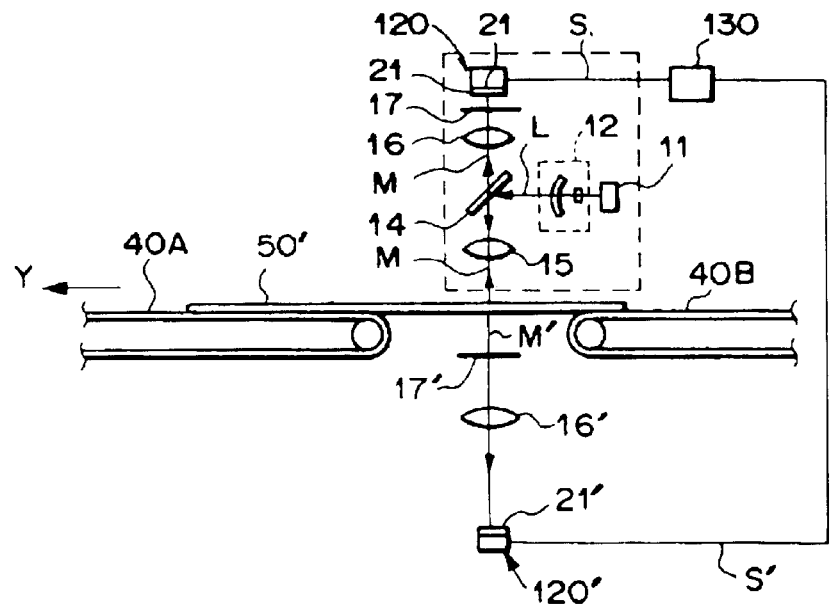

F I G. 35
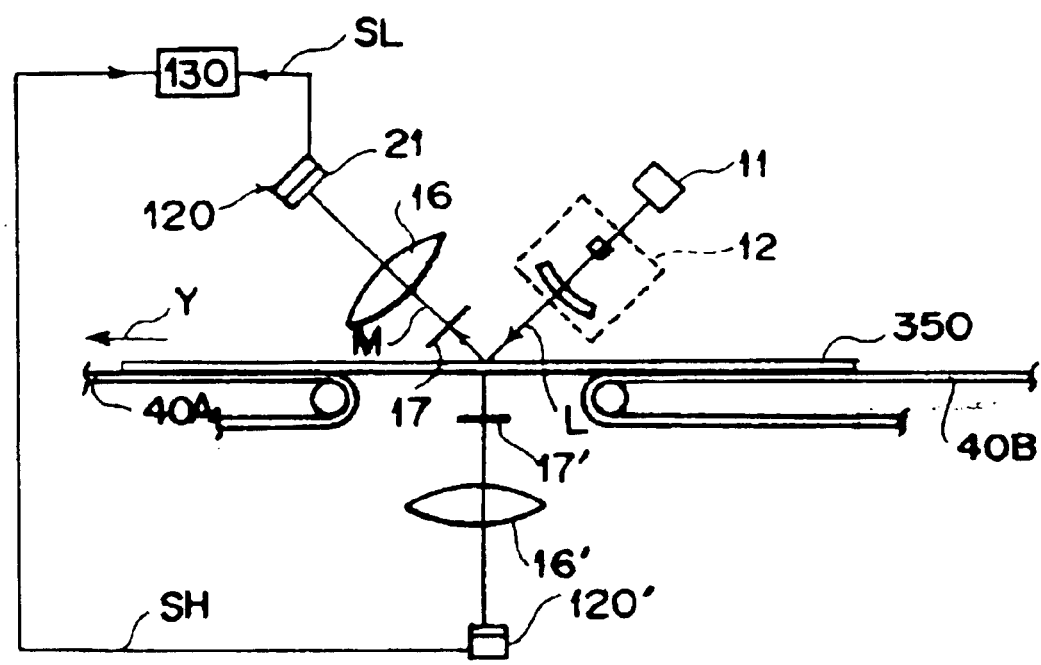

SECT. II-II

SECT. II-II

F I G. 40A
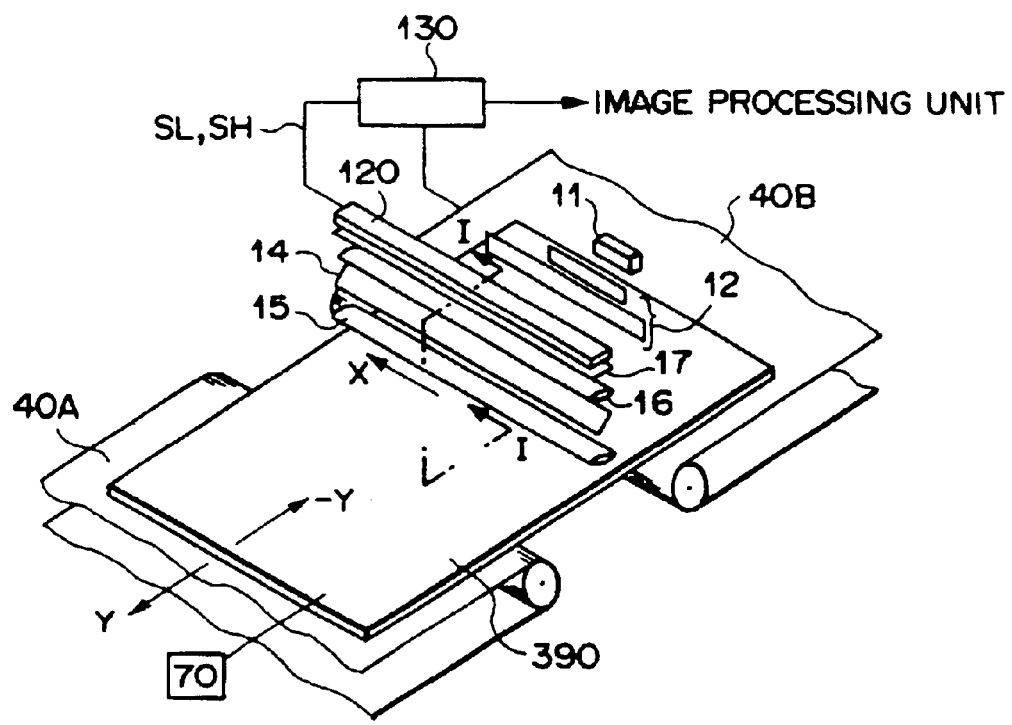
F I G. 40B
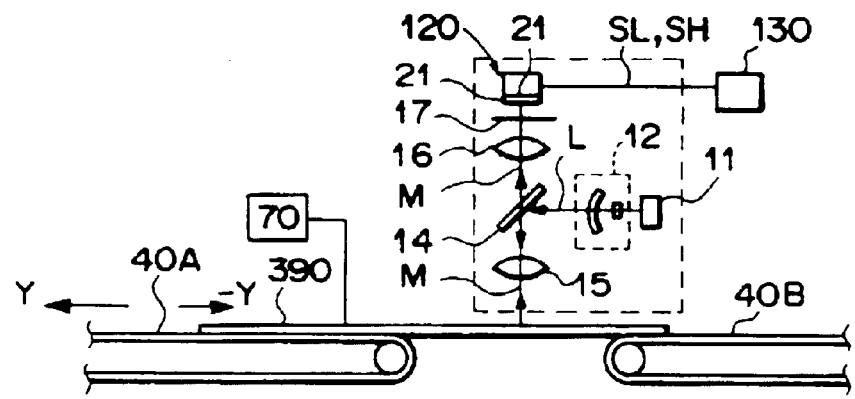

F I G. 41
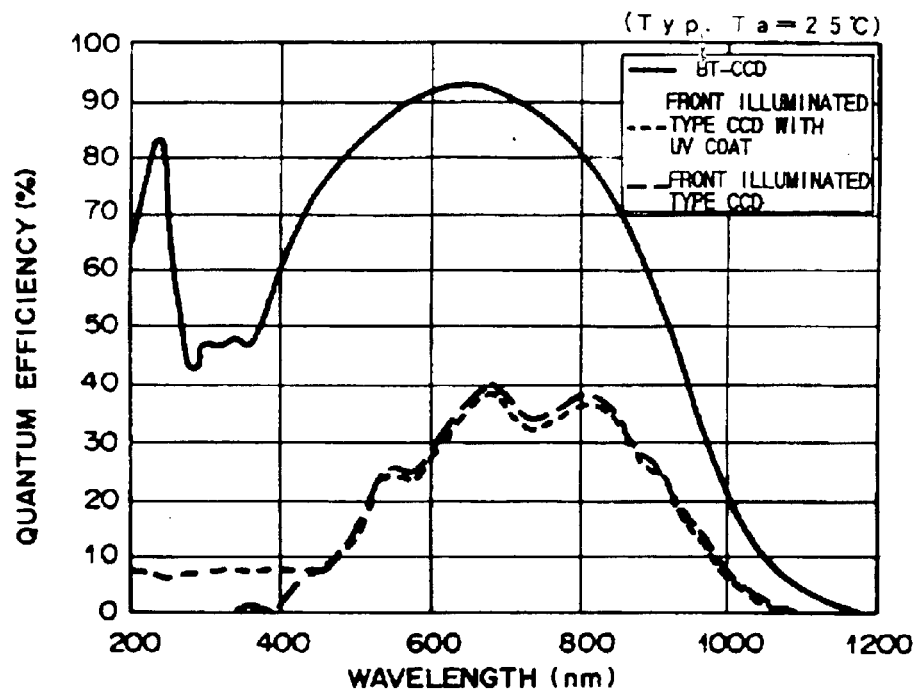
F I G. 42
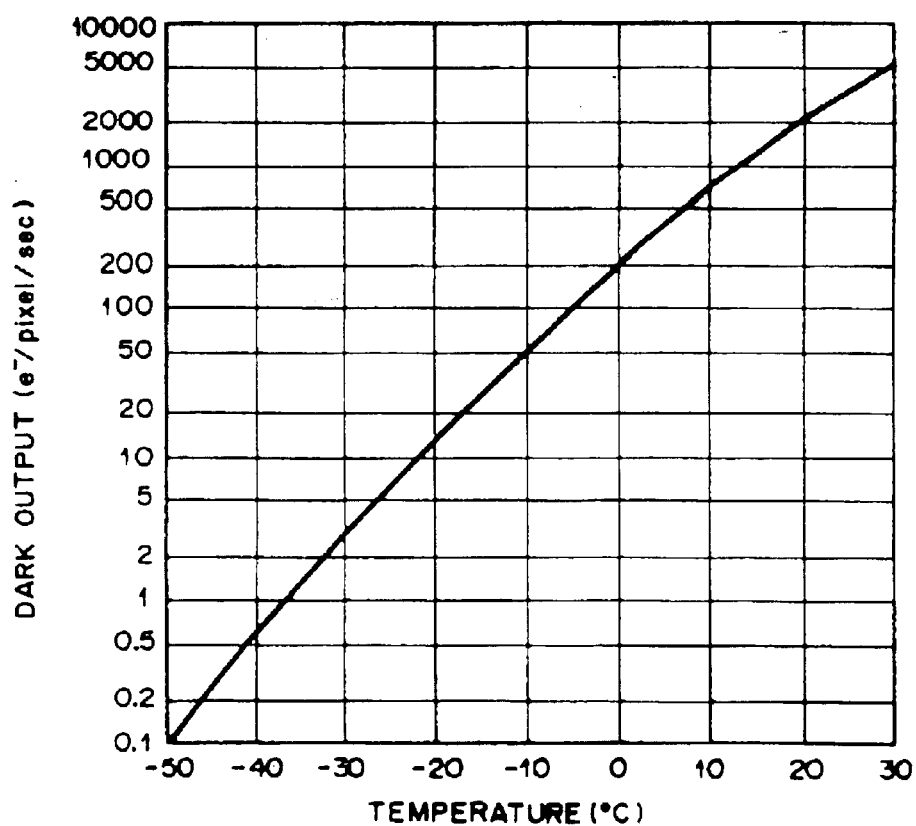

FIG. 43A
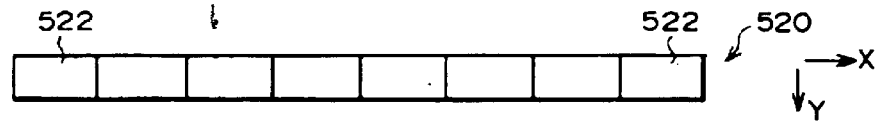
FIG. 43B
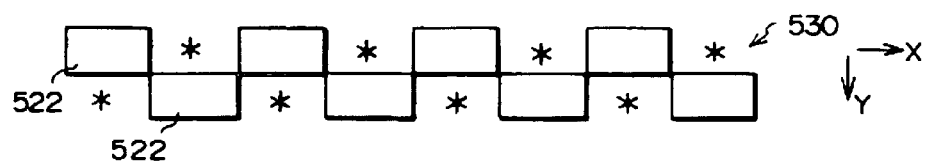
FIG. 43C
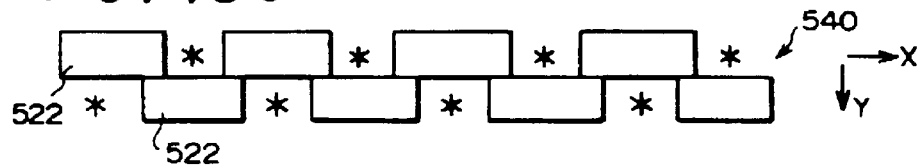
FIG. 43D
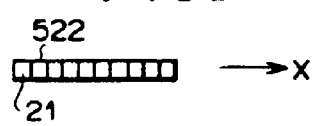
FIG. 43E
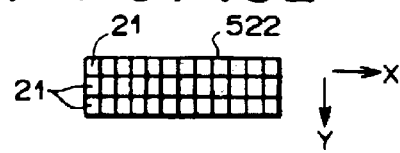
FIG. 43F
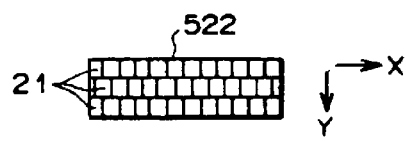
FIG. 43G
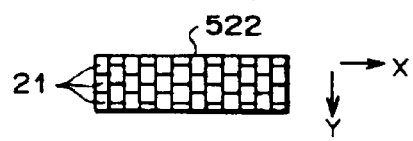
FIG. 43H    FIG. 43I    FIG. 43J
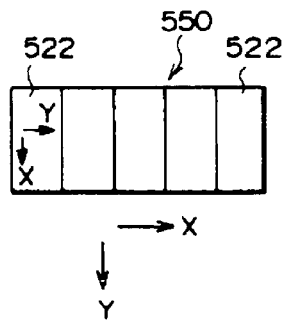 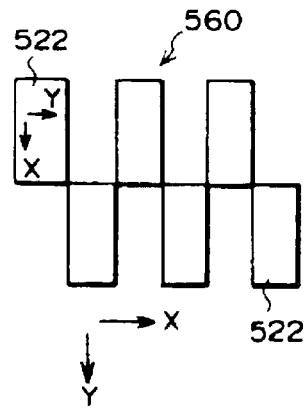 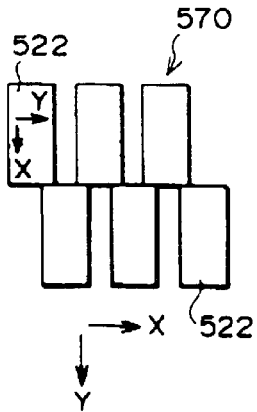

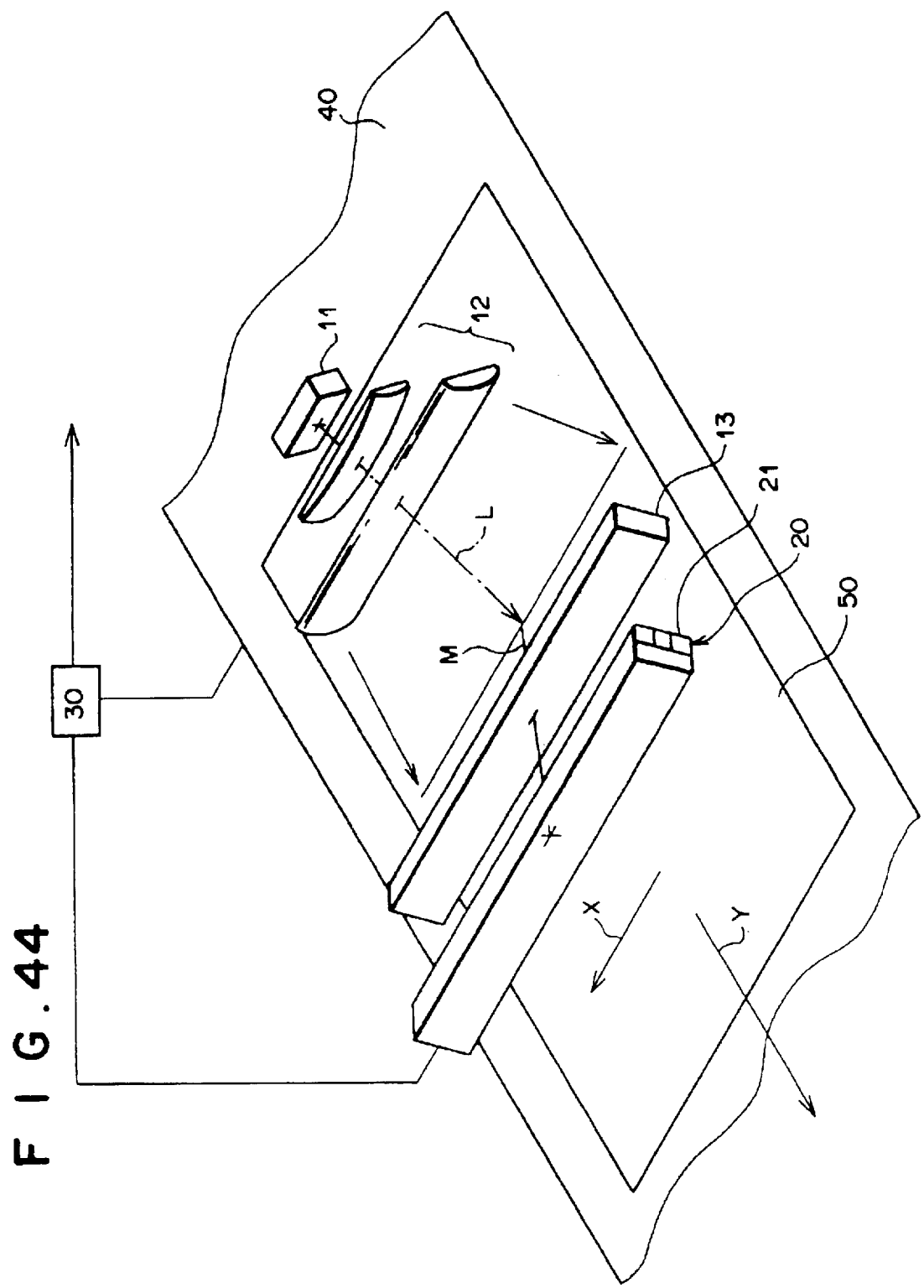

F I G. 49
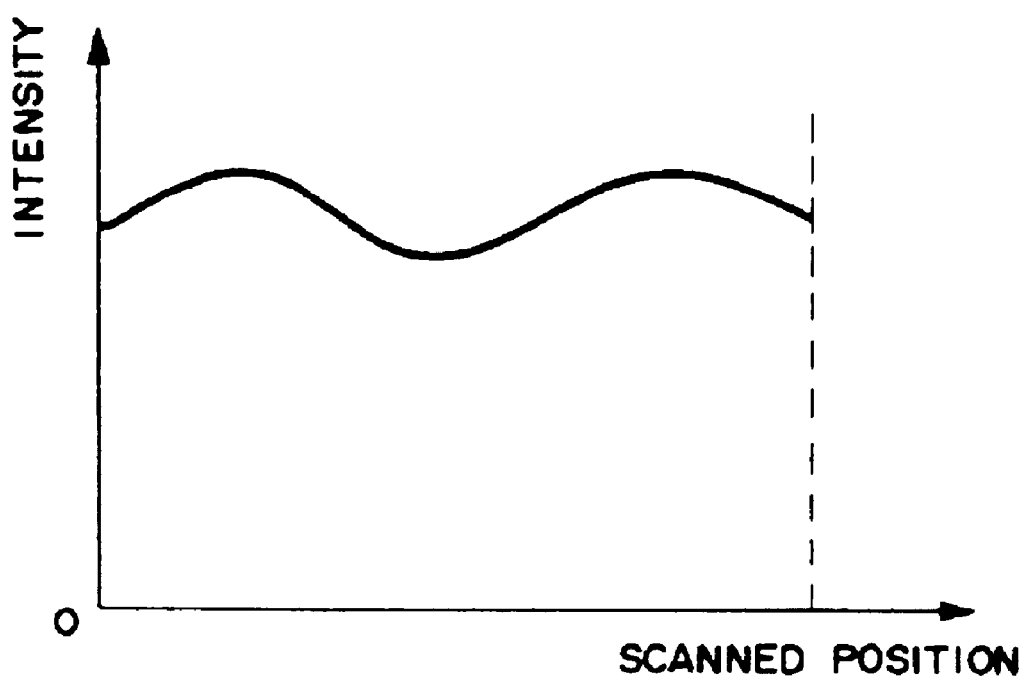

RADIATION IMAGE READ-OUT METHOD AND APPARATUS

This is a divisional of application Ser. No. 09/329,320 filed Jun. 10, 1999, U.S. Pat. No. 6,326,636 B1, the disclosure of which is incorporated herein by reference.

BACKGROUND OF THE INVENTION

1. Field of the Invention

This invention relates to a radiation image read-out method and apparatus. This invention particularly relates to a radiation image read-out method and apparatus, wherein light emitted by a stimulable phosphor sheet is detected with a line sensor or an area sensor.

2. Description of the Prior Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate Stimulating rays, such as a laser beam, are deflected and caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation-energy remaining thereon is thereby released.

The image signal, which has been obtained from the radiation image recording and reproducing systems, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis, or the like, on film or on a high resolution cathode ray tube (CRT) display device. The stimulable phosphor sheet, from which residual radiation energy has been released with the erasing light, can be used again for the recording of a radiation image.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line light source for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which the stimulating rays are irradiated by the line light source, is utilized as photoelectric read-out means. Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet.

FIGS. 6A, 6B, and 6C are explanatory views showing relationship between a line width of light emitted by a stimulable phosphor sheet and a photoelectric conversion device constituting a conventional line sensor. In FIG. 6A, a beam width (a line width) of light M emitted linearly (i.e., in a linear pattern extending along a direction normal to the plane of the sheet of FIG. 6A) by a stimulable phosphor sheet 50 is represented by $d_M$. FIGS. 6B and 6C show the distribution of the intensity of the emitted light M along the line width direction. As illustrated in FIG. 6B, in cases where the emitted light M is collected by a line sensor, in which a light receiving width $d_P$ of each photoelectric conversion device is smaller than the line width $d_M$, the light collecting efficiency cannot be kept high. Also, as illustrated in FIG. 6C, in cases where the emitted light M is collected by a line sensor, in which the light receiving width $d_P$ of each photoelectric conversion device is approximately equal to the line width $d_M$, the light collecting efficiency can be kept high. However, in such cases, since the size of each pixel is large, the problems occur in that the resolution cannot be kept high. (The same problems occur also when each photoelectric conversion device has a rectangular shape such that the length along the line width direction may be larger than the length in the direction along which the line extends.)

The emitted light M has the intensity distribution shown in FIGS. 6B and 6C since the line width of the stimulating rays L becomes large before impinging upon the stimulable phosphor sheet 50, since, as illustrated in FIGS. 3A and 3B, the stimulating rays L of a line width $d_L$ ($<d_M$) having entered into the stimulable phosphor sheet 50 are scattered in the stimulable phosphor sheet 50, and since the emitted light M having occurred in the stimulable phosphor sheet 50 is scattered in the stimulable phosphor sheet 50 before being radiated out of the surface of the stimulable phosphor sheet 50.

SUMMARY OF THE INVENTION

The primary object of the present invention is to provide a radiation image read-out method, wherein desired resolution is obtained and the efficiency, with which light emitted by a stimulable phosphor sheet is collected by a line sensor, is kept high.

Another object of the present invention is to provide a radiation image read-out method, wherein directivity of stimulating rays radiated out of a line light source is kept high, the intensity of the radiated stimulating rays is kept high, and an image having a high signal-to-noise ratio is thereby obtained.

A further object of the present invention is to provide a radiation image read-out method, which enables a radiation image read-out apparatus to be formed in a smaller outer shape than that of a conventional radiation image read-out apparatus.

A still further object of the present invention is to provide a radiation image read-out method, wherein a line light source and a line sensor are utilized and an image signal appropriate for reproduction of a visible radiation image having a high signal-to-noise ratio is capable of being obtained.

Another object of the present invention is to provide a radiation image read-out method, wherein a line light source and a line sensor are utilized and image signals for energy subtraction processing are capable of being obtained easily.

A further object of the present invention is to provide a radiation image read-out method, wherein light emitted by a stimulable phosphor sheet is detected quickly and accurately as with a photomultiplier, the efficiency with which the weak emitted light is utilized is enhanced, and an image signal appropriate for reproduction of a visible radiation image having a high signal-to-noise ratio is capable of being obtained.

The specific object of the present invention is to provide apparatuses for carrying out the radiation image read-out methods.

A first radiation image read-out method in accordance with the present invention is characterized by detecting light, which is emitted from a linear area of a stimulable phosphor sheet, with a line sensor comprising a plurality of photoelectric conversion devices arrayed along two-dimensional directions, performing operation processing on outputs of the photoelectric conversion devices, which outputs have been obtained at respective scanning positions and correspond to an identical site on the stimulable phosphor sheet, and thereby enhancing a light collecting efficiency.

Specifically, the present invention provides a first radiation image read-out method, comprising the steps of:

i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, with a line sensor comprising a plurality of photoelectric conversion devices arrayed along each of a length direction (i.e., a major axis direction) of the linear area of the stimulable phosphor sheet and a direction (i.e., a minor axis direction) normal to the length direction, the received light being subjected to photoelectric conversion performed by the line sensor, iii) moving the stimulable phosphor sheet with respect to the line light source and the line sensor and in a direction different from the length direction of the linear area of the stimulable phosphor sheet, iv) successively reading outputs of the line sensor in accordance with the movement, and v) performing operation processing on the outputs of the photoelectric conversion devices, which outputs have been obtained at respective positions of movement and correspond to an identical site on the stimulable phosphor sheet.

As the line sensor, an amorphous silicon sensor, a charge coupled device (CCD) image sensor, a CCD image sensor with back illuminator, a metal oxide semiconductor (MOS) image sensor, or the like, may be employed. The line sensor may comprise a plurality of sensor chips (CCD image sensor chips, MOS image sensor chips, or the like) arrayed in a straight line or in a zigzag pattern along the length direction of the linear area of the stimulable phosphor sheet. Each of the sensor chips may comprise a plurality of photoelectric conversion devices arrayed in two-dimensional directions and in a matrix-like pattern or in a zigzag pattern.

In the first radiation image read-out method in accordance with the present invention, as the line light source, a fluorescent lamp, a cold cathode fluorescent lamp, a light emitting diode (LED) array, or the like, may be employed. The line light source is not limited to a light source having a linear shape as in the fluorescent lamp and may be one of various other light sources, such as broad area lasers (e.g., a broad area semiconductor laser) and electroluminescence (EL) devices, which irradiate one-dimensional stimulating rays onto the surface of the stimulable phosphor sheet. The LED array or the broad area laser should preferably be employed as the line light source, and a cylindrical lens, or the like, for suppressing spread of the stimulating rays to the direction (i.e., the minor axis direction), which is normal to the length direction (i.e., the major axis direction) of the line of the stimulating rays, such that the stimulating rays having been radiated out of the light source may take on the form of the linear stimulating rays on the surface of the stimulable phosphor sheet.

The stimulating rays may be radiated continuously out of the line light source or may be pulsed stimulating rays radiated intermittently out of the line light source. From the point of view of reducing noise, the stimulating rays should preferably be pulsed stimulating rays having high intensity.

The length of the irradiation region of the stimulating rays, which have been radiated out of the line light source, on the stimulable phosphor sheet, the length being taken along the major axis direction, should preferably be equal to or longer than the length of one side of an effective image storing region of the stimulable phosphor sheet. In cases where the length of the irradiation region of the stimulating rays on the stimulable phosphor sheet is longer than the length of one side of the effective image storing region of the stimulable phosphor sheet, the stimulating rays may be irradiated from an oblique angle with respect to the side of the effective image storing region of the stimulable phosphor sheet.

In order for the degree of convergence of the stimulating rays, which have been radiated out of the line light source, on the stimulable phosphor sheet to be enhanced, the aforesaid cylindrical lens, a slit, a SELFOC lens (rod lens) array, a fluorescent light guiding sheet, an optical fiber bundle, or the like, or a combination of two or more of the above-enumerated elements should preferably be located between the line light source and the stimulable phosphor sheet. In cases where the optimum secondary stimulation wavelength for the stimulable phosphor sheet is approximately 600 nm, the fluorescent light guiding sheet should preferably contain $Eu^{3+}$ (luminescence center) as an activator of a fluorescent substance and should preferably be constituted of a glass or polymeric medium.

The beam width of the stimulating rays, which have been radiated out of the line light source, on the stimulable phosphor sheet should preferably fall within the range of 10 $\mu$m to 4,000 $\mu$m.

In order for the degree of convergence of the light, which is emitted from respective areas of the stimulable phosphor sheet, on the line sensor to be enhanced, a distributed index lens array, such as a SELFOC lens array or a rod lens array, constituted of an image forming system in which an object surface and an image surface correspond to each other in one-to-one relationship, a cylindrical lens, a slit, an optical fiber bundle, or the like, or a combination of two or more of the above-enumerated elements should preferably be located between the stimulable phosphor sheet and the line sensor.

A stimulating ray cut-off filter (a sharp cut-off filter or a band-pass filter) for transmitting only the light emitted by the stimulable phosphor sheet and filtering out the stimulating rays should preferably be located in the optical path of the emitted light between the stimulable phosphor sheet and the line sensor. In this manner, the stimulating rays should preferably be prevented from impinging upon the line sensor.

The size of a light receiving surface of each of the photoelectric conversion devices constituting the line sensor is set to be smaller than the beam width of the light, which is emitted by the stimulable phosphor sheet exposed to the stimulating rays having the beam width described above, on the light receiving surface of the line sensor. A plurality of the photoelectric conversion devices are arrayed along each of the length direction (i.e., the major axis direction) of the beam of the emitted light and the beam width direction (i.e., the minor axis direction). The length of the entire line sensor is set to be approximately equal to or longer than the length of the beam of the emitted light, and the width of the entire line sensor is set to be approximately equal to the beam width of the emitted light. The plurality of the photoelectric conversion devices may be arrayed in a matrix-like pattern such that they may stand in a straight line along each of the major axis direction and the minor axis direction. Alternatively, the photoelectric conversion devices may be arrayed such that they may stand in a straight line along the major axis direction and in a zigzag pattern along the minor axis direction. As another alternative, the photoelectric conversion devices may be arrayed such that they may stand in a straight line along the minor axis direction and in a zigzag pattern along the major axis direction. As a further alternative, the photoelectric conversion devices may be arrayed such that they may stand in a zigzag pattern along each of the major axis direction and the minor axis direction.

In cases where the line sensor is constituted of a large number of photoelectric conversion devices and there is the risk that adverse effects will occur with respect to a transfer rate, memory devices corresponding to the respective photoelectric conversion devices may be utilized, and an electric charge having been accumulated in each of the photoelectric conversion devices during a charge accumulation period may be stored in the corresponding memory device. In the next charge accumulation period, the electric charge may be read from each memory device. In this manner, the charge accumulation time may be prevented from becoming short due to an increase in the charge transfer time.

The number of the photoelectric conversion devices arrayed in each row along the major axis direction of the line sensor should preferably be at least 1,000. The length of the line sensor, as measured at the light receiving surface, should preferably be longer than or equal to the length of one side of the effective image storing region of the stimulable phosphor sheet.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

The term "position of movement" as used herein means the position at the time at which the photoelectric detection is performed by the line sensor and does not mean the position through which the stimulable phosphor sheet or the line light source and the line sensor pass at any given instant during the movement.

The direction along which the stimulable phosphor sheet is moved with respect to the line light source and the line sensor (i.e., the direction different from the length direction of the exposed linear area of the stimulable phosphor sheet) should preferably be the direction approximately normal to the length direction of the exposed linear area of the stimulable phosphor sheet (i.e., should preferably be the minor axis direction). However, the direction along which the stimulable phosphor sheet is moved with respect to the line light source and the line sensor is not limited to the minor axis direction. For example, in cases where the lengths of the line light source and the line sensor are longer than one side of the stimulable phosphor sheet as described above, the stimulable phosphor sheet may be moved with respect to the line light source and the line sensor along an oblique direction with respect to the direction approximately normal to the length direction of the line light source and the line sensor or along a zigzag movement direction, such that approximately the entire surface of the stimulable phosphor sheet may be uniformly exposed to the stimulating rays.

The line light source and the line sensor may be located on the same surface side of the stimulable phosphor sheet or on opposite surface sides of the stimulable phosphor sheet. In cases where the line light source and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

The operation processing may be simple addition processing, weighted addition processing, or one of various other kinds of operation processing. In cases where the simple addition processing or the weighted addition processing is employed, addition means may be utilized as means for performing the operation processing.

Unless otherwise specified, the foregoing explanation of the first radiation image read-out method in accordance with the present invention also applies to various other radiation image read-out methods in accordance with the present invention, which will be described later.

A second radiation image read-out method in accordance with the present invention is characterized by reading out a radiation image, which has been stored on a stimulable phosphor sheet, by irradiating a linear laser beam, which has been radiated out of a broad area laser, onto the stimulable phosphor sheet.

Specifically, the present invention also provides a second radiation image read-out method, comprising the steps of:

i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, with a line sensor comprising a plurality of arrayed photoelectric conversion devices, the received light being subjected to photoelectric conversion performed by the line sensor, iii) moving the stimulable phosphor sheet with respect to the line light source and the line sensor and in a direction different from a length direction of the linear area of the stimulable phosphor sheet, and iv) successively reading outputs of the photoelectric conversion devices of the line sensor in accordance with the movement, wherein the line light source is a broad area laser, which linearly radiates out the stimulating rays.

In the second radiation image read-out method in accordance with the present invention, the laser beam (i.e., the stimulating rays) may be radiated continuously out of the broad area laser or may be a pulsed beam radiated intermittently out of the broad area laser. From the point of view of reducing noise, the laser beam should preferably be a pulsed beam having high intensity. The wavelength of the laser beam produced by the broad area laser may fall within the range of 600 nm to 1,000 nm and should preferably fall within the range of 600 nm to 700 nm.

The length of the irradiation region of the laser beam, which has been radiated out of the broad area laser, on the stimulable phosphor sheet, the length being taken along the major axis direction, should preferably be equal to or longer than the length of one side of the effective image storing region of the stimulable phosphor sheet. In cases where the length of the irradiation region of the laser beam on the stimulable phosphor sheet is longer than the length of one side of the effective image storing region of the stimulable phosphor sheet, the laser beam may be irradiated from an oblique angle with respect to the side of the effective image storing region of the stimulable phosphor sheet.

The term "broad area laser" as used herein means the laser which produces the laser beam in the linear pattern. The broad area laser should preferably be a broad area semiconductor laser constituted such that the length of the active layer along the major axis direction may fall within the range of 50 $\mu$m to 1,000 $\mu$m and the length of the active layer along the minor axis direction may fall within the range of 0.1 $\mu$m to 10 $\mu$m. However, the broad area laser employed in the second radiation image read-out method in accordance with the present invention is not limited to the broad area semiconductor laser and may be one of various other lasers which produces the laser beam in the linear pattern.

The line sensor employed in the second radiation image read-out method in accordance with the present invention may comprise the plurality of the photoelectric conversion devices arrayed along only the length direction (i.e., the major axis direction). Alternatively, as in the first radiation image read-out method in accordance with the present invention, the line sensor may comprise the plurality of the photoelectric conversion devices arrayed along each of the major axis direction and the minor axis direction, which is normal to the major axis direction.

In the second radiation image read-out method in accordance with the present invention, as in the first radiation image read-out method in accordance with the present invention, the line sensor may comprise the plurality of the photoelectric conversion devices arrayed along each of the major axis direction of the linear area of the stimulable phosphor sheet and the minor axis direction normal to the major axis direction, and the operation processing may be performed on the outputs of the photoelectric conversion devices, which outputs have been obtained at respective positions of movement and correspond to an identical site on the stimulable phosphor sheet. In such cases, if the beam width of the light emitted by the stimulable phosphor sheet is larger than the width of each photoelectric conversion device, the line sensor as a whole can receive the emitted light over approximately the entire beam width. The operation processing, such as addition processing, is performed on the outputs of the photoelectric conversion devices, which outputs correspond to an identical site on the stimulable phosphor sheet. In this manner, the light receiving efficiency can be enhanced.

The number of the photoelectric conversion devices arrayed along the major axis direction of the line sensor should preferably be at least 1,000. The length of the line sensor, as measured at the light receiving surface, should preferably be longer than or equal to the length of one side of the effective image storing region of the stimulable phosphor sheet. In cases where the length of the light receiving surface of the line sensor is longer than the length of one side of the effective image storing region of the stimulable phosphor sheet, the line sensor may be located obliquely with respect to the side of the effective image storing region of the stimulable phosphor sheet.

The broad area laser and the line sensor may be located on the same surface side of the stimulable phosphor sheet or on opposite surface sides of the stimulable phosphor sheet. In cases where the broad are a laser and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

The stimulating rays irradiated to the stimulable phosphor sheet should preferably have an intensity falling within a range such that the power may not vary. In cases where the stimulating rays has an intensity falling within a range such that the power may vary, the intensity of the stimulating rays may be monitored with a monitoring means. When variation in power occurs, the broad area laser may be modulated with broad area laser modulating means more quickly than the photoelectric conversion speed of the photoelectric conversion devices such that the power of the broad area laser may become equal to a predetermined value. In this manner, adverse effects of power variation may be suppressed.

Third and fourth radiation image read-out methods in accordance with the present invention are characterized by overlapping part of an optical path of stimulating rays from a line light source to a stimulable phosphor sheet and part of an optical path of emitted light from the stimulable phosphor sheet to a line sensor, thereby reducing the space occupied by the optical paths and reducing the size of an entire radiation image read-out apparatus.

Specifically, the present invention further provides a third radiation image read-out method, comprising the steps of:

i) linearly radiating stimulating rays, which have been produced by a line light source, ii) guiding the linear stimulating rays to an area of a stimulable phosphor sheet, on which a radiation image has been stored, with stimulating ray guiding means, the stimulating rays causing the stimulable phosphor sheet to emit light in proportion to an amount of energy stored thereon during its exposure to radiation, iii) guiding light, which is emitted from the linear area of the stimulable phosphor sheet exposed to the linear stimulating rays, with emitted light guiding means to a line sensor comprising a plurality of photoelectric conversion devices arrayed along a length direction of the linear area of the stimulable phosphor sheet, iv) receiving the emitted light with the line sensor, the received light being subjected to photoelectric conversion performed by the line sensor, v) moving the stimulable phosphor sheet with respect to the line light source and the line sensor and in a direction different from the length direction of the linear area of the stimulable phosphor sheet, and vi) successively reading outputs of the line sensor in accordance with the movement, wherein at least part of an optical path of the stimulating rays from the line light source to the stimulable phosphor sheet and at least part of an optical path of the emitted light from the stimulable phosphor sheet to the line sensor overlap each other.

The term "overlapping of optical paths" as used herein means that the center point of the stimulating rays and the center point of the emitted light overlap each other.

The overlapping of at least part of the optical path of the stimulating rays and at least part of the optical path of the emitted light should preferably be achieved by utilizing at least part of optical elements, which constitute the stimulating ray guiding means, and at least part of optical elements, which constitute the emitted light guiding means, in common with each other.

As the stimulating ray guiding means, the aforesaid cylindrical lens, the slit, the SELFOC lens (rod lens) array, the aforesaid fluorescent light guiding sheet, the optical fiber bundle, a hot mirror, a cold mirror, or the like, or a combination of two or more of the above-enumerated elements may be employed.

The hot mirror is a dichroic mirror having been set so as to reflect the stimulating rays and to transmit the light emitted by the stimulable phosphor sheet. The cold mirror is a dichroic mirror having been set so as to transmit the stimulating rays and to reflect the light emitted by the stimulable phosphor sheet.

As the emitted light guiding means, the distributed index lens array, such as the SELFOC lens array or the rod lens array, constituted of an image forming system in which an object surface and an image surface correspond to each other in one-to-one relationship, the cylindrical lens, the slit, the optical fiber bundle; the hot mirror, the cold mirror, or the like, or a combination of two or more of the above-enumerated elements may be employed.

The stimulating ray cut-off filter (the sharp cut-off filter or the band-pass filter) for transmitting only the light emitted by the stimulable phosphor sheet and filtering out the stimulating rays should preferably be located in the optical path of the emitted light between the stimulable phosphor sheet and the line sensor and at a position that does not overlap the optical path of the stimulating rays. In this manner, the stimulating rays should preferably be prevented from impinging upon the line sensor.

The size of a light receiving surface of each of the photoelectric conversion devices constituting the line sensor should preferably fall within the range of 10 $\mu$m to 4,000 $\mu$m, and should more preferably fall within the range of 100 $\mu$m to 500 $\mu$m. The number of the photoelectric conversion devices arrayed along the length direction of the line sensor should preferably be at least 1,000. The length of the line sensor should preferably be longer than or equal to the length of one side of the effective image storing region of the stimulable phosphor sheet. The plurality of the photoelectric conversion devices may be arrayed in a straight line or in a zigzag pattern along the major axis direction.

In the third radiation image read-out method in accordance with the present invention, the line light source and the line sensor are located on the same surface side of the stimulable phosphor sheet.

The foregoing explanation of the third radiation image read-out method in accordance with the present invention also applies to a fourth radiation image read-out method in accordance with the present invention, which is described below.

As in the first radiation image read-out method in accordance with the present invention, the fourth radiation image read-out method in accordance with the present invention is characterized by utilizing a line sensor, which comprises a plurality of photoelectric conversion devices arrayed along two-dimensional directions, in lieu of the line sensor employed in the third radiation image read-out method in accordance with the present invention, detecting light, which is emitted from a linear area of a stimulable phosphor sheet, with the line sensor, performing operation processing, such as addition, on outputs of the photoelectric conversion devices, which outputs have been obtained at respective scanning positions and correspond to an identical site on the stimulable phosphor sheet, and thereby enhancing a light collecting efficiency.

Specifically, in the fourth radiation image read-out method in accordance With the present invention, the first radiation image read-out method in accordance with the present invention is modified such that the linear stimulating rays are guided with stimulating ray guiding means to the area of the stimulable phosphor sheet, the light, which is emitted from the linear area of the stimulable phosphor sheet, is guided with emitted light guiding means to the line sensor, and at least part of an optical path of the stimulating rays from the line light source to the stimulable phosphor sheet and at least part of an optical path of the emitted light from the stimulable phosphor sheet to the line sensor overlap each other.

The overlapping of at least part of the optical path of the stimulating rays and at least part of the optical path of the emitted light should preferably be achieved by utilizing at least part of optical elements, which constitute the stimulating ray guiding means, and at least part of optical elements, which constitute the emitted light guiding means, in common with each other.

Fifth and sixth radiation image read-out methods in accordance with the present invention are characterized by utilizing a stimulable phosphor sheet having light emission region partitioned by a stimulating ray reflecting partition member into a plurality of fine cells.

Specifically, the present invention still further provides a fifth radiation image-read-out method, comprising the steps of:

i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, with a line sensor comprising a plurality of photoelectric conversion devices arrayed along a length direction of the linear area of the stimulable phosphor sheet, the received light being subjected to photoelectric conversion performed by the line sensor, iii) moving the stimulable phosphor sheet with respect to the line light source and the line sensor and in a direction different from the length direction of the linear area of the stimulable phosphor sheet, and iv) successively reading outputs of the line sensor in accordance with the movement, wherein a light emission region of the stimulable phosphor sheet is partitioned by a stimulating ray reflecting partition member, which extends in a thickness direction of the stimulable phosphor sheet, into a plurality of fine cells.

In the fifth radiation image read-out method in accordance with the present invention, the size of the light receiving surface of each of the photoelectric conversion devices constituting the line sensor should preferably fall within the range of 10 $\mu$m to 4,000 $\mu$m, and should more preferably fall within the range of 100 $\mu$m to 500 $\mu$m. The number of the photoelectric conversion devices arrayed along the length direction of the line sensor should preferably be at least 1,000. The length of the line sensor should preferably be longer than or equal to the length of one side of the effective image storing region of the stimulable phosphor sheet. The plurality of the photoelectric conversion devices may be arrayed in a straight line or in a zigzag pattern along the major axis direction.

The stimulable phosphor sheet employed in the fifth radiation image read-out method in accordance with the present invention comprises a substrate and a stimulable phosphor layer overlaid on the substrate. As will be described later with reference to FIG. 17A, the stimulable phosphor layer comprises a stimulable phosphor material, which emits light upon stimulation thereof, and the stimulating ray reflecting partition member, which partitions the stimulable phosphor material into a plurality of fine cells and suppresses scattering of the stimulating rays. As will be described later with reference to FIG. 17B, the stimulable phosphor material other than its front surface is surrounded by the stimulating ray reflecting partition member and the substrate. Alternatively, as will be described later with reference to FIG. 17C, the stimulable phosphor material other than its front surface is surrounded by only the stimulating ray reflecting partition member. The stimulable phosphor sheet may be produced by filling the stimulable phosphor material in the fine cells, which have been defined by only the stimulating ray reflecting partition member or by the stimulating ray reflecting partition member and the substrate.

Each of the stimulable phosphor material and the stimulating ray reflecting partition member should preferably be formed from a binder and a stimulable phosphor dispersed in the binder. The reflectivity of the stimulating ray reflecting partition member with respect to the stimulating rays should be higher than the reflectivity of the stimulable phosphor material with respect to the stimulating rays. For such purposes, by way of example, the binder-to-phosphor ratio (i.e., the B/P ratio) in the stimulable phosphor material may be set to be higher than the B/P ratio in the stimulating ray reflecting partition member. Alternatively, the particle size of the stimulable phosphor in the stimulable phosphor material may be set to be larger than the particle size of the stimulable phosphor in the stimulating ray reflecting partition member.

A coloring agent, such as an ultramarine, may be added to the stimulating ray reflecting partition member. Alternatively, as the stimulable phosphor contained in the stimulating ray reflecting partition member, a stimulable phosphor of a kind different from the stimulable phosphor contained in the stimulable phosphor material may be employed. For example, the stimulable phosphor contained in the stimulating ray reflecting partition member may be an ultraviolet light (UV light) emitting phosphor, which emits UV light capable of effecting primary stimulation of the stimulable phosphor. In cases where the stimulating ray reflecting partition member contains the coloring agent, the term "reflectivity of a stimulating ray reflecting partition member with respect to stimulating rays" as used herein means the reflectivity of the stimulating ray reflecting partition member from which the coloring agent has been removed.

The size of each of the fine cells along the beam width direction should preferably be at most 1,000 $\mu$m. The size of the each partition wall, which is formed by the stimulating ray reflecting partition member, along the beam width direction should preferably be at most 100 $\mu$m. The thickness of the stimulable phosphor layer should preferably be at least 100 $\mu$m.

Examples of such stimulable phosphor sheets include those described in Japanese Unexamined Patent Publication Nos. 59(1984)-202100, 62(1987)-36599, and 2(1990)-129600.

The term "light emission region of a stimulable phosphor sheet" as used herein means the region, which is filled with the stimulable phosphor material, in the aforesaid stimulable phosphor layer.

In the fifth radiation image read-out method in accordance with the present invention, the line light source and the line sensor may be located on the same surface side of the stimulable phosphor sheet or on opposite surface sides of the stimulable phosphor sheet. In cases where the line light source and the line sensor are located on opposite surface sides of the stimulable phosphor sheet, it is necessary to employ a stimulable phosphor sheet, wherein the stimulable phosphor material is surrounded by the stimulating ray reflecting partition member and a substrate formed from a material permeable to the emitted light, such that the emitted light may permeate to the surface side of the stimulable phosphor sheet opposite to the surface on the stimulating ray incidence side.

The foregoing explanation of the fifth radiation image read-out method in accordance with the present invention also applies to a sixth radiation image read-out method in accordance with the present invention, which is described below.

As in the first radiation image read-out method in accordance with the present invention, the sixth radiation image read-out method in accordance with the present invention is characterized by utilizing a line sensor, which comprises a plurality of photoelectric conversion devices arrayed along two-dimensional directions, in lieu of the line sensor employed in the fifth radiation image read-out method in accordance with the present invention, detecting light, which is emitted from a linear area of a stimulable phosphor sheet, with the line sensor, performing operation processing, such as addition, on outputs of the photoelectric conversion devices, which outputs have been obtained at respective scanning positions and correspond to an identical site on the stimulable phosphor sheet, and thereby enhancing a light collecting efficiency.

Specifically, in the sixth radiation image read-out method in accordance with the present invention, the first radiation image read-out method in accordance with the present invention is modified such that a light emission region of the stimulable phosphor sheet is partitioned by a stimulating ray reflecting partition member, which extends in a thickness direction of the stimulable phosphor sheet, into a plurality of fine cells.

In the sixth radiation image read-out method in accordance with the present invention, as in the first radiation image read-out method in accordance with the present invention, the line sensor comprises the plurality of the photoelectric conversion devices arrayed along each of the major axis direction and the minor axis direction normal to the major axis direction, and the operation processing, such as addition, is performed on the outputs of the photoelectric conversion devices, which outputs have been obtained at respective positions of movement and correspond to an identical site on the stimulable phosphor sheet. Therefore, in cases where the line width of the linear stimulating rays is larger than the width of each fine cell, the light simultaneously emitted from fine cells, which are adjacent to one another along the line width direction, is capable of being collected by corresponding rows of photoelectric conversion devices, and the light collecting efficiency can thereby be enhanced. Also, in cases where the width of each photoelectric conversion device is smaller than the width of each fine cell, the emitted light scattering to the line width direction in a single fine cell is capable of being collected by several corresponding rows of photoelectric conversion devices. As a result, the resolution and the light collecting efficiency can be enhanced.

Seventh, eighth, and ninth radiation image read-out methods in accordance with the present invention are characterized by utilizing a line light source and a line sensor, detecting image signals, which represent a radiation image having been stored on a stimulable phosphor sheet, from opposite surfaces of the stimulable phosphor sheet, and performing operation processing on the image signals.

Specifically, the present invention also provides a seventh radiation image read-out method, comprising the steps of:

i) linearly irradiating stimulating rays, which have been produced by a line light source, onto an area of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the stimulable phosphor sheet exposed to the linear stimulating rays, with a line sensor comprising a plurality of photoelectric conversion devices arrayed linearly, the received light being subjected to photoelectric conversion performed by the line sensor, iii) moving the stimulable phosphor sheet with respect to the line light source and the line sensor, and iv) reading outputs of the photoelectric conversion devices constituting the line sensor, which outputs are obtained at respective positions of movement, wherein the stimulable phosphor sheet is capable of emitting light from front and back surfaces, two line sensors are utilized, each of which is located on one of the front and back surface sides of the stimulable phosphor sheet, the two line sensors detecting two image signals, each of which is made up of a series of image signal components representing pixels in the radiation image, from the front and back surfaces of the stimulable phosphor sheet, and operation processing is performed on image signal components of the two image signals, which image signal components represent corresponding pixels on the front and back surfaces of the stimulable phosphor sheet.

In the seventh radiation image read-out method in accordance with the present invention, the LED array or the broad area laser should preferably be employed as the line light source. Also, the aforesaid stimulating ray guiding means should preferably be employed for suppressing spread of the stimulating rays to the direction (i.e., the minor axis direction), which is normal to the length direction (i.e., the major axis direction) of the line of the stimulating rays, such that the stimulating rays having been radiated out of the light source may take on the form of the linear stimulating rays on the surface of the stimulable phosphor sheet.

The stimulable phosphor sheet capable of emitting light from front and back surfaces, which is employed in the seventh radiation image read-out method in accordance with the present invention, is a stimulable phosphor sheet in which the substrate, or the like, is permeable to the emitted light, such that the emitted light caused to occur by the stimulating rays irradiated from at least one surface side of the stimulable phosphor sheet may emanate from the front and back surfaces of the stimulable phosphor sheet. In cases where two line light sources are located respectively on the front and back surface sides of the stimulable phosphor sheet, or in cases where the front and back surfaces of the stimulable phosphor sheet are stimulated one after another as in the eighth and ninth radiation image read-out methods in accordance with the present invention, which will be described later, it is necessary for the substrate of the stimulable phosphor sheet to be permeable to both the emitted light and the stimulating rays. Also, in cases where the front and back surfaces of the stimulable phosphor sheet are stimulated one after another, the stimulable phosphor sheet may be provided with a stimulating ray blocking layer as an intermediate layer.

Regardless of whether the stimulable phosphor sheet is stimulated from one surface side or is stimulated simultaneously or successively from the front and back surface sides, it is possible to employ a stimulable phosphor sheet, wherein the light emission region of the stimulable phosphor sheet is partitioned by a stimulating ray reflecting partition member, which extends in the thickness direction of the stimulable phosphor sheet, into a plurality of fine cells. Such a stimulable phosphor sheet is referred to as the anisotropic stimulable phosphor sheet. With the anisotropic stimulable phosphor sheet, the sharpness of an image reproduced from the image signal obtained from the photoelectric conversion can be enhanced.

In the seventh radiation image read-out method in accordance with the present invention, the plurality of the photoelectric conversion devices may be arrayed linearly in a straight line or in a zigzag pattern along the major axis direction. The size of a light receiving surface of each of the photoelectric conversion devices constituting the line sensor should preferably fall within the range of 10 $\mu$m to 4,000 $\mu$m, and should more preferably fall within the range of 100 $\mu$m to 500 $\mu$m. The number of the photoelectric conversion devices arrayed along the length direction of the line sensor should preferably be at least 1,000.

Also, the aforesaid emitted light guiding means may be located between the stimulable phosphor sheet and the line sensor.

The line sensor employed in the seventh radiation image read-out method in accordance with the present invention may comprise the plurality of the photoelectric conversion devices arrayed along only the length direction (i.e., the major axis direction). Alternatively, as in the first radiation image read-out method in accordance with the present invention, the line sensor may comprise the plurality of the photoelectric conversion devices arrayed along each of the major axis direction and the minor axis direction, which is normal to the major axis direction.

In the seventh radiation image read-out method in accordance with the present invention, simple addition, weighted addition, or one of other kinds of operation processing is performed on the image signal components of the two image signals, which image signal components represent corresponding pixels on the front and back surfaces of the stimulable phosphor sheet. Such processing is referred to as the superposition processing. The superposition processing is described in, for example, U.S. Pat. No. 4,356,398. With the superposition processing, noise occurring at random in the effective image storing region of the stimulable phosphor sheet can be reduced markedly, and slight differences in radiation absorptivity of an object can be illustrated clearly in an ultimately reproduced image, i.e., the detection capability can be enhanced markedly.

Unless otherwise specified, the foregoing explanation of the seventh radiation image read-out method in accordance with the present invention also applies to the eighth and ninth radiation image read-out methods in accordance with the present invention, which are described below.

As described above, in the seventh radiation image read-out method in accordance with the present invention, the two line sensors are located respectively on the opposite surface sides of the stimulable phosphor sheet. The eighth radiation image read-out method in accordance with the present invention is characterized by locating the line sensor on only one surface side of a stimulable phosphor sheet, shifting the line sensor to the opposite surface side of the stimulable phosphor sheet after an image signal has been detected from the one surface of the stimulable phosphor sheet, and thereby detecting an image signal from the opposite surface of the stimulable phosphor sheet.

Specifically, the present invention further provides an eighth radiation image read-out method, comprising the steps of:

i) linearly irradiating stimulating rays, which have been produced by a line light source, onto an area of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the stimulable phosphor sheet exposed to the linear stimulating rays, with a line sensor comprising a plurality of photoelectric conversion devices arrayed linearly, the received light being subjected to photoelectric conversion performed by the line sensor, iii) moving the stimulable phosphor sheet with respect to the line light source and the line sensor, and iv) reading outputs of the photoelectric conversion devices constituting the line sensor, which outputs are obtained at respective positions of movement, wherein the stimulable phosphor sheet is capable of emitting light from front and back surfaces, after detection of the emitted light from one of the front and back surfaces of the stimulable phosphor sheet has been finished, the line sensor is shifted by sensor shifting means to the opposite surface side of the stimulable phosphor sheet, the line sensor thereby detecting two image signals, each of which is made up of a series of image signal components representing pixels in the radiation image, from the front and back surfaces of the stimulable phosphor sheet, and operation processing is performed on image signal components of the two image signals, which image signal components represent corresponding pixels on the front and back surfaces of the stimulable phosphor sheet.

In the eighth radiation image read-out method in accordance with the present invention, the sensor shifting means may shift both the line sensor and the line light source to the opposite surface side of the stimulable phosphor sheet.

As described above, in the eighth radiation image read-out method in accordance with the present invention, the line sensor is shifted from one surface side to the opposite surface side of the stimulable phosphor sheet, and the image signal is thereby detected from the opposite surface side of the stimulable phosphor sheet. The ninth radiation image read-out method in accordance with the present invention is characterized by, instead of a line sensor being shifted, reversing front and back surfaces of a stimulable phosphor sheet, and thereby detecting an image signal from the opposite surface side of the stimulable phosphor sheet.

Specifically, the present invention still further provides a ninth radiation image read-out method, comprising the steps of:

i) linearly irradiating stimulating rays, which have been produced by a line light source, onto an area of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the stimulable phosphor sheet exposed to the linear stimulating rays, with a line sensor comprising a plurality of photoelectric conversion devices arrayed linearly, the received light being subjected to photoelectric conversion performed by the line sensor, iii) moving the stimulable phosphor sheet with respect to the line light source and the line sensor, and iv) reading outputs of the photoelectric conversion devices constituting the line sensor, which outputs are obtained at respective positions of movement, wherein the stimulable phosphor sheet is capable of emitting light from front and back surfaces, after detection of the emitted light from one of the front and back surfaces of the stimulable phosphor sheet has been finished, the front and back surfaces of the stimulable phosphor sheet are reversed by sheet reversing means, the line sensor thereby detecting two image signals, each of which is made up of a series of image signal components representing pixels in the radiation image, from the front and back surfaces of the stimulable phosphor sheet, and operation processing is performed on image signal components of the two image signals, which image signal components represent corresponding pixels on the front and back surfaces of the stimulable phosphor sheet.

In the seventh, eighth, and ninth radiation image read-out methods in accordance with the present invention, in cases where the line light source and the line sensor are located on the same surface side of the stimulable phosphor sheet, from the point of view of keeping the size of the radiation image read-out apparatus small, at least part of the optical path of the stimulating rays from the line light source to the stimulable phosphor sheet and at least part of the optical path of the emitted light from the stimulable phosphor sheet to the line sensor should preferably overlap each other. Such a constitution is advantageous particularly in cases where two line sensors are located respectively on the opposite surface sides of the stimulable phosphor sheet (as in the seventh radiation image read-out method in accordance with the present invention). In cases where, besides the two line sensors, two line light sources are also located respectively on the opposite surface sides of the stimulable phosphor sheet, the effects of reducing the size of the radiation image read-out apparatus can be obtained by overlapping at least part of the optical path of the stimulating rays and at least part of the optical path of the emitted light at least on one surface side of the stimulable phosphor sheet. However, larger effects of reducing the size of the radiation image read-out apparatus can be obtained by partially overlapping the optical paths on the two surface sides of the stimulable phosphor sheet.

In cases where a single line sensor is utilized for detecting the images signals from the opposite surfaces of the stimulable phosphor sheet (as in the eighth and ninth radiation image read-out methods in accordance with the present invention), in the state in which the line sensor and the line light source are located on the same surface side of the stimulable phosphor sheet, the optical paths described above should preferably partially overlap each other. In this manner, the size of the radiation image read-out apparatus can be kept small.

Tenth, eleventh, and twelfth radiation image read-out methods in accordance with the present invention are characterized by utilizing a line light source and a line sensor, utilizing a stimulable phosphor sheet for energy subtraction processing, detecting image signals, which represent radiation images of a single object having been stored on the stimulable phosphor sheet, from opposite surfaces of the stimulable phosphor sheet, and performing a subtraction process on the image signals.

Specifically, the present invention also provides a tenth radiation image read-out method, comprising the steps of:

i) linearly irradiating stimulating rays, which have been produced by a line light source, onto an area of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the stimulable phosphor sheet exposed to the linear stimulating rays, with a line sensor comprising a plurality of photoelectric conversion devices arrayed linearly, the received light being subjected to photoelectric conversion performed by the line sensor, iii) moving the stimulable phosphor sheet with respect to the line light source and the line sensor, and iv) reading outputs of the photoelectric conversion devices constituting the line sensor, which outputs are obtained at respective positions of movement, wherein the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface, two line sensors are utilized, each of which is located on one of the front and back surface sides of the stimulable phosphor sheet, the two line sensors detecting two image signals, each of which is made up of a series of image signal components representing pixels in the radiation image, from the front and back surfaces of the stimulable phosphor sheet, and a subtraction process is performed on image signal components of the two image signals, which image signal components represent corresponding pixels on the front and back surfaces of the stimulable phosphor sheet.

In the tenth radiation image read-out method in accordance with the present invention, the LED array or the broad area laser should preferably be employed as the line light source. Also, the aforesaid stimulating ray guiding means should preferably be employed for suppressing spread of the stimulating rays to the direction (i.e., the minor axis direction), which is normal to the length direction (i.e., the major axis direction) of the line of the stimulating rays, such that the stimulating rays having been radiated out of the light source may take on the form of the linear stimulating rays on the surface of the stimulable phosphor sheet. Further, two line light sources may be located on opposite surface sides of the stimulable phosphor sheet.

As the stimulable phosphor sheet for energy subtraction processing, a stimulable phosphor sheet having two stimulable phosphor layers formed at the front and back surfaces with a filter layer of a low radiation energy absorbing substance intervening therebetween may be employed. Alternatively, a stimulable phosphor sheet having two stimulable phosphor layers with different radiation energy absorption characteristics formed at the front and back surfaces may be employed. In cases where the front and back surfaces of the stimulable phosphor sheet are respectively stimulated (in cases where two line light sources are located respectively on the front and back surfaces of the stimulable phosphor sheet, or in cases where the front and back surfaces of the stimulable phosphor sheet are stimulated one after another, the stimulable phosphor sheet may be provided with a stimulating ray blocking layer as an intermediate layer.

Regardless of whether the stimulable phosphor sheet is stimulated from one surface side or is stimulated simultaneously from the front and back surface sides, it is possible to employ the anisotropic stimulable phosphor sheet described above. With the anisotropic stimulable phosphor sheet, the sharpness of an image reproduced from the image signal obtained from the photoelectric conversion can be enhanced.

In the tenth radiation image read-out method in accordance with the present invention, the plurality of the photoelectric conversion devices may be arrayed linearly in a straight line or in a zigzag pattern along the major axis direction. The size of a light receiving surface of each of the photoelectric conversion devices constituting the line sensor should preferably fall within the range of 10 $\mu$m to 4,000 $\mu$m, and should more preferably fall within the range of 100 $\mu$m to 500 $\mu$m. The number of the photoelectric conversion devices arrayed along the length direction of the line sensor should preferably be at least 1,000.

Also, the aforesaid emitted light guiding means may be located between the stimulable phosphor sheet and the line sensor.

The line sensor employed in the tenth radiation image read-out method in accordance with the present invention may comprise the plurality of the photoelectric conversion devices arrayed along only the length direction (i.e., the major axis direction). Alternatively, as in the first radiation image read-out method in accordance with the present invention, the line sensor may comprise the plurality of the photoelectric conversion devices arrayed along each of the major axis direction and the minor axis direction, which is normal to the major axis direction.

In the tenth radiation image read-out method in accordance with the present invention, the subtraction process is performed on the image signal components of the two image signals, which image signal components represent corresponding pixels on the front and back surfaces of the stimulable phosphor sheet. Specifically, the image signal components of the two image signals, which image signal components represent corresponding pixels on the front and back surfaces of the stimulable phosphor sheet, may be subtracted from each other with Formula (1) shown below. For such purposes, a combination of a flame memory and a subtracter, or the like, may be employed.

$$Sproc = Ka \cdot SH - Kb \cdot SL + Kc \tag{1}$$

in which Sproc represents the subtraction image signal obtained from the subtraction process, each of Ka and Kb represents the weight factor, and Kc represents the bias component (Ka, Kb, and Kc will hereinbelow be referred to as the parameters for the subtraction process), SH represents the high energy image signal representing the radiation image formed with radiation having a high energy level, and SL represents the low energy image signal representing the radiation image formed with radiation having a low energy level.

Unless otherwise specified, the foregoing explanation of the tenth radiation image read-out method in accordance with the present invention also applies to the eleventh and twelfth radiation image read-out methods in accordance with the present invention, which are described below.

As described above, in the tenth radiation image read-out method in accordance with the present invention, the two line sensors are located respectively on the opposite surface sides of the stimulable phosphor sheet. The eleventh radiation image read-out method in accordance with the present invention is characterized by locating the line sensor on only one surface side of a stimulable phosphor sheet, shifting the line sensor to the opposite surface side of the stimulable phosphor sheet after an image signal has been detected from the one surface of the stimulable phosphor sheet, and thereby detecting an image signal from the opposite surface of the stimulable phosphor sheet.

Specifically, the present invention further provides an eleventh radiation image read-out method, comprising the steps of:

i) linearly irradiating stimulating rays, which have been produced by a line light source, onto an area of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the stimulable phosphor sheet exposed to the linear stimulating rays, with a line sensor comprising a plurality of photoelectric conversion devices arrayed linearly, the received light being subjected to photoelectric conversion performed by the line sensor, iii) moving the stimulable phosphor sheet with respect to the line light source and the line sensor, and iv) reading outputs of the photoelectric conversion devices constituting the line sensor, which outputs are obtained at respective positions of movement, wherein the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface, after detection of the emitted light from one of the front and back surfaces of the stimulable phosphor sheet has been finished, the line sensor is shifted by sensor shifting means to the opposite surface side of the stimulable phosphor sheet, the line sensor thereby detecting two image signals, each of which is made up of a series of image signal components representing pixels in the radiation image, from the front and back surfaces of the stimulable phosphor sheet, and a subtraction process is performed on image signal components of the two image signals, which image signal components represent corresponding pixels on the front and back surfaces of the stimulable phosphor sheet.

In the eleventh radiation image read-out method in accordance with the present invention, the sensor shifting means may shift both the line sensor and the line light source to the opposite surface side of the stimulable phosphor sheet.

As described above, in the eleventh radiation image read-out method in accordance with the present invention, the line sensor is shifted from one surface side to the opposite surface side of the stimulable phosphor sheet, and the image signal is thereby detected from the opposite surface side of the stimulable phosphor sheet. The twelfth radiation image read-out method in accordance with the present invention is characterized by, instead of a line sensor being shifted, reversing front and back surfaces of a stimulable phosphor sheet, and thereby detecting an image signal from the opposite surface side of the stimulable phosphor sheet.

Specifically, the present invention still further provides a twelfth radiation image read-out method, comprising the steps of:

i) linearly irradiating stimulating rays, which have been produced by a line light source, onto an area of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the stimulable phosphor sheet exposed to the linear stimulating rays, with a line sensor comprising a plurality of photoelectric conversion devices arrayed linearly, the received light being subjected to photoelectric conversion performed by the line sensor, iii) moving the stimulable phosphor sheet with respect to the line light source and the line sensor, and iv) reading outputs of the photoelectric conversion devices constituting the line sensor, which outputs are obtained at respective positions of movement, wherein the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface, after detection of the emitted light from one of the front and back surfaces of the stimulable phosphor sheet has been finished, the front and back surfaces of the stimulable phosphor sheet are reversed by sheet reversing means, the line sensor thereby detecting two image signals, each of which is made up of a series of image signal components representing pixels in the radiation image, from the front and back surfaces of the stimulable phosphor sheet, and a subtraction process is performed on image signal components of the two image signals, which image signal components represent corresponding pixels on the front and back surfaces of the stimulable phosphor sheet.

In the tenth, eleventh, and twelfth radiation image read-out methods in accordance with the present invention, in cases where the line light source and the line sensor are located on the same surface side of the stimulable phosphor sheet, from the point of view of keeping the size of the radiation image read-out apparatus small, at least part of the optical path of the stimulating rays from the line light source to the stimulable phosphor sheet and at least part of the optical path of the emitted light from the stimulable phosphor sheet to the line sensor should preferably overlap each other. Such a constitution is advantageous particularly in cases where two line sensors are located respectively on the opposite surface sides of the stimulable phosphor sheet (as in the tenth radiation image read-out method in accordance with the present invention). In cases where, besides the two line sensors, two line light sources are also located respectively on the opposite surface sides of the stimulable phosphor sheet, the effects of reducing the size of the radiation image read-out apparatus can be obtained by overlapping at least part of the optical path of the stimulating rays and at least part of the optical path of the emitted light at least on one surface side of the stimulable phosphor sheet. However, larger effects of reducing the size of the radiation image read-out apparatus can be obtained by partially overlapping the optical paths on the two surface sides of the stimulable phosphor sheet.

In cases where a single line sensor is utilized for detecting the images signals from the opposite surfaces of the stimulable phosphor sheet (as in the eleventh and twelfth radiation image read-out methods in accordance with the present invention), in the state in which the line sensor and the line light source are located on the same surface side of the stimulable phosphor sheet, the optical paths described above should preferably partially overlap each other. In this manner, the size of the radiation image read-out apparatus can be kept small.

Thirteenth and fourteenth radiation image read-out methods in accordance with the present invention are characterized by reading out a radiation image, which has been stored on a stimulable phosphor sheet, by utilizing a back illuminated type of CCD image sensor.

Specifically, the present invention also provides a thirteenth radiation image read-out method, comprising the steps of:

i) irradiating stimulating rays, which have been produced by a surface light source, onto a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the area of the front surface of the stimulable phosphor sheet exposed to the stimulating rays or from an area of a back surface of the stimulable phosphor sheet corresponding to the area of the front surface of the stimulable phosphor sheet, with an area sensor comprising a plurality of arrayed photoelectric conversion devices, the received light being subjected to photoelectric conversion performed by the area sensor, and iii) reading outputs of the photoelectric conversion devices constituting the area sensor, wherein the area sensor is a back illuminated type of CCD image sensor.

The present invention further provides a fourteenth radiation image read-out method, comprising the steps of:

i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, with a line sensor comprising a plurality of arrayed photoelectric conversion devices, the received light being subjected to photoelectric conversion performed by the line sensor, iii) moving the stimulable phosphor sheet with respect to the line light source and the line sensor and in a direction different from a length direction of the linear area of the stimulable phosphor sheet, and iv) successively reading outputs of the photoelectric conversion devices of the line sensor in accordance with the movement, wherein the line sensor is a back illuminated type of CCD image sensor.

In the fourteenth radiation image read-out method in accordance with the present invention, as in the first radiation image read-out method in accordance with the present invention, the back illuminated type of CCD image sensor may comprise the plurality of the photoelectric conversion devices arrayed along each of the length direction of the linear area of the stimulable phosphor sheet and the direction, which is normal to the length direction.

In the thirteenth and fourteenth radiation image read-out methods in accordance with the present invention, the back illuminated type of CCD image sensor should preferably be cooled with cooling means.

An ordinarily utilized front illuminated type of CCD image sensor detects light incident from the front surface. The back illuminated type of CCD image sensor detects light incident from the back surface. For such purposes, for example, the back surface of the back illuminated type of CCD image sensor is scraped.

The front illuminated type of CCD image sensor is provided with a protective layer constituted of Si, or the like, and therefore the sensitivity of the front illuminated type of CCD image sensor with respect to light of a short wavelength region, such as blue light, is markedly low. The back illuminated type of CCD image sensor has markedly high sensitivity with respect to light falling within the range of an ultraviolet region to a blue light region. Also, the back illuminated type of CCD image sensor has a high quantum efficiency, and its sensitivity with respect to light falling within the range of a visible light region to an infrared region is higher than that of the front illuminated type of CCD image sensor.

As the cooling means for cooling the back illuminated type of CCD image sensor, means utilizing a Peltier device, or the like, may be employed.

The back illuminated type of CCD image sensor should preferably be produced by arraying a plurality of back illuminated type of CCD image sensor chips. For example, in cases where the back illuminated type of CCD image sensor is employed as the line sensor, the back illuminated type of CCD image sensor may comprise a plurality of back illuminated type of CCD image sensor chips arrayed in a straight line or in a zigzag pattern along the length direction of the linear area of the stimulable phosphor sheet. Each of the back illuminated type of CCD image sensor chips may comprise a plurality of photoelectric conversion devices arrayed in two-dimensional directions and in a matrix-like pattern or in a zigzag pattern.

In the thirteenth and fourteenth radiation image read-out methods in accordance with the present invention, as the light source, an LED array, an organic EL device, a fluorescent lamp, a high-pressure sodium lamp, a cold cathode tube, or the like, may be employed. The light source is not limited to a light source having a surface-like shape or a linear shape and may be one of various other light sources, which irradiate linear or surface-like (area-like) stimulating rays onto the surface of the stimulable phosphor sheet. Alternatively, the light source may be provided with an expanding mechanism for expanding the radiated stimulating rays such that linear or surface-like stimulating rays may impinge upon the surface of the stimulable phosphor sheet. In cases where the light source is the line light source, the broad area laser, or the like, which radiates linear stimulating rays, may be employed as the light source.

The stimulating rays may be radiated continuously out of the light source or may be pulsed stimulating rays radiated intermittently out of the light source. From the point of view of reducing noise, the stimulating rays should preferably be pulsed stimulating rays having high intensity. Also, the stimulating rays should have wavelengths falling within the stimulation wavelength range for the stimulable phosphor sheet. For example, in cases where the stimulable phosphor sheet is capable of being stimulated by red stimulating rays, the stimulating rays should have wavelengths falling within the range of 600 nm to 1,000 nm, and should preferably have wavelengths falling within the range of 600 nm to 700 nm.

The line sensor employed in the fourteenth radiation image read-out method in accordance with the present invention may comprise the plurality of the photoelectric conversion devices arrayed along only the length direction (i.e., the major axis direction). Alternatively, as in the first radiation image read-out method in accordance with the present invention, the line sensor may comprise the plurality of the photoelectric conversion devices arrayed along each of the major axis direction and the minor axis direction, which is normal to the major axis direction.

In the fourteenth radiation image read-out method in accordance with the present invention, as in the first radiation image read-out method in accordance with the present invention, the line sensor may comprise the plurality of the photoelectric conversion devices arrayed along each of the major axis direction of the linear area of the stimulable phosphor sheet and the minor axis direction normal to the major axis direction, and the operation processing may be performed on the outputs of the photoelectric conversion devices, which outputs have been obtained at respective positions of movement and correspond to an identical site on the stimulable phosphor sheet.

In the thirteenth radiation image read-out method in accordance with the present invention, the light source and the area sensor may be located on the same surface side of the stimulable phosphor sheet or on opposite surface sides of the stimulable phosphor sheet. Also, in the fourteenth radiation image read-out method in accordance with the present invention, the line light source and the line sensor may be located on the same surface side of the stimulable phosphor sheet or on opposite surface sides of the stimulable phosphor sheet.

In the thirteenth and fourteenth radiation image read-out methods in accordance with the present invention, the stimulating rays irradiated to the stimulable phosphor sheet should preferably be set such that the power (corresponding to the irradiation intensity or the luminance) of the stimulating rays may not vary. In cases where variation in power of the stimulating rays occur, the intensity of the stimulating rays may be monitored with a monitoring means. When variation in power occurs, for example, the driving voltage for the light source (or the line light source), or the like, may be modulated with modulating means more quickly than the photoelectric conversion speed of the photoelectric conversion devices such that the emission power (the luminance) of the light source (or the line light source) may become equal to a predetermined value. In this manner, adverse effects of power variation may be suppressed.

Fifteenth and sixteenth radiation image read-out methods in accordance with the present invention are characterized by reading out a radiation image, which has been stored on a stimulable phosphor sheet, by utilizing a stimulating ray source constituted of an organic EL device.

Specifically, the present invention still further provides a fifteenth radiation image read-out method, comprising the steps of:

i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, with a line sensor comprising a plurality of arrayed photoelectric conversion devices, the received light being subjected to photoelectric conversion performed by the line sensor, iii) moving the stimulable phosphor sheet with respect to the line light source and the line sensor and in a direction different from a length direction of the linear area of the stimulable phosphor sheet, and iv) successively reading outputs of the photoelectric conversion devices of the line sensor in accordance with the movement, wherein the line light source is constituted of an organic EL device.

The present invention also provides a sixteenth radiation image read-out method, comprising the steps of:

i) irradiating stimulating rays, which have been produced by a surface light source, onto a front surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the area of the front surface of the stimulable phosphor sheet exposed to the stimulating rays or from an area of a back surface of the stimulable phosphor sheet corresponding to the area of the front surface of the stimulable phosphor sheet, with an area sensor comprising a plurality of arrayed photoelectric conversion devices, the received light being subjected to photoelectric conversion performed by the area sensor, and iii) reading outputs of the photoelectric conversion devices constituting the area sensor, wherein the surface light source is constituted of an organic EL device.

The organic EL device (also referred to as the organic LED) is an electric current injection type of luminous device, in which the energy of recombination of positive holes and electrons injected into an organic material is converted into optical energy and light emission is thereby effected. The organic EL device is a self-luminous device capable of emanating strong light having luminous intensity of several hundreds of thousands of candelas (i.e., capable of emitting light with high luminance) (the luminance of an ordinary white fluorescent lamp is 1,000 to 5,000 candelas), and having an energy conversion efficiency of at least 10 lm/W (i.e., having a high luminous efficiency). The organic EL device has various characteristic properties such as that it can be driven with a low d.c. voltage of at most 10V, can respond quickly on the nS order, can emit light of various colors ranging from blue to red, does not have dependence upon field angle as in liquid crystal devices, and is very thin and light in weight. By virtue of the characteristic properties, the organic EL device has recently attracted particular attention and has been used in practice. The organic EL device employed in the fifteenth and sixteenth radiation image read-out methods in accordance with the present invention may be of one of various materials and one of various structures and may be produced by one of various production processes.

In the fifteenth and sixteenth radiation image read-out methods in accordance with the present invention, the light source constituted of the organic EL device is not limited to those which produce the surface-like or line-like stimulating rays, and may be one of various other light sources, which irradiate linear or surface-like (area-like) stimulating rays onto the surface of the stimulable phosphor sheet. Alternatively, the light source may be provided with an expanding mechanism for expanding the radiated stimulating rays such that linear or surface-like stimulating rays may impinge upon the surface of the stimulable phosphor sheet.

The stimulating rays may be radiated continuously out of the organic EL device or may be pulsed stimulating rays radiated intermittently out of the organic EL device. From the point of view of reducing noise, the stimulating rays should preferably be pulsed stimulating rays having high intensity. Also, the stimulating rays produced by the organic EL device should have wavelengths falling within the stimulation wavelength range for the stimulable phosphor sheet. For example, in cases where the stimulable phosphor sheet is capable of being stimulated by red stimulating rays, the stimulating rays should have wavelengths falling within the range of 600 nm to 1,000 nm, and should preferably have wavelengths falling within the range of 600 nm to 700 nm.

The line sensor employed in the fifteenth radiation image read-out method in accordance with the present invention may comprise the plurality of the photoelectric conversion devices arrayed along only the length direction (i.e., the major axis direction). Alternatively, as in the first radiation image read-out method in accordance with the present invention, the line sensor may comprise the plurality of the photoelectric conversion devices arrayed along each of the major axis direction and the minor axis direction, which is normal to the major axis direction.

In the fifteenth radiation image read-out method in accordance with the present invention, as in the first radiation image read-out method in accordance with the present invention, the line sensor may comprise the plurality of the photoelectric conversion devices arrayed along each of the major axis direction of the linear area of the stimulable phosphor sheet and the minor axis direction normal to the major axis direction, and the operation processing may be performed on the outputs of the photoelectric conversion devices, which outputs have been obtained at respective positions of movement and correspond to an identical site on the stimulable phosphor sheet.

In the fifteenth radiation image read-out method in accordance with the present invention, the organic EL device and the line sensor may be located on the same surface side of the stimulable phosphor sheet or on opposite surface sides of the stimulable phosphor sheet. Also, in the sixteenth radiation image read-out method in accordance with the present invention, the organic EL device and the area sensor may be located on the same surface side of the stimulable phosphor sheet or on opposite surface sides of the stimulable phosphor sheet.

In the fifteenth and sixteenth radiation image read-out methods in accordance with the present invention, the stimulating rays irradiated to the stimulable phosphor sheet should preferably be set such that the power (corresponding to the irradiation intensity or the luminance) of the stimulating rays may not vary. In cases where variation in power of the stimulating rays occur, the intensity of the stimulating rays may be monitored with a monitoring means. When variation in power occurs, the driving voltage for the organic EL device may be modulated with modulating means more quickly than the photoelectric conversion speed of the photoelectric conversion devices such that the emission power (the luminance) of the organic EL device may become equal to a predetermined value. In this manner, adverse effects of power variation may be suppressed.

The present invention further provides a seventeenth radiation image read-out method, comprising the steps of:

i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation, ii) guiding light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, with light guiding optical system to a line sensor comprising a plurality of arrayed photoelectric conversion devices, iii) receiving the emitted light with the line sensor, the received light being subjected to photoelectric conversion performed by the line sensor, and iv) moving the stimulable phosphor sheet with respect to the line light source, the light guiding optical system, and the line sensor and in a direction different from a length direction of the linear area of the stimulable phosphor sheet, wherein the light guiding optical system has been subjected to coloring for transmitting only the emitted light and filtering out the stimulating rays.

The present invention also provides a first radiation image read-out apparatus for carrying out the first radiation image read-out method in accordance with the present invention. Specifically, the present invention also provides a first radiation image read-out apparatus, comprising:

i) a line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, and performing photoelectric conversion of the received light, the line sensor comprising a plurality of photoelectric conversion devices arrayed along each of a length direction of the linear area of the stimulable phosphor sheet and a direction normal to the length direction, iii) scanning means for moving the stimulable phosphor sheet with respect to the line light source and the line sensor and in a direction different from the length direction of the linear area of the stimulable phosphor sheet, and iv) reading means for successively reading outputs of the line sensor in accordance with the movement, the reading means being provided with operation means for performing operation processing on the outputs of the photoelectric conversion devices, which outputs have been obtained at respective positions of movement performed by the scanning means and correspond to an identical site on the stimulable phosphor sheet.

In the first radiation image read-out apparatus in accordance with the present invention, as the line sensor, an amorphous silicon sensor, a CCD image sensor, a CCD image sensor with back illuminator, a MOS image sensor, or the like, may be employed. The line sensor may comprise a plurality of sensor chips (CCD image sensor chips, MOS image sensor chips, or the like) arrayed in a-straight line or in a zigzag pattern along the length direction of the linear area of the stimulable phosphor sheet. Each of the sensor chips may comprise a plurality of photoelectric conversion devices arrayed in two-dimensional directions and in a matrix-like pattern or in a zigzag pattern.

The present invention further provides a second radiation image read-out apparatus for carrying out the second radiation image read-out method in accordance with the present invention. Specifically, the present invention further provides a second radiation image read-out apparatus, comprising:

i) a line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, and performing photoelectric conversion of the received light, the line sensor comprising a plurality of arrayed photoelectric conversion devices, iii) scanning means for moving the stimulable phosphor sheet with respect to the line light source and the line sensor and in a direction different from a length direction of the linear area of the stimulable phosphor sheet, and iv) reading means for successively reading outputs of the photoelectric conversion devices of the line sensor in accordance with the movement, wherein the line light source is a broad area laser, which linearly radiates out the stimulating rays.

The line sensor employed in the second radiation image read-out apparatus in accordance with the present invention may comprise the plurality of the photoelectric conversion devices arrayed along only the length direction (i.e., the major axis direction). Alternatively, as in the first radiation image read-out apparatus in accordance with the present invention, the line sensor may comprise the plurality of the photoelectric conversion devices arrayed along each of the major axis direction and the minor axis direction, which is normal to the major axis direction.

In the second radiation image read-out apparatus in accordance with the present invention, as in the first radiation image read-out apparatus in accordance with the present invention, the line sensor may comprise the plurality of the photoelectric conversion devices arrayed along each of the major axis direction of the linear area of the stimulable phosphor sheet and the minor axis direction normal to the major axis direction, and the reading means may be provided with the operation means for performing the operation processing on the outputs of the photoelectric conversion devices, which outputs have been obtained at respective positions of movement performed by the scanning means and correspond to an identical site on the stimulable phosphor sheet. In such cases, if the beam width of the light emitted by the stimulable phosphor sheet is larger than the width of each photoelectric conversion device, the line sensor as a whole can receive the emitted light over approximately the entire beam width. The operation means provided in the reading means performs the operation processing, such as addition processing, on the outputs of the photoelectric conversion devices, which outputs correspond to an identical site on the stimulable phosphor sheet. In this manner, the light receiving efficiency can be enhanced.

The present invention still further provides a third radiation image read-out apparatus for carrying out the third radiation image read-out method in accordance with the present invention. Specifically, the present invention still further provides a third radiation image read-out apparatus, comprising:

i) a line light source for linearly radiating stimulating rays, which have been produced by a line light source, ii) stimulating ray guiding means for guiding the linear stimulating rays to an area of a stimulable phosphor sheet, on which a radiation image has been stored, the stimulating rays causing the stimulable phosphor sheet to emit light in proportion to an amount of energy stored thereon during its exposure to radiation, iii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed along a length direction of the linear area of the stimulable phosphor sheet, iv) emitted light guiding means for guiding the light, which is emitted from the linear area of the stimulable phosphor sheet exposed to the linear stimulating rays, to the line sensor, v) scanning means for moving the stimulable phosphor sheet with respect to the line light source and the line sensor and in a direction different from the length direction of the linear area of the stimulable phosphor sheet, and vi) reading means for successively reading outputs of the line sensor in accordance with the movement, wherein at least part of an optical path of the stimulating rays from the line light source to the stimulable phosphor sheet and at least part of an optical path of the emitted light from the stimulable phosphor sheet to the line sensor overlap each other.

In the third radiation image read-out apparatus in accordance with the present invention, the overlapping of at least part of the optical path of the stimulating rays and at least part of the optical path of the emitted light should preferably be achieved by utilizing at least part of optical elements, which constitute the stimulating ray guiding means, and at least part of optical elements, which constitute the emitted light guiding means, in common with each other.

The present invention also provides a fourth radiation image read-out apparatus for carrying out the fourth radiation image read-out method in accordance with the present invention. In the fourth radiation image read-out apparatus in accordance with the present invention, the first radiation image read-out apparatus in accordance with the present invention is modified such that the apparatus further comprises stimulating ray guiding means for guiding the linear stimulating rays to the area of the stimulable phosphor sheet, and emitted light guiding means for guiding the light, which is emitted from the linear area of the stimulable phosphor sheet, to the line sensor, and at least part of an optical path of the stimulating rays from the line light source to the stimulable phosphor sheet and at least part of an optical path of the emitted light from the stimulable phosphor sheet to the line sensor overlap each other.

In the fourth radiation image read-out apparatus in accordance with the present invention, the overlapping of at least part of the optical path of the stimulating rays and at least part of the optical path of the emitted light should preferably be achieved by utilizing at least part of optical elements, which constitute the stimulating ray guiding means, and at least part of optical elements, which constitute the emitted light guiding means, in common with each other.

The present invention further provides a fifth radiation image read-out apparatus for carrying out the fifth radiation image read-out method in accordance with the present invention. Specifically, the present invention further provides a fifth radiation image read-out apparatus, comprising:

i) a line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, and performing photoelectric conversion of the received light, the line sensor comprising a plurality of photoelectric conversion devices arrayed along a length direction of the linear area of the stimulable phosphor sheet, iii) scanning means for moving the stimulable phosphor sheet with respect to the line light source and the line sensor and in a direction different from the length direction of the linear area of the stimulable phosphor sheet, and iv) reading means for successively reading outputs of the line sensor in accordance with the movement, wherein a light emission region of the stimulable phosphor sheet is partitioned by a stimulating ray reflecting partition member, which extends in a thickness direction of the stimulable phosphor sheet, into a plurality of fine cells.

The present invention still further provides a sixth radiation image read-out apparatus for carrying out the six radiation image read-out method in accordance with the present invention. In the sixth radiation image read-out apparatus in accordance with the present invention, the first radiation image read-out apparatus in accordance with the present invention is modified such that a light emission region of the stimulable phosphor sheet is partitioned by a stimulating ray reflecting partition member, which extends in a thickness direction of the stimulable phosphor sheet, into a plurality of fine cells.

The present invention also provides a seventh radiation image read-out apparatus for carrying out the seventh radiation image read-out method in accordance with the present invention. Specifically, the present invention also provides a seventh radiation image read-out apparatus, comprising:

i) a line light source for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed linearly, iii) scanning means for moving the stimulable phosphor sheet with respect to the line light source and the line sensor, and iv) reading means for reading outputs of the photoelectric conversion devices constituting the line sensor, which outputs are obtained at respective positions of movement performed by the scanning means, wherein the stimulable phosphor sheet is capable of emitting light from front and back surfaces, two line sensors are utilized, each of which is located on one of the front and back surface sides of the stimulable phosphor sheet, the two line sensors detecting two image signals, each of which is made up of a series of image signal components representing pixels in the radiation image, from the front and back surfaces of the stimulable phosphor sheet, and the reading means performs operation processing on image signal components of the two image signals, which image signal components represent corresponding pixels on the front and back surfaces of the stimulable phosphor sheet.

In the seventh radiation image read-out apparatus in accordance with the present invention (and in eighth and ninth radiation image read-out apparatuses in accordance with the present invention, which will be described later), the line sensor may comprise the plurality of the photoelectric conversion devices arrayed along only the length direction (i.e., the major axis direction). Alternatively, as in the first radiation image read-out apparatus in accordance with the present invention, the line sensor may comprise the plurality of the photoelectric conversion devices arrayed along each of the major axis direction and the minor axis direction, which is normal to the major axis direction.

The present invention further provides an eighth radiation image read-out apparatus for carrying out the eighth radiation image read-out method in accordance with the present invention. Specifically, the present invention further provides an eighth radiation image read-out apparatus, comprising:

i) a line light source for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed linearly, iii) scanning means for moving the stimulable phosphor sheet with respect to the line light source and the line sensor, and iv) reading means for reading outputs of the photoelectric conversion devices constituting the line sensor, which outputs are obtained at respective positions of movement performed by the scanning means, wherein the stimulable phosphor sheet is capable of emitting light from front and back surfaces, the apparatus further comprises sensor shifting means for operating such that, after detection of the emitted light from one of the front and back surfaces of the stimulable phosphor sheet has been finished, the sensor shifting means shifts the line sensor to the opposite surface side of the stimulable phosphor sheet, the line sensor thereby detecting two image signals, each of which is made up of a series of image signal components representing pixels in the radiation image, from the front and back surfaces of the stimulable phosphor sheet, and the reading means performs operation processing on image signal components of the two image signals, which image signal components represent corresponding pixels on the front and back surfaces of the stimulable phosphor sheet.

In the eighth radiation image read-out apparatus in accordance with the present invention, the sensor shifting means may shift both the line sensor and the line light source to the opposite surface side of the stimulable phosphor sheet.

The present invention still further provides a ninth radiation image read-out apparatus for carrying out the ninth radiation image read-out method in accordance with the present invention. Specifically, the present invention still further provides a ninth radiation image read-out apparatus, comprising:

i) a line light source for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed linearly, iii) scanning means for moving the stimulable phosphor sheet with respect to the line light source and the line sensor, and iv) reading means for reading outputs of the photoelectric conversion devices constituting the line sensor, which outputs are obtained at respective positions of movement performed by the scanning means, wherein the stimulable phosphor sheet is capable of emitting light from front and back surfaces, the apparatus further comprises sheet reversing means for operating such that, after detection of the emitted light from one of the front and back surfaces of the stimulable phosphor sheet has been finished, the sheet reversing means reverses the front and back surfaces of the stimulable phosphor sheet, the line sensor thereby detecting two image signals, each of which is made up of a series of image signal components representing pixels in the radiation image, from the front and back surfaces of the stimulable phosphor sheet, and the reading means performs operation processing on image signal components of the two image signals, which image signal components represent corresponding pixels on the front and back surfaces of the stimulable phosphor sheet.

In the seventh, eighth, and ninth radiation image read-out apparatuses in accordance with the present invention, in cases where the line light source and the line sensor are located on the same surface side of the stimulable phosphor sheet, from the point of view of keeping the size of the radiation image read-out apparatus small, at least part of the optical path of the stimulating rays from the line light source to the stimulable phosphor sheet and at least part of the optical path of the emitted light from the stimulable phosphor sheet to the line sensor should preferably overlap each other.

The present invention also provides a tenth radiation image read-out apparatus for carrying out the tenth radiation image read-out method in accordance with the present invention. Specifically, the present invention also provides a tenth radiation image read-out apparatus, comprising:

i) a line light source for linearly irradiating stimulating rays onto an area of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed linearly, iii) scanning means for moving the stimulable phosphor sheet with respect to the line light source and the line sensor, and iv) reading means for reading outputs of the photoelectric conversion devices constituting the line sensor, which outputs are obtained at respective positions of movement performed by the scanning means, wherein the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface, two line sensors are utilized, each of which is located on one of the front and back surface sides of the stimulable phosphor sheet, the two line sensors detecting two image signals, each of which is made up of a series of image signal components representing pixels in the radiation image, from the front and back surfaces of the stimulable phosphor sheet, and the reading means is provided with means for performing a subtraction process on image signal components of the two image signals, which image signal components represent corresponding pixels on the front and back surfaces of the stimulable phosphor sheet.

In the tenth radiation image read-out apparatus in accordance with the present invention (and in eleventh and twelfth radiation image read-out apparatuses in accordance with the present invention, which will be described later), the line sensor may comprise the plurality of the photoelectric conversion devices arrayed along only the length direction (i.e., the major axis direction). Alternatively, as in the first radiation image read-out apparatus in accordance with the present invention, the line sensor may comprise the plurality of the photoelectric conversion devices arrayed along each of the major axis direction and the minor axis direction, which is normal to the major axis direction.

The present invention further provides an eleventh radiation image read-out apparatus for carrying out the eleventh radiation image read-out method in accordance with the present invention. Specifically, the present invention further provides an eleventh radiation image read-out apparatus, comprising:

i) a line light source for linearly irradiating stimulating rays onto an area of-a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed linearly, iii) scanning means for moving the stimulable phosphor sheet with respect to the line light source and the line sensor, and iv) reading means for reading outputs of the photoelectric conversion devices constituting the line sensor, which outputs are obtained at respective positions of movement performed by the scanning means, wherein the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface, the apparatus further comprises sensor shifting means for operating such that, after detection of the emitted light from one of the front and back surfaces of the stimulable phosphor sheet has been finished, the sensor shifting means shifts the line sensor to the opposite surface side of the stimulable phosphor sheet, the line sensor thereby detecting two image signals, each of which is made up of a series of image signal components representing pixels in the radiation image, from the front and back surfaces of the stimulable phosphor sheet, and the reading means is provided with means for performing a subtraction process on image signal components of the two image signals, which image signal components represent corresponding pixels on the front and back surfaces of the stimulable phosphor sheet.

In the eleventh radiation image read-out apparatus in accordance with the present invention, the sensor shifting means may shift both the line sensor and the line light source to the opposite surface side of the stimulable phosphor sheet.

The present invention still further provides a twelfth radiation image read-out apparatus for carrying out the twelfth radiation image read-out method in accordance with the present invention. Specifically, the present invention still further provides a twelfth radiation image read-out apparatus, comprising:

i) a line light source for linearly irradiating stimulating rays onto a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the stimulable phosphor sheet exposed to the linear stimulating rays, and performing photoelectric conversion of the received light, the line sensor comprising a plurality of photoelectric conversion devices arrayed linearly, iii) scanning means for moving the stimulable phosphor sheet with respect to the line light source and the line sensor, and iv) reading means for reading outputs of the photoelectric conversion devices constituting the line sensor, which outputs are obtained at respective positions of movement performed by the scanning means, wherein the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface, the apparatus further comprises sheet reversing means for operating such that, after detection of the emitted light from one of the front and back surfaces of the stimulable phosphor sheet has been finished, the sheet reversing means reverses the front and back surfaces of the stimulable phosphor sheet, the line sensor thereby detecting two image signals, each of which is made up of a series of image signal components representing pixels in the radiation image, from the front and back surfaces of the stimulable phosphor sheet, and the reading means is provided with means for performing a subtraction process on image signal components of the two image signals, which image signal components represent corresponding pixels on the front and back surfaces of the stimulable phosphor sheet.

In the tenth, eleventh, and twelfth radiation image read-out apparatuses in accordance with the present invention, in cases where the line light source and the line sensor are located on the same surface side of the stimulable phosphor sheet, from the point of view of keeping the size of the radiation image read-out apparatus small, at least part of the optical path of the stimulating rays from the line light source to the stimulable phosphor sheet and at least part of the optical path of the emitted light from the stimulable phosphor sheet to the line sensor should preferably overlap each other.

The present invention also provides a thirteenth radiation image read-out apparatus for carrying out the thirteenth radiation image read-out method in accordance with the present invention. Specifically, the present invention also provides a thirteenth radiation image read-out apparatus, comprising:

i) a surface light source for irradiating stimulating rays onto a front surface of a stimulable phosphor sheet, on which a radiation image has been stored, the stimulating rays causing the stimulable phosphor sheet to emit light in proportion to an amount of energy stored thereon during its exposure to radiation, ii) an area sensor for receiving light, which is emitted from the area of the front surface of the stimulable phosphor sheet exposed to the stimulating rays or from an area of a back surface of the stimulable phosphor sheet corresponding to the area of the front surface of the stimulable phosphor sheet, and performing photoelectric conversion of the received light, the area sensor comprising a plurality of arrayed photoelectric conversion devices, and iii) reading means for reading outputs of the photoelectric conversion devices constituting the area sensor, wherein the area sensor is a back illuminated type of CCD image sensor.

The present invention further provides a fourteenth radiation image read-out apparatus for carrying out the fourteenth image read-out method in accordance with the present invention. Specifically, the present invention further provides a fourteenth radiation image read-out apparatus, comprising:

i) a line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, and performing photoelectric conversion of the received light, the line sensor comprising a plurality of arrayed photoelectric conversion devices, iii) scanning means for moving the stimulable phosphor sheet with respect to the line light source and the line sensor and in a direction different from a length direction of the linear area of the stimulable phosphor sheet, and iv) reading means for successively reading outputs of the photoelectric conversion devices of the line sensor in accordance with the movement, wherein the line sensor is a back illuminated type of CCD image sensor.

In the fourteenth radiation image read-out apparatus in accordance with the present invention, as in the first radiation image read-out apparatus in accordance with the present invention, the back illuminated type of CCD image sensor may comprise the plurality of the photoelectric conversion devices arrayed along each of the length direction of the linear area of the stimulable phosphor sheet and the direction, which is normal to the length direction.

The thirteenth and fourteenth radiation image read-out apparatuses in accordance with the present invention should preferably further comprise cooling means for cooling the back illuminated type of CCD image sensor.

As the cooling means for cooling the back illuminated type of CCD image sensor, means utilizing a Peltier device, or the like, may be employed.

The back illuminated-type of CCD image sensor should preferably be produced by arraying a plurality of back illuminated type of CCD image sensor chips. For example, in cases where the back illuminated type of CCD image sensor is employed as the line sensor, the back illuminated type of CCD image sensor may comprise a plurality of back illuminated type of CCD image sensor chips arrayed in a straight line or in a zigzag pattern along the length direction of the linear area of the stimulable phosphor sheet. Each of the back illuminated type of CCD image sensor chips may comprise a plurality of photoelectric conversion devices arrayed in two-dimensional directions and in a matrix-like pattern or in a zigzag pattern.

The line sensor employed in the fourteenth radiation image read-out apparatus in accordance with the present invention may comprise the plurality of the photoelectric conversion devices arrayed along only the length direction (i.e., the major axis direction). Alternatively, as in the first radiation image read-out apparatus in accordance with the present invention, the line sensor may comprise the plurality of the photoelectric conversion devices arrayed along each of the major axis direction and the minor axis direction, which is normal to the major axis direction.

In the fourteenth radiation image read-out apparatus in accordance with the present invention, as in the first radiation image read-out apparatus in accordance with the present invention, the line sensor may comprise the plurality of the photoelectric conversion devices arrayed along each of the major axis direction of the linear area of the stimulable phosphor sheet and the minor axis direction normal to the major axis direction, and the reading means may be provided with operation means for performing operation processing on the outputs of the photoelectric conversion devices, which outputs have been obtained at respective positions of movement performed by the scanning means and correspond to an identical site on the stimulable phosphor sheet.

The present invention still further provides a fifteenth radiation image read-out apparatus for carrying out the fifteenth radiation image read-out method in accordance with the present invention. Specifically, the present invention still further provides a fifteenth radiation image read-out apparatus, comprising:

i) a line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, and performing photoelectric conversion of the received light, the line sensor comprising a plurality of arrayed photoelectric conversion devices, iii) scanning means for moving the stimulable phosphor sheet with respect to the line light source and the line sensor and in a direction different from a length direction of the linear area of the stimulable phosphor sheet, and iv) reading means for successively reading outputs of the photoelectric conversion devices of the line sensor in accordance with the movement, wherein the line light source is constituted of an organic EL device.

The present invention also provides a sixteenth radiation image read-out apparatus for carrying out the sixteenth radiation image read-out method in accordance with the present invention. Specifically, the present invention also provides a sixteenth radiation image read-out apparatus, comprising:

i) a surface light source for irradiating stimulating rays onto a front surface of a stimulable phosphor sheet, on which a radiation image has been stored, the stimulating rays causing the stimulable phosphor sheet to emit light in proportion to an amount of energy stored thereon during its exposure to radiation, ii) an area sensor for receiving light, which is emitted from the area of the front surface of the stimulable phosphor sheet exposed to the stimulating rays or from an area of a back surface of the stimulable phosphor sheet corresponding to the area of the front surface of the stimulable phosphor sheet, and performing photoelectric conversion of the received light, the area sensor comprising a plurality of arrayed photoelectric conversion devices, and iii) reading means for reading outputs of the photoelectric conversion devices constituting the area sensor, wherein the surface light source is constituted of an organic EL device.

The line sensor employed in the fifteenth radiation image read-out apparatus in accordance with the present invention may comprise the plurality of the photoelectric conversion devices arrayed along only the length direction (i.e., the major axis direction). Alternatively, as in the first radiation image read-out apparatus in accordance with the present invention, the line sensor may comprise the plurality of the photoelectric conversion devices arrayed along each of the major axis direction and the minor axis direction, which is normal to the major axis direction.

In the fifteenth radiation image read-out apparatus in accordance with the present invention, as in the first radiation image read-out apparatus in accordance with the present invention, the line sensor may comprise the plurality of the photoelectric conversion devices arrayed along each of the major axis direction of the linear area of the stimulable phosphor sheet and the minor axis direction normal to the major axis direction, and the reading means may be provided with operation means for performing operation processing on the outputs of the photoelectric conversion devices, which outputs have been obtained at respective positions of movement performed by the scanning means and correspond to an identical site on the stimulable phosphor sheet.

The present invention further provides a seventeenth radiation image read-out apparatus for carrying out the seventeenth radiation image read-out method in accordance with the present invention. Specifically, the present invention further provides a seventeenth radiation image read-out apparatus, comprising:

i) line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the front surface of the stimulable phosphor sheet exposed to the linear stimulating rays or from a linear area of a back surface of the stimulable phosphor sheet corresponding to the linear area of the front surface of the stimulable phosphor sheet, and performing photoelectric conversion of the received light, the line sensor comprising a plurality of arrayed photoelectric conversion devices, iii) a light guiding optical system for guiding the emitted light, the light guiding optical system being located between the stimulable phosphor sheet and the line sensor, and iv) scanning means for moving the stimulable phosphor sheet with respect to the line light source, the light guiding optical system, and the line sensor and in a direction different from a length direction of the linear area of the stimulable phosphor sheet, wherein the light guiding optical system has been subjected to coloring for transmitting only the emitted light and filtering out the stimulating rays.

With the first radiation image read-out method and apparatus in accordance with the present invention, the line sensor comprises the plurality of the photoelectric conversion devices arrayed along each of the length direction of the linear light emitted by the stimulable phosphor sheet and the direction normal to the length direction. Therefore, if the light receiving width of each photoelectric conversion device is smaller than the line width of the light emitted by the stimulable phosphor sheet (i.e., the line width on the light receiving surface of the photoelectric conversion device), the line sensor as a whole can receive the emitted light over approximately the entire line width of the emitted light. As a result, the light receiving efficiency can be enhanced. Also, the operation means performs the operation processing, such as addition processing, on the outputs of the photoelectric conversion devices, which outputs have been obtained at respective positions of movement of the stimulable phosphor sheet or the line sensor performed by the scanning means and which correspond to an identical site on the stimulable phosphor sheet. In this manner, the light collecting efficiency at each site on the stimulable phosphor sheet can be enhanced. Further, since the light receiving width of each photoelectric conversion device is not set to be large for an increase in the light receiving size, the resolution does not become low, and a desired level of resolution can be obtained.

Furthermore, in cases where the line sensor is produced by arraying a plurality of sensor chips, it can be produced with a simple production process, the yield of the products in the production process can be enhanced, and the cost can be kept low. Particularly, in cases where the sensor chips are arrayed in a zigzag pattern, free regions which are not occupied by sensor chips can be formed in the line sensor, and electric circuits for pixel shift compensation and other elements can be located at the free regions.

In the first radiation image read-out method and apparatus (and the second to twelfth radiation image read-out methods and apparatuses) in accordance with the present invention, the line sensor is employed as the photoelectric read-out means. Therefore, the advantages over conventional radiation image read-out methods and apparatuses utilizing photoelectric read-out means other than the line sensor can be obtained in that the time required to detect the emitted light can be kept short, the apparatus size can be reduced, and the cost can be kept low due to reduction in mechanical scanning optical parts, and the like.

With the second radiation image read-out method and apparatus in accordance with the present invention, the linear laser beam, which is coherent light, is irradiated from the broad area laser to the stimulable phosphor sheet, and the radiation image stored on the stimulable phosphor sheet is thereby read out. Therefore, the second radiation image read-out method and apparatus in accordance with the present invention are advantageous over radiation image read-out methods and apparatuses utilizing a fluorescent lamp, a cold cathode fluorescent lamp, or an LED array as the light source in that the directivity of the stimulating rays is high, the intensity of the stimulating rays is high, and therefore high stimulation energy can be imparted to the stimulable phosphor sheet. As a result, an image having a high signal-to-noise ratio can be obtained.

With the second radiation image read-out method and apparatus in accordance with the present invention, wherein the line sensor comprises the plurality of the photoelectric conversion devices arrayed along each of the length direction of the linear light emitted by the stimulable phosphor sheet and the direction normal to the length direction, the same effects as those with the first radiation image read-out method and apparatus in accordance with the present invention can be obtained.

With the third and fourth radiation image read-out methods and apparatuses in accordance with the present invention, wherein at least part of the optical path of the stimulating rays and at least part of the optical path of the emitted light overlap each other, the space occupied by the optical paths can be reduced, and the size of the entire radiation image read-out apparatus can be reduced. In cases where the overlapping of the optical paths is achieved by utilizing at least part of optical elements, which constitute the stimulating ray guiding means, and at least part of optical elements, which constitute the emitted light guiding means, in common with each other, at least part of the optical elements of the stimulating ray guiding means and the emitted light guiding means can be omitted. Therefore, the cost can be kept low.

With the fourth radiation image read-out method and apparatus in accordance with the present invention, wherein the line sensor comprises the plurality of the photoelectric conversion devices arrayed along each of the length direction of the linear light emitted by the stimulable phosphor sheet and the direction normal to the length direction, the same effects as those with the first radiation image read-out method and apparatus in accordance with the present invention can be obtained.

With the fifth and sixth radiation image read-out methods and apparatuses in accordance with the present invention, wherein the light emission region of the stimulable phosphor sheet is partitioned by the stimulating ray reflecting partition member into a plurality of fine cells, the stimulating rays impinging upon the predetermined area (the linear area) of the stimulable phosphor sheet can be prevented from scattering boundlessly beyond the fine cells in the stimulable phosphor sheet. Therefore, the light is emitted from only the line width area approximately identical with the linear area upon which the stimulating rays impinge. Accordingly, the light collecting efficiency of the line sensor can be enhanced without the desired resolution becoming low.

Also, the emitted light occurs in units of fine cells, and therefore the sharpness of the image reproduced from an image signal having been obtained from the photoelectric conversion can be enhanced.

With the sixth radiation image read-out method and apparatus in accordance with the present invention, as in the first radiation image read-out method and apparatus in accordance with the present invention, the line sensor comprises the plurality of the photoelectric conversion devices arrayed along each of the length direction of the linear light emitted by the stimulable phosphor sheet and the direction normal to the length direction, and the operation processing is performed on the outputs of the photoelectric conversion devices, which outputs have been obtained at respective positions of movement and correspond to an identical site on the stimulable phosphor sheet. Therefore, in cases where the line width of the linear stimulating rays is larger than the width of each fine cell, the light simultaneously emitted from fine cells, which are adjacent to one another along the line width direction, is capable of being collected by corresponding rows of photoelectric conversion devices, and the light collecting efficiency can be enhanced by, for example, adding outputs of the photoelectric conversion devices. Also, in cases where the width of each photoelectric conversion device is smaller than the width of each fine cell, the emitted light scattering to the line width direction in a single fine cell is capable of being collected by several corresponding rows of photoelectric conversion devices. As a result, the resolution and the light collecting efficiency can be enhanced.

With the seventh, eighth, and ninth radiation image read-out methods and apparatuses in accordance with the present invention, image signals representing the radiation image having been stored on the stimulable phosphor sheet are detected from the front and back surfaces of the stimulable phosphor sheet, and the operation processing is performed on image signal components of the two image signals, which image signal components represent corresponding pixels on the front and back surfaces of the stimulable phosphor sheet. Therefore, noise occurring at random in the effective image storing region of the stimulable phosphor sheet can be reduced markedly, and slight differences in radiation absorptivity of an object can be illustrated clearly in the ultimately reproduced image, i.e., the detection capability can be enhanced markedly.

Also, with the seventh, eighth, and ninth radiation image read-out methods and apparatuses in accordance with the present invention, wherein the line sensor comprises a plurality of rows of photoelectric conversion devices as in the first radiation image read-out method and apparatus in accordance with the present invention, if the light receiving width of each photoelectric conversion device (i.e., the width taken along the minor axis direction of the line sensor) is smaller than the line width of the light emitted by the stimulable phosphor sheet, the line sensor as a whole can receive the emitted light over approximately the entire line width of the emitted light. As a result, the light receiving efficiency can be enhanced.

With the tenth, eleventh, and twelfth radiation image read-out methods and apparatuses in accordance with the present invention, the stimulable phosphor sheet is a stimulable phosphor sheet for energy subtraction processing, which stores two radiation images of a single object formed with radiation having different energy distributions, the stimulable phosphor sheet being capable of emitting light, which carries information of one of the two radiation images, from the front surface, and emitting light, which carries information of the other radiation image, from the back surface. Two image signals are detected from the front and back surfaces of the stimulable phosphor sheet by utilizing the line sensor. The subtraction process is then performed on image signal components of the two image signals, which image signal components represent corresponding pixels on the front and back surfaces of the stimulable phosphor sheet. In this manner, a subtraction image, in which only the pattern of a specific tissue or structure embedded in the radiation image has been enhanced or extracted, can be obtained easily.

Also, with the tenth, eleventh, and twelfth radiation image read-out methods and apparatuses in accordance with the present invention, wherein the line sensor comprises a plurality of rows of photoelectric conversion devices as in the first radiation image read-out method and apparatus in accordance with the present invention, if the light receiving width of each photoelectric conversion device (i.e., the width taken along the minor axis direction of the line sensor) is smaller than the line width of the light emitted by the stimulable phosphor sheet, the line sensor as a whole can receive the emitted light over approximately the entire line width of the emitted light. As a result, the light receiving efficiency can be enhanced.

With the thirteenth and fourteenth radiation image read-out methods and apparatuses in accordance with the present invention, the radiation image having been stored on the stimulable phosphor sheet is read out by utilizing the back illuminated type of CCD image sensor having a high quantum efficiency. Therefore, it is possible to obtain an image signal having a higher level than with the ordinarily utilized front illuminated type of CCD image sensor. As a result, an image having good image quality with a high signal-to-noise ratio can be obtained. Also, the back illuminated type of CCD image sensor can perform light detection more quickly and more accurately than the front illuminated type of CCD image sensor, and therefore quick and accurate light detection as with a photomultiplier can be achieved.

The quantum efficiency of the back illuminated type of CCD image sensor is high over the ultraviolet to infrared region. Particularly, the back illuminated type of CCD image sensor has the characteristic features in that, in the ultraviolet to blue region, the quantum efficiency is markedly high (e.g., at least 50%). (In the ultraviolet to blue region, the quantum efficiency of the front illuminated type of CCD image sensor is approximately zero.) In cases where the back illuminated type of CCD image sensor is utilized in combination with, particularly, a stimulable phosphor sheet emitting blue light, the emitted light utilization efficiency can be enhanced markedly, and markedly large effects of obtaining images having good quality can be obtained.

In cases where the cooling means for cooling the back illuminated type of CCD image sensor is utilized, the dark output can be reduced, and an image having good image quality free from noise can be obtained.

With the fourteenth radiation image read-out method and apparatus in accordance with the present invention, wherein the line sensor comprises the plurality of the photoelectric conversion devices arrayed along each of the length direction of the linear light emitted by the stimulable phosphor sheet and the direction normal to the length direction, the same effects as those with the first radiation image read-out method and apparatus in accordance with the present invention can be obtained.

Further, in cases where the back illuminated type of CCD image sensor is produced by arraying a plurality of back illuminated type of CCD image sensor chips, the sensor can be produced with a simple production process, the yield of the products in the production process can be enhanced, and the cost can be kept low. Particularly, in cases where the back illuminated type of CCD image sensor chips are arrayed in a zigzag pattern, free regions which are not occupied by the chips can be formed in the sensor, and electric circuits for pixel shift compensation and other elements can be located at the free regions.

In the thirteenth and fourteenth radiation image read-out methods and apparatuses in accordance with the present invention, the area sensor or the line sensor is employed as the photoelectric read-out means, and light detection is performed with a single simultaneous detection or successively with respect to lines. Therefore, the advantages over conventional radiation image read-out methods and apparatuses utilizing photoelectric read-out means, such as a photomultiplier, other than the line sensor can be obtained in that the time required to detect the emitted light can be kept short, the apparatus size can be reduced, and the cost can be kept low due to reduction in mechanical scanning optical parts, and the like.

With the fifteenth and sixteenth radiation image read-out methods and apparatuses in accordance with the present invention, the radiation image stored on the stimulable phosphor sheet is read out by utilizing the stimulating ray source constituted of the organic EL device. Therefore, the fifteenth and sixteenth radiation image read-out methods and apparatuses in accordance with the present invention are advantageous over radiation image read-out methods and apparatuses utilizing a fluorescent lamp, a cold cathode fluorescent lamp, or an LED array as the light source in that the intensity of the stimulating rays is high, sufficiently high luminance can be obtained, and therefore high stimulation energy can be imparted to the stimulable phosphor sheet. As a result, an image having a high signal-to-noise ratio can be obtained.

In cases where the light source is constituted of the organic EL device, by the formation of the organic EL device in a line-like shape or a surface-like shape, the line-like or surface-like EL light beam having a desired size can be produced by the organic EL device, and an light expanding mechanism may not be provided. Also, the directivity of the stimulating rays can be enhanced. Particularly, in cases where the line light source is constituted of the organic EL device, the advantages over a broad area laser capable of producing a laser beam of high luminance can be obtained in that the line light source is compact (thin), cheap, and easy to process.

With the fifteenth radiation image read-out method and apparatus in accordance with the present invention, wherein the line sensor comprises the plurality of the photoelectric conversion devices arrayed along each of the length direction of the linear light emitted by the stimulable phosphor sheet and the direction normal to the length direction, the same effects as those with the first radiation image read-out method and apparatus in accordance with the present invention can be obtained.

In the fifteenth and sixteenth radiation image read-out methods and apparatuses in accordance with the present invention, the area sensor or the line sensor is employed as the photoelectric read-out means, and light detection is performed with a single simultaneous detection or successively with respect to lines. Therefore, the advantages over conventional radiation image read-out methods and apparatuses utilizing photoelectric read-out means, such as a photomultiplier, other than the line sensor can be obtained in that the time required to detect the emitted light can be kept short, the apparatus size can be reduced, and the cost can be kept low due to reduction in mechanical scanning optical parts, and the like.

With the seventeenth radiation image read-out method and apparatus in accordance with the present invention, the light guiding optical system, which is colored and thereby imparted with the filter functions for transmitting only the emitted light and filtering out the stimulating rays, is located between the line light source and the line sensor. Therefore, it is not necessary for a particular filter for filtering out the stimulating rays to be inserted into the optical system. As a result, the distance between the stimulable phosphor sheet and the light guiding optical system can be reduced, and the light emitted by the stimulable phosphor sheet can be collected with a large angular aperture (numerical aperture).

Accordingly, the intensity and the position of the emitted light can be detected with a high light collecting efficiency and high resolution. As a result, an image having high sharpness can be obtained from the thus detected image signal.

BRIEF DESCRIPTION OF THE DRAWINGS

FIG. 2 is an explanatory view showing a line sensor in the embodiment of FIG. 1A, FIGS. 3A and 3B are explanatory views showing relationship between a beam width of stimulating rays and a beam width of emitted light, FIGS. 4A, 4B, and 4C are explanatory views showing how the embodiment of FIG. 1A operates, FIG. 5 is a conceptual view showing memory regions in a memory of addition means, which correspond to sites on a stimulable phosphor sheet, FIGS. 7A and 7B are explanatory views showing different examples of arraying of photoelectric conversion devices constituting the line sensor in the embodiment of FIG. 1A, FIG. 8 is a sectional view showing a different embodiment of the first radiation image read-out apparatus in accordance with the present invention, FIGS. 10A, 10B, and 10C are explanatory views showing examples of CCD image sensors, which are constituted of a plurality of CCD image sensor chips and serve as the line sensors, FIGS. 10D, 10E, and 10F are explanatory views showing examples of arraying of photoelectric conversion devices constituting the CCD image sensor chips, FIGS. 10G, 10H, and 10I are explanatory views showing different examples of CCD image sensors, which are constituted of a plurality of CCD image sensor chips and serve as the line sensors, FIG. 13 is a sectional view showing an embodiment of the third radiation image read-out apparatus in accordance with the present invention, FIG. 18A is an explanatory view showing relationship between a beam width of stimulating rays and a beam width of emitted light in the embodiment of FIG. 15A, FIG. 18B is a graph showing an intensity distribution of the emitted light in the embodiment of FIG. 15A, FIG. 22 is a conceptual view showing memory regions in a memory of addition means, which correspond to sites on the stimulable phosphor sheet (fine cells in the stimulable phosphor sheet), FIG. 23 is an explanatory view showing relationship between a beam width of emitted light and a width of a line sensor in a different embodiment of the sixth radiation image read-out apparatus in accordance with the present invention, in which the line sensor comprises a plurality of rows of photoelectric conversion devices, FIG. 25 is a sectional view showing a still further different embodiment of the sixth radiation image read-out apparatus in accordance with the present invention, FIG. 26A is a perspective view showing an embodiment of the seventh radiation image read-out apparatus in accordance with the present invention, FIG. 26B is a sectional view taken on line I—I of FIG. 26A, FIG. 35 is a sectional view showing a different embodiment of the tenth radiation image read-out apparatus in accordance with the present invention, FIG. 40A is a perspective view showing an embodiment of the twelfth radiation image read-out apparatus in accordance with the present invention, FIG. 40B is a sectional view taken on line I—I of FIG. 40A, FIG. 41 is a graph showing typical spectral sensitivity characteristics of a back illuminated type of CCD image sensor, FIG. 42 is a graph showing typical dark output-temperature characteristics of the back illuminated type of CCD image sensor, FIGS. 43A, 43B, and 43C are explanatory views showing examples of back illuminated type of CCD image sensors, which are constituted of a plurality of back illuminated type of CCD image sensor chips and serve as the line sensors, FIGS. 43D, 43E, 43F, and 43G are explanatory views showing examples of arraying of photoelectric conversion devices constituting the back illuminated type of CCD image sensor chips, FIGS. 43H, 43I, and 43J are explanatory views showing different examples of back illuminated type of CCD image sensors, which are constituted of a plurality of back illuminated type of CCD image sensor chips and serve as the line sensors, FIG. 44 is a perspective view showing an embodiment of the seventeenth radiation image read-out apparatus in accordance with the present invention, FIG. 49 is a graph showing a wave form of a reference image signal.

DESCRIPTION OF THE PREFERRED EMBODIMENTS

The present invention will hereinbelow be described in further detail with reference to the accompanying drawings.

Figure 1A:
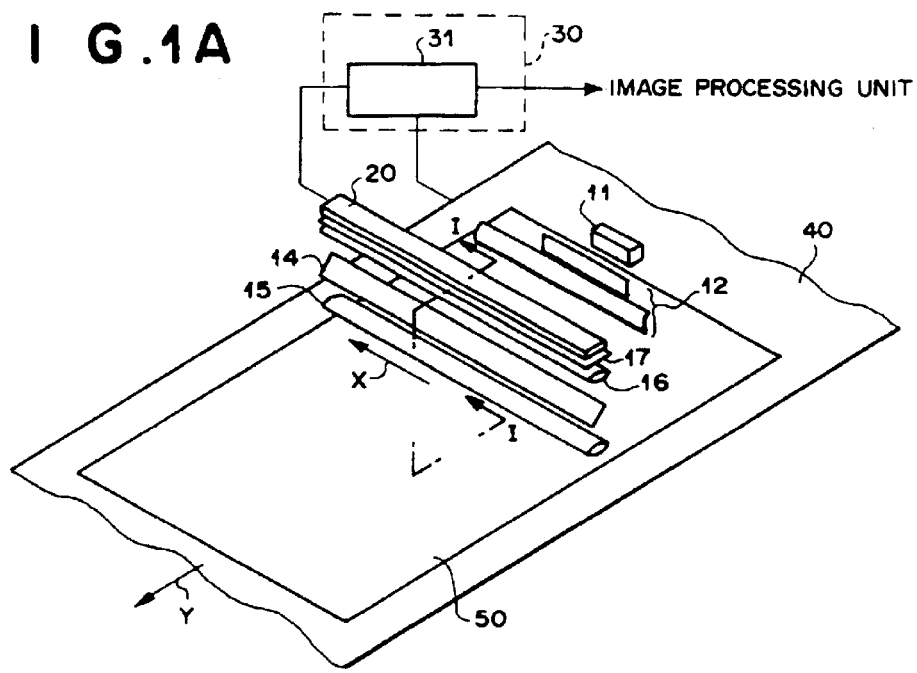
FIG. 1A is a perspective view showing an embodiment of the first radiation image read-out apparatus in accordance with the present invention.
Figure 1B:
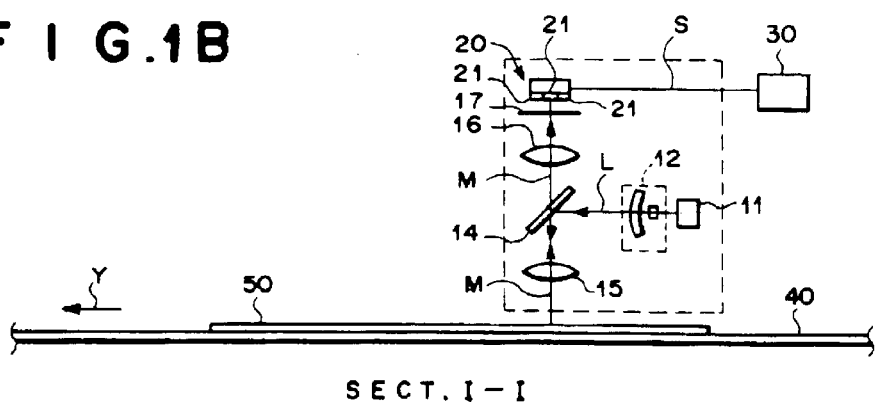
FIG. 1B is a sectional view taken on line I—I of FIG. 1A.

FIG. 1A is a perspective view showing an embodiment of the first radiation image read-out apparatus in accordance with the present invention. FIG. 1B is a sectional view taken on line I—I of FIG. 1A. FIG. 2 is an explanatory view showing a line sensor in the embodiment of FIG. 1A.

With reference to FIGS. 1A and 1B, the radiation image read-out apparatus comprises a scanning belt 40 for supporting a stimulable phosphor sheet (hereinbelow referred to simply as the sheet) 50, on which a radiation image has been stored, and conveying the sheet 50 in the direction indicated by the arrow Y. The radiation image read-out apparatus also comprises a broad area laser (hereinbelow referred to as the BLD) 11 for radiating out secondary stimulating rays (hereinbelow referred to simply as the stimulating rays) L having a linear pattern with a line width of approximately 100 μm. The stimulating rays L are radiated out approximately in parallel with the front surface of the sheet 50. The radiation image read-out apparatus further comprises an optical system 12, which is constituted of a combination of a collimator lens for collimating the linear stimulating rays L having been radiated out of the BLD 11 and a toric lens for expanding the beam only in one direction. The radiation image read-out apparatus still further comprises a dichroic mirror 14, which is located at an angle of 45 degrees with respect to the front surface of the sheet 50 and which is set so as to reflect the stimulating rays L and to transmit emitted light M described later. The radiation image read-out apparatus also comprises a distributed index lens array (constituted of an array of a plurality of distributed index lenses and hereinbelow referred to as the first SELFOC lens array) 15. The first SELFOC lens array 15 converges the linear stimulating rays L, which have been reflected from the dichroic mirror 14, into a linear beam (having a line width of approximately 100 μm) extending along the direction indicated by the arrow X on the sheet 50. Also, the first SELFOC lens array 15 collimates the emitted M, which is emitted by the sheet 50 exposed to the linear stimulating rays L and which carries image information of the radiation image stored on the sheet 50. The radiation image read-out apparatus further comprises a second SELFOC lens array 16 for converging the emitted light M, which has been collimated by the first SELFOC lens array 15 and has then passed through the dichroic mirror 14, onto light receiving surfaces of photoelectric conversion devices 21, 21, . . . constituting a line sensor 20, which will be described later. The radiation image read-out apparatus still further comprises a stimulating ray cut-off filter 17 for transmitting only the emitted light M and filtering out the stimulating rays L, which have been reflected from the front surface of the sheet 50 and which are mixed slightly in the emitted light M having passed through the second SELFOC lens array 16. The radiation image read-out apparatus also comprises the line sensor 20, which is constituted of a plurality of photoelectric conversion devices 21, 21, . . . for receiving the emitted light M having passed through the stimulating ray cut-off filter 17 and for photoelectrically converting the emitted light M. The radiation image read-out apparatus further comprises image information reading means 30. The image information reading means 30 is provided with addition means 31 for performing addition processing on outputs of the photoelectric conversion devices 21, 21, . . . constituting the line sensor 20, which outputs correspond to an identical site on the sheet 50. The image information reading means 30 feeds out an image signal having been obtained from the addition processing.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the photoelectric conversion devices 21, 21, . . .

The optical system 12, which is constituted of the collimator lens and the toric lens, expands the stimulating rays L, which come from the BLD 11, into a desired irradiation area on the dichroic mirror 14.

As illustrated in FIG. 2, the line sensor 20 comprises a plurality of (e.g., at least 1,000 pieces of) photoelectric conversion devices 21, 21, . . . arrayed in each row along the direction indicated by the double-headed arrow X. Three such rows of the photoelectric conversion devices 21, 21, . . . extending in the direction indicated by the double-headed arrow X stand side by side in the direction of conveyance of the sheet 50 (i.e., in the direction indicated by the arrow Y). Each of the photoelectric conversion devices 21, 21, . . . constituting the line sensor 20 has the light receiving surface having a size of approximately 100 μm×100 μm. The size of each light receiving surface is the size capable of receiving the emitted light M occurring from part having a size of approximately 100 μm×100 μm on the surface of the sheet 50. As the photoelectric conversion devices 21, 21, . . . , amorphous silicon sensors, CCD image sensors, MOS image sensors, or the like, may be employed.

How this embodiment of the first radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the addition means 31.

Figure 3A:
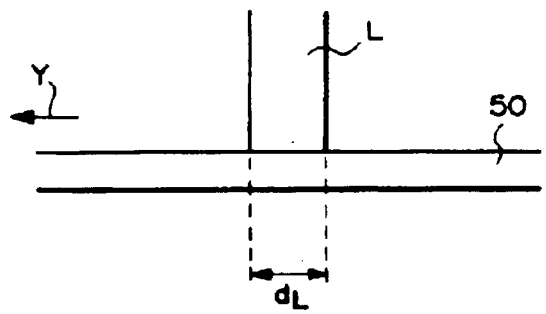
FIG. 3C is a graph showing an intensity distribution of the emitted light along the beam width direction.

The BLD 11 radiates out the stimulating rays L having a linear pattern with a line width of approximately 100 μm. The stimulating rays L are radiated out approximately in parallel with the front surface of the sheet 50. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the front surface of the sheet 50. As illustrated in FIG. 3A, the reflected stimulating rays L are converged by the first SELFOC lens array 15 into a linear beam (having a line width $d_L$ of approximately 100 μm) extending along the direction indicated by the arrow X on the sheet 50.

Figure 3B:
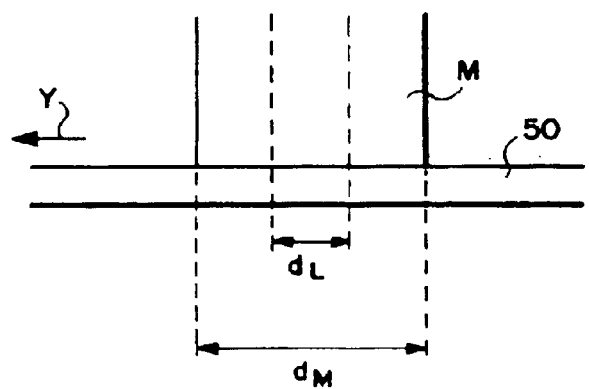
Figure 3C:
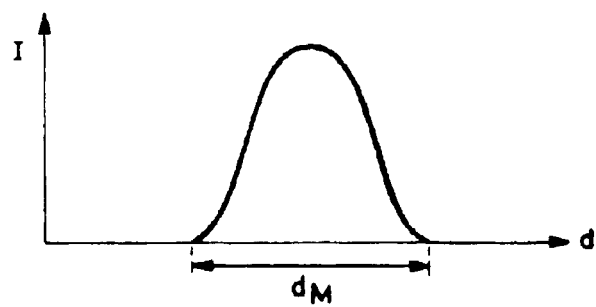
Figure 6A:
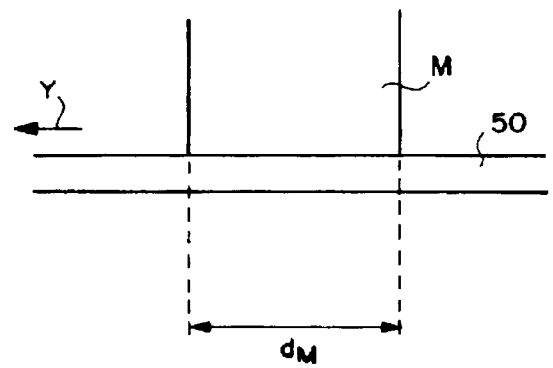
FIGS. 6A, 6B, and 6C are explanatory views showing relationship between a beam width of emitted light and one of photoelectric conversion devices constituting a conventional line sensor.
Figure 6B:
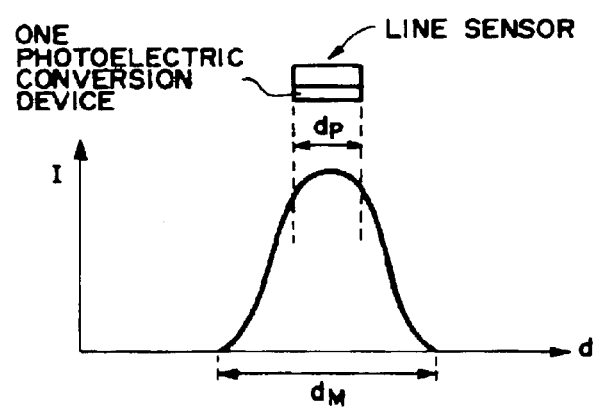
Figure 6C:
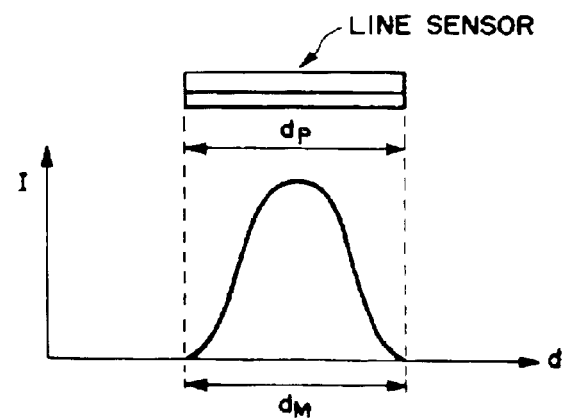

As illustrated in FIG. 3B, the linear stimulating rays L impinging upon the sheet 50 stimulate the stimulable phosphor at the exposed area (having a line width $d_L$ of approximately 100 μm). The stimulating rays L also enter into the sheet 50 from the exposed area, are scattered to the areas neighboring with the exposed area, and stimulate the stimulable phosphor at the neighboring areas. In this manner, the stimulable phosphor at the area (having a line width $d_M$) containing the exposed area and the neighboring areas is stimulated. As a result, the light M carrying the image information stored on the sheet 50 is emitted from the area (having a line width $d_M$) containing the exposed area and the neighboring areas. The emitted light M has an intensity distribution along the line width direction shown in FIG. 3C.

The light M emitted from the area of the sheet 50 having the line width $d_M$ is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 20. At this time, the stimulating rays L, which have been reflected from the front surface of the sheet 50 and are mixed slightly in the emitted light M having passed through the second SELFOC lens array 16, are filtered out by the stimulating ray cut-off filter 17.

As illustrated in FIG. 2, the relationship between the size of each photoelectric conversion device 21 and the distribution of the emitted light M on the light receiving surface of the line sensor 20 is set such that the line width $d_M$ of the emitted light M on the surface of the sheet 50 may correspond to the total width (of approximately 300 μm) of the three rows of the photoelectric conversion devices 21, 21, . . . standing side by side in the direction indicated by the arrow Y.

The line sensor 20 photoelectrically converts the emitted light M, which has been received by each of the photoelectric conversion devices 21, 21, . . . , and obtains signal components Q, Q, . . . from the photoelectric conversion devices 21, 21, . . . . An image signal made up of the signal components Q, Q, . . . is represented by S in FIG. 1B.

In accordance with the movement speed of the scanning belt 40, the addition means 31 cumulates and stores the signal components Q, Q, . . . , which have been received from the photoelectric conversion devices 21, 21, . . . , in memory regions corresponding to respective sites on the sheet 50.

How the signal components Q, Q, . . . are cumulated and stored will hereinbelow be described in detail with reference to FIGS. 4A, 4B, 4C, and FIG. 5. In this embodiment, as an aid in facilitating the explanation, the optical systems located between the sheet 50 and the line sensor 20 are set such that the line width $d_M$ of the emitted light M on the surface of the sheet 50 and the line width $d_M$ of the emitted light M on the receiving surface of the line sensor 20 may coincide with each other. However, the first radiation image read-out apparatus in accordance with the present invention is not limited to the cases wherein the line width $d_M$ of the emitted light M on the surface of the sheet 50 and the line width $d_M$ of the emitted light M on the receiving surface of the line sensor 20 coincide with each other. The size of each of the photoelectric conversion devices 21, 21, . . . constituting the line sensor 20 and the number of the rows of the photoelectric conversion devices 21, 21, . . . standing side by side along the line width direction may be set in accordance with the correspondence relationship between the line width $d_M$ of the emitted light M on the surface of the sheet 50 and the line width $d_M$ of the emitted light M on the receiving surface of the line sensor 20.

Firstly, as illustrated in FIG. 4A, in cases where the stimulating rays L are converged onto a site S1 at the leading end of the sheet 50, as viewed in the conveyance direction of the sheet 50 (indicated by the arrow Y), the light M having the intensity distribution shown in FIG. 4A is emitted from the leading end site S1 and a neighboring site S2 on the sheet 50 due to the spread of the stimulating rays L. The light quantity of the light M emitted from the site S1 on the sheet 50 is equal to Q2. The emitted light M of the light quantity Q2 is received by a photoelectric conversion device 21, which belongs to a photoelectric conversion device row 20B shown in FIG. 2 and which corresponds to the site S1 on the sheet 50. The light quantity of the light M emitted from the site S2 on the sheet 50 is equal to Q3. The emitted light M of the light quantity Q3 is received by a photoelectric conversion device 21, which belongs to a photoelectric conversion device row 20C and which corresponds to the site S2 on the sheet 50.

The photoelectric conversion device 21 of the row 20B photoelectrically converts the emitted light M of the light quantity Q2 into an electric charge Q'2 and transfers the electric charge Q'2 into the addition means 31. As illustrated in FIG. 5, in accordance with the scanning speed of the scanning belt 40, the addition means 31 stores information representing the electric charge Q'2, which has been received from the photoelectric conversion device 21 of the row 20B, in a memory region corresponding to the site S1 on the sheet 50. Also, the photoelectric conversion device 21 of the row 20C photoelectrically converts the emitted light M of the light quantity Q3 into an electric charge Q'3 and transfers the electric charge Q'3 into the addition means 31. The addition means 31 stores the information representing the electric charge Q'3 in a memory region corresponding to the site S2 on the sheet 50.

Thereafter, as illustrated in FIG. 4B, the sheet 50 is conveyed, and the stimulating rays L are converged onto the site S2 on the sheet 50. In this state, as described above, the light M is emitted from the site S2 and the neighboring sites S1 and S3 on the sheet 50. The light M of a light quantity Q4 is emitted from the site S1, the light M of a light quantity Q5 is emitted from the site S2, and the light M of a light quantity Q6 is emitted from the site S3. The emitted light M is received by the corresponding photoelectric conversion device 21 of the row 20A, the corresponding photoelectric conversion device 21 of the row 20B, and the corresponding photoelectric conversion device 21 of the row 20C.

The photoelectric conversion device 21 of the row 20A, the photoelectric conversion device 21 of the row 20B, and the photoelectric conversion device 21 of the row 20C convert the emitted light M into electric charges Q'4, Q'5, and Q'6 and transfer them into the addition means 31.

In accordance with the scanning speed of the scanning belt 40, the addition means 31 stores pieces of information representing the electric charges Q'4, Q'5, and Q'6, which have been received respectively from the photoelectric conversion device 21 of the row 20A, the photoelectric conversion device 21 of the row 20B, and the photoelectric conversion device 21 of the row 20C, in memory regions corresponding to the sites S1, S2, and S3 on the sheet 50. In the memory region corresponding to the site S1, the value of the electric charge Q'4 is added to the previously stored value of the electric charge Q'2. Also, in the memory region corresponding to the site S2, the value of the electric charge Q'5 is added to the previously stored value of the electric charge Q'3.

As illustrated in FIG. 4C, the sheet 50 is then conveyed, and the stimulating rays L are converged onto the site S3 on the sheet 50. In this state, in the same manner as that described above, pieces of information representing electric charges Q'7, Q'8, and Q'9, which have been received respectively from the photoelectric conversion device 21 of the row 20A, the photoelectric conversion device 21 of the row 20B, and the photoelectric conversion device 21 of the row 20C, are stored in the memory regions corresponding to the sites S2, S3, and S4 on the sheet 50 and added to the previous stored values.

The operation described above is iterated at respective positions of conveyance of the sheet 50. In this manner, as illustrated in FIG. 5, the total sum of the emitted light M having been received at the respective positions of conveyance of the sheet 50 is stored in the memory region of the addition means 31 corresponding to each site on the sheet 50.

The image signal having thus been stored in the memory is fed from the image information reading means 30 into an external image processing unit, or the like, and utilized for reproducing a visible image for diagnosis, or the like.

As described above, with the embodiment of the first radiation image read-out apparatus in accordance with the present invention, wherein the photoelectric conversion devices 21, 21, . . . each having a light receiving width $d_P$ ($<d_M$) shorter than the line width $d_M$ of the emitted light M (i.e., the line width on the light receiving surface of each photoelectric conversion device) are employed, a desired level of resolution can be obtained, and the line sensor 20 as a whole can receive the emitted light M over approximately the entire line width of the emitted light. Therefore, the light receiving efficiency can be enhanced. Also, the addition means 31 performs the addition processing on the outputs of the photoelectric conversion devices 21, 21, . . . constituting the line sensor 20, which outputs have been obtained at respective positions of sheet movement performed by the scanning belt 40 and which outputs correspond to an identical site on the sheet 50. Accordingly, the light collecting efficiency at each site on the sheet 50 can be enhanced.

The first radiation image read-out apparatus in accordance with the present invention is not limited to the embodiment described above and may be embodied in various other ways. For example, various known constitutions may be employed as the light source, the light guiding optical system between the light source and the sheet, the optical systems between the sheet and the line sensor, the line sensor, or the addition means. Also, the radiation image read-out apparatus may further comprise an image processing unit, which performs various kinds of signal processing on the image signal obtained from the image information reading means 30, and/or erasing means for appropriately releasing radiation energy remaining on the sheet from which the image signal has been detected.

As illustrated in FIG. 2, the line sensor 20 employed in this embodiment comprises the plurality of the photoelectric conversion devices 21, 21, . . . arrayed in the matrix-like pattern such that they may stand in a straight line along each of the length direction (i.e., the major axis direction) of the line sensor 20 and the direction (i.e., the minor axis direction) normal to the major axis direction. However, the line sensor employed in the first radiation image read-out apparatus is not limited to the constitution shown in FIG. 2. For example, as in a line sensor 80 illustrated in FIG. 7A, the photo electric conversion devices 21, 21, . . . may be arrayed such that they may stand in a straight line along the major axis direction (indicated by the double-headed arrow X) and in a zigzag pattern along the minor axis direction (indicated by the arrow Y). As another alternative, as in a line sensor 90 illustrated in FIG. 7B, the photoelectric conversion devices 21, 21, . . . may be arrayed such that they may stand in a straight line along the minor axis direction and in a zigzag pattern along the major axis direction.

Also, in the aforesaid embodiment of the first radiation image read-out apparatus in accordance with the present invention, part of the optical path of the stimulating rays L and part of the optical path of the emitted light M overlap each other, and the size of the apparatus is thereby reduced. Alternatively, for example, as illustrated in FIG. 8, the first radiation image read-out apparatus in accordance with the present invention may be constituted such that the optical path of the stimulating rays L and the optical path of the emitted light M may not overlap each other.

Specifically, the radiation image read-out apparatus illustrated in FIG. 8 comprises the scanning belt 40 and the BLD 11 for radiating out the linear stimulating rays L at an angle of approximately 45 degrees with respect to the front surface of the sheet 50. The radiation image read-out apparatus also comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the front surface of the sheet 50. The radiation image read-out apparatus further comprises the SELFOC lens array 16 having an optical axis, which is inclined at an angle of approximately 45 degrees with respect to the surface of the sheet 50 and which is approximately normal to the direction of travel of the stimulating rays L. The SELFOC lens array 16 converges the light M, which is emitted by the sheet 50 when the sheet 50 is exposed to the stimulating rays L, onto the light receiving surfaces of the photoelectric conversion devices 21, 21, . . . constituting the line sensor 20. The radiation image read-out apparatus still further comprises the stimulating ray cut-off filter 17 for transmitting only the emitted light M and filtering out the stimulating rays L, which are mixed slightly in the emitted light M impinging upon the SELFOC lens array 16. The radiation image read-out apparatus also comprises the line sensor 20, which is constituted of the plurality of the photoelectric conversion devices 21, 21, . . . for receiving the emitted light M having passed through the stimulating ray cut-off filter 17 and for photoelectrically converting the emitted light M. The radiation image read-out apparatus further comprises the image information reading means 30. The image information reading means 30 is provided with the addition means 31 for performing addition processing on outputs of the photoelectric conversion devices 21, 21, . . . constituting the line sensor 20, which outputs correspond to an identical site on the sheet 50. The image information reading means 30 feeds out an image signal having been obtained from the addition processing.

The SELFOC lens array 16 acts such that an image of the emission area of the emitted light M on the sheet 50 is formed in one-to-one size relationship on the image surface at the light receiving surfaces of the photoelectric conversion devices 21, 21, . . . . The optical system 12, which is constituted of the collimator lens and the toric lens, expands the stimulating rays L, which come from the BLD 11, into a desired irradiation area on the sheet 50.

How the embodiment of the first radiation image read-out apparatus in accordance with the present invention, which is shown in FIG. 8, operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the addition means 31.

The BLD 11 radiates out the stimulating rays L having a linear pattern with a line width of approximately 100 $\mu$m. The stimulating rays L are radiated out at an angle of approximately 45 degrees with respect to the front surface of the sheet 50. The stimulating rays L are collimated by the optical system 12, which is constituted of the collimator lens and the toric lens and is located in the optical path of the stimulating rays L. The collimated stimulating rays L impinge upon the front surface of the sheet 50 at an angle of approximately 45 degrees with respect to the front surface of the sheet 50. At this time, the stimulating rays L impinge upon the linear area (having a line width $d_L$ of approximately 100 $\mu$m) on the front surface of the sheet 50, which linear area extends in the direction indicated by the arrow X.

The linear stimulating rays L impinging upon the sheet 50 stimulate the stimulable phosphor at the exposed area (having a line width $d_L$ of approximately 100 $\mu$m). The stimulating rays L also enter into the sheet 50 from the exposed area, are scattered to the areas neighboring with the exposed area, and stimulate the stimulable phosphor at the neighboring areas. In this manner, the stimulable phosphor at the area (having a line width $d_M$) containing the exposed area and the neighboring areas is stimulated. As a result, the light M carrying the image information stored on the sheet 50 is emitted from the area (having a line width $d_M$) containing the exposed area and the neighboring areas. The emitted light M passes through the stimulating ray cut-off filter 17, which filters out the stimulating rays L mixed in the emitted light M. The emitted light M then impinges upon the SELFOC lens array 16 and is converged onto each of the light receiving surfaces of the photoelectric conversion devices 21, 21, . . . constituting the line sensor 20.

The operation performed after the emitted light M is received by the line sensor 20 is the same as that in the aforesaid embodiment of the first radiation image read-out apparatus in accordance with the present invention.

As described above, with the embodiment of FIG. 8, wherein the photoelectric conversion devices 21, 21, . . . each having a light receiving width $d_P$ ($<d_M$) shorter than the line width $d_M$ of the emitted light M (i.e., the line width on the light receiving surface of each photoelectric conversion device) are employed, a desired level of resolution can be obtained, and the line sensor 20 as a whole can receive the emitted light M over approximately the entire line width of the emitted light. Therefore, the light receiving efficiency can be enhanced. Also, the addition means 31 performs the addition processing on the outputs of the photoelectric conversion devices 21, 21, . . . constituting the line sensor 20, which outputs have been obtained at respective positions of sheet movement performed by the scanning belt 40 and which outputs correspond to an identical site on the sheet 50. Accordingly, the light collecting efficiency at each site on the sheet 50 can be enhanced.

Figure 9:
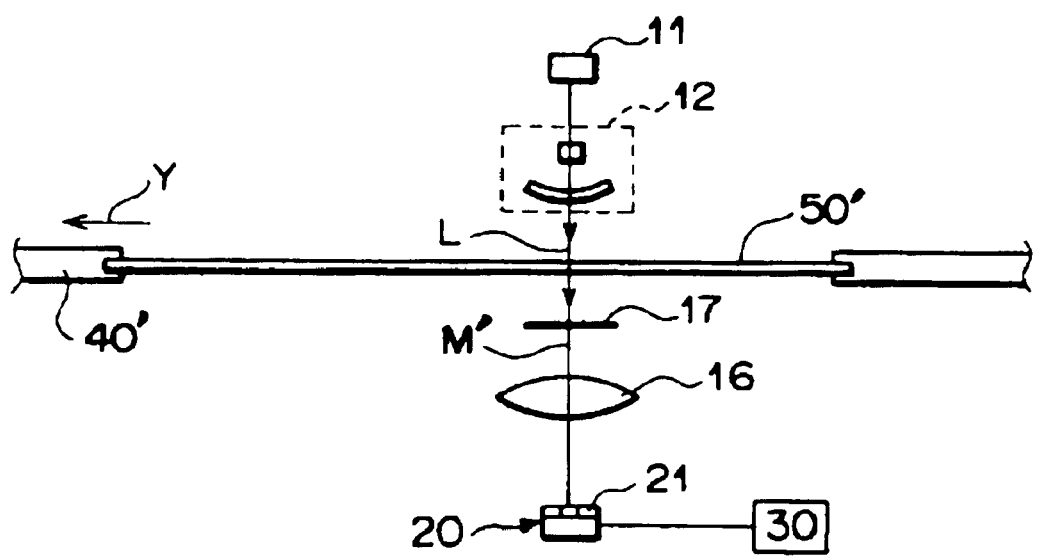
FIG. 9 is a sectional view showing a further different embodiment of the first radiation image read-out apparatus in accordance with the present invention.

In the aforesaid embodiments of the first radiation image read-out apparatus in accordance with the present invention, the BLD 11 for producing the stimulating rays L and the line sensor 20 are located on the same surface side of the sheet 50, and the emitted light M emanating from the surface of the sheet 50, upon which the stimulating rays L impinge, is received by the line sensor 20. However, the first radiation image read-out apparatus in accordance with the present invention is not limited to the aforesaid embodiments. For example, as illustrated in FIG. 9, a stimulable phosphor sheet 50' whose substrate is formed from a material permeable to the emitted light M may be employed, and the BLD 11 for producing the stimulating rays L and the line sensor 20 may be located on opposite surface sides of the sheet 50'. In this manner, the emitted light M emanating from the surface opposite to the surface of the sheet 50', upon which the stimulating rays L impinge, may be received by the line sensor 20.

Specifically, the radiation image read-out apparatus illustrated in FIG. 9 comprises a conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear stimulating rays L along the direction approximately normal to the front surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the front surface of the sheet 50'. The-radiation image read-out apparatus still further comprises the SELFOC lens array 16 having an optical axis, which is approximately normal to the front surface of the sheet 50'. The SELFOC lens array 16 converges light M', which is emitted from the back surface of the sheet 50' when the sheet 50' is exposed to the stimulating rays L (i.e., the surface opposite to the surface on the stimulating ray incidence side), onto the light receiving surfaces of the photoelectric conversion devices 21, 21, . . . constituting the line sensor 20. The radiation image read-out apparatus also comprises the stimulating ray cut-off filter 17 for transmitting only the emitted light M' and filtering out the stimulating rays L, which are mixed slightly in the emitted light M' impinging upon the SELFOC lens array 16. The radiation image read-out apparatus further comprises the line sensor 20, which is constituted of the plurality of the photoelectric conversion devices 21, 21, . . . for receiving the emitted light M' having passed through the stimulating ray cut-off filter 17 and for photoelectrically converting the emitted light M'. The radiation image read-out apparatus still further comprises the image information reading means 30. The image information reading means 30 is provided with the addition means 31 for performing addition processing on outputs of the photoelectric conversion devices 21, 21, . . . constituting the line sensor 20, which outputs correspond to an identical site on the sheet 50'. The image information reading means 30 feeds out an image signal having been obtained from the addition processing.

The SELFOC lens array 16 acts such that an image of the emission area of the emitted light M' on the back surface of the sheet 50' is formed in one-to-one size relationship on the image surface at the light receiving surfaces of the photoelectric conversion devices 21, 21, . . . . The optical system 12, which is constituted of the collimator lens and the toric lens, expands the stimulating rays L, which come from the BLD 11, into a desired irradiation area on the sheet 50'.

How the embodiment of the first radiation image read-out apparatus in accordance with the present invention, which is shown in FIG. 9, operates will be described hereinbelow.

Firstly, the conveyor belt 40' moves in the direction indicated by the arrow Y, and the sheet 50', on which the radiation image has been stored and which is supported by the conveyor belt 40', is conveyed in the direction indicated by the arrow Y. The conveyance speed of the sheet 50' is equal to the movement speed of the conveyor belt 40'. Information representing the movement speed of the conveyor belt 40' is fed into the addition means 31.

The BLD 11 radiates out the stimulating rays L having a linear pattern with a line width of approximately 100 μm. The stimulating rays L are radiated out in the direction approximately normal to the front surface of the sheet 50'. The stimulating rays L are collimated by the optical system 12, which is constituted of the collimator lens and the toric lens and is located in the optical path of the stimulating rays L. The collimated stimulating rays L impinge upon the front surface of the sheet 50' from the direction approximately normal to the front surface of the sheet 50'. At this time, the stimulating rays L impinge upon the linear area (having a line width $d_L$ of approximately 100 μm) on the front surface of the sheet 50', which linear area extends in the direction indicated by the arrow X.

The linear stimulating rays L impinging upon the sheet 50' stimulate the stimulable phosphor at the exposed area (having a line width $d_L$ of approximately 100 μm). The stimulating rays L also enter into the sheet 50' from the exposed area, are scattered to the areas neighboring with the exposed area, and stimulate the stimulable phosphor at the neighboring areas. In this manner, the stimulable phosphor at the area (having a line width $d_M$) containing the exposed area and the neighboring areas is stimulated. As a result, the light M carrying the image information stored on the sheet 50' is emitted from the area (having a line width $d_M$) containing the exposed area and the neighboring areas. At the same time, the emitted light M' having passed through the transparent substrate of the sheet 50' emanates from a linear area (having a line width $d_M'$) of the back surface of the sheet 50'.

The emitted light M', which emanates from the linear area (having a line width $d_M'$) of the back surface of the sheet 50', passes through the stimulating ray cut-off filter 17, which filters out the stimulating rays L mixed in the emitted light M'. The emitted light M' then impinges upon the SELFOC lens array 16 and is converged onto each of the light receiving surfaces of the photoelectric conversion devices 21, 21, . . . constituting the line sensor 20.

The operation performed after the emitted light M' is received by the line sensor 20 is the same as that in the aforesaid embodiment of the first radiation image read-out apparatus in accordance with the present invention.

As described above, with the embodiment of FIG. 9, wherein the photoelectric conversion devices 21, 21, . . . each having a light receiving width $d_P$ ($<d_M'$) shorter than the line width $d_M'$ of the emitted light M on the back surface of the sheet 50' (i.e., the line width on the light receiving surface of each photo electric conversion device) are employed, a desired level of resolution can be obtained, and the line sensor 20 as a whole can receive the emitted light M' over approximately the entire line width of the emitted light. Therefore, the light receiving efficiency can be enhanced. Also, the addition means 31 performs the addition processing on the outputs of the photoelectric conversion devices 21, 21, . . . constituting the line sensor 20, which outputs have been obtained at respective positions of sheet movement performed by the conveyor belt 40' and which outputs correspond to an identical site on the sheet 50'. Accordingly, the light collecting efficiency at each site on the sheet 50' can be enhanced.

In lieu of the addition means, one of other kinds of operation means may be provided. Also, simple addition processing, weighted addition processing, or one of various other kinds of operation processing may be employed.

The line sensor 20 employed in each of the aforesaid embodiments of the first radiation image read-out apparatus in accordance with the present invention is illustrated as being one which is produced as a long line sensor having a length corresponding to the width of the stimulable phosphor sheet with a single production process. Currently, it is not impossible but is not easy to produce the long line sensor as a single member due to limitation upon the current CCD production techniques, such as pixel shift. FIGS. 10A through 10I show a technique for solving the technical problems described above. With the technique shown in FIGS. 10A through 10I, a plurality of CCD image sensor chips, each of which is smaller than the width of the stimulable phosphor sheet, are utilized. The plurality of the CCD image sensor chips are arrayed along the length direction of the linear area of the stimulable phosphor sheet, i.e., along the major axis direction (indicated by the arrow X), such that they may have a total length corresponding to the width of the stimulable phosphor sheet. In this manner, a single CCD line sensor is constituted. FIG. 10A shows a CCD line sensor 420 comprising a plurality of CCD image sensor chips 422, 422, . . . arrayed in a straight line along the major axis direction (indicated by the arrow X). FIG. 10B shows a CCD line sensor 430 comprising a plurality of CCD image sensor chips 422, 422, . . . arrayed in a zigzag pattern along the major axis direction (indicated by the arrow X), such that adjacent CCD image sensor chips 422, 422 do not overlap each other. FIG. 10C shows a CCD line sensor 440 comprising a plurality of CCD image sensor chips 422, 422, . . . arrayed in a zigzag pattern along the major axis direction (indicated by the arrow X), such that adjacent CCD image sensor chips 422, 422 partly overlap each other. In FIGS. 10B and 10C, at free regions indicated by the "*" mark, which are not occupied by the CCD image sensor chips 422, 422, . . . , electric circuits for pixel shift compensation and other elements can be located.

FIGS. 10D, 10E, and 10F show examples of array patterns of the photoelectric conversion devices 21, 21, . . . constituting each of the CCD image sensor chips 422, 422, . . . The CCD image sensor chip 422 shown in FIG. 10D employs the array pattern in the line sensor 20 shown in FIG. 2. In the CCD image sensor chip 422 shown in FIG. 10D, a plurality of rows of the photoelectric conversion devices 21, 21, . . . are located in parallel. Specifically, in the CCD image sensor chip 422 shown in FIG. 10D, the photoelectric conversion devices 21, 21, . . . are arrayed along the direction indicated by the arrow X and thus constitute one row. A plurality of (in this case, three) such rows of the photoelectric conversion devices 21, 21, . . . extending along the direction indicated by the arrow X stand side by side in the direction of sheet conveyance (indicated by the arrow Y). The CCD image sensor chip 422 shown in FIG. 10E employs the array pattern in the line sensor 80 shown in FIG. 7A. Specifically, in the CCD image sensor chip 422 shown in FIG. 10E, the photoelectric conversion devices 21, 21, . . . are arrayed in a straight line along the major axis direction (indicated by the arrow X) and in a zigzag pattern along the minor axis direction (indicated by the arrow Y). The CCD image sensor chip 422 shown in FIG. 10F employs the array pattern in the line sensor 90 shown in FIG. 7B. Specifically, in the CCD image sensor chip 422 shown in FIG. 10F, the photoelectric conversion devices 21, 21, . . . are arrayed in a straight line along the minor axis direction (indicated by the arrow Y) and in a zigzag pattern along the major axis direction (indicated by the arrow X). By way of example, in cases where the number of the photoelectric conversion devices 21, 21, . . . arrayed in each row along the major axis direction (indicated by the arrow X) in the line sensor 420, 430, or 440 is equal to 1,000, the number of the photoelectric conversion devices 21, 21, . . . arrayed along the major axis direction (indicated by the arrow X) in one CCD image sensor chip 422 may fall within the range of 1/100 to 1/10.

The CCD image sensor chips 422, 422, . . . constituting each of the line sensors 420, 430, and 440 shown in FIGS. 10A, 10B, and 10C may take one of array patterns shown in FIGS. 10D, 10E, and 10F. Also, in the line sensors 420, 430, and 440 shown in FIGS. 10A, 10B, and 10C, the CCD image sensor chips 422, 422, . . . are arrayed such that the length direction (indicated by the arrow X) of each CCD image sensor chip 422 may coincide with the length direction (indicated by the arrow X) of the line sensor. Alternatively, as in line sensors 450, 460, and 470 illustrated in FIGS. 10G, 10H, and 10I, the CCD image sensor chips 422, 422, . . . may be arrayed such that the width direction (indicated by the arrow Y) of each CCD image sensor chip 422 may coincide with the length direction (indicated by the arrow X) of the line sensor. With the line sensors shown in FIGS. 10A, 10B, 10C, 10G, 10H, and 10I, in accordance with the array patterns of the CCD image sensor chips 422, 422, . . . the same effects as those of the line sensors 20, 80, and 90 shown in FIGS. 2, 7A, and 7B can be obtained.

With the technique described above, wherein one CCD line sensor is constituted by arraying plurality of the CCD image sensor chips along the major axis direction (indicated by the arrow X) such that they may have a total length corresponding to the width of the stimulable phosphor sheet, the line sensor can be produced with a simple production process, the yield of the products in the production process can be enhanced, and the cost can be kept low.

Further, signal components can be taken from each of the CCD image sensor chips, and therefore compensation for pixel shift can be performed more easily than when the entire line sensor is produced as a single member. Particularly, as illustrated in FIG. 10C, in cases where the CCD image sensor chips 422, 422, . . . are arrayed in a zigzag pattern such that adjacent CCD image sensor chips 422, 422 partly overlap each other, the compensation for pixel shift becomes more easy by the utilization of data at the overlapping portions.

In cases where a plurality of CCD image sensor chips are arrayed along the major axis direction (indicated by the arrow X), the arraying should preferably be performed such that no insensible zone may occur at joints. If such arraying is difficult to perform, processing for compensation for the insensible zone should preferably be performed on the image signal such that the joints may be connected smoothly in the reproduced image.

The technique for arraying a plurality of the CCD image sensor chips along the major axis direction (indicated by the arrow X) such that they may have a total length corresponding to the width of the stimulable phosphor sheet is also applicable when an amorphous silicon sensor or a MOS image sensor is utilized as the line sensor.

As will be described later, the stimulable phosphor sheet may be a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface. Also, two line sensors may be utilized, each of which is located on one of the front and back surface sides of the stimulable phosphor sheet, the two line sensors detecting two image signals, each of which is made up of a series of image signal components representing pixels in the radiation image, from the front and back surfaces of the stimulable phosphor sheet. Further, the apparatus may be provided with reading means for performing a subtraction process on image signal components of the two image signals, which image signal components represent corresponding pixels on the front and back surfaces of the stimulable phosphor sheet. In such cases, as each of the two line sensors located on opposite surface sides of the stimulable phosphor sheet, a line sensor, which is constituted in the manner described above by arraying plurality of the sensor chips along the length direction of the linear area of the stimulable phosphor sheet such that they may have a total length corresponding to the width of the stimulable phosphor sheet, may be utilized.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

An embodiment of the second radiation image read-out apparatus in accordance with the present invention will be described hereinbelow.

Figure 11A:
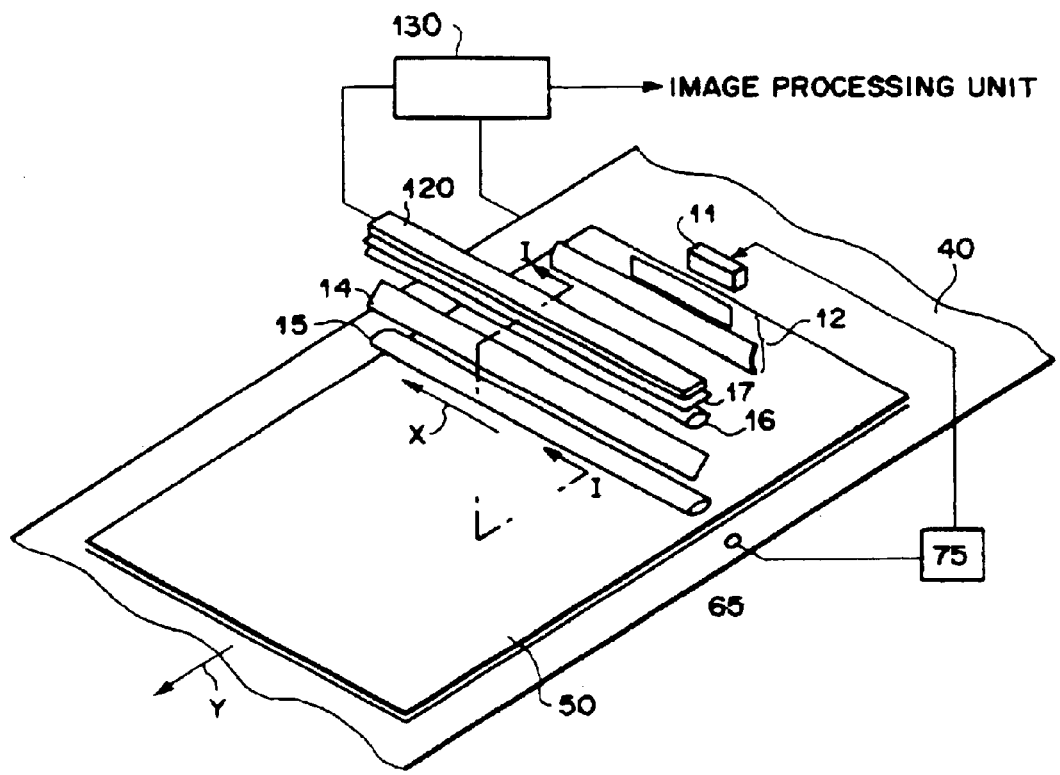
FIG. 11A is a perspective view showing an embodiment of the second radiation image read-out apparatus in accordance with the present invention.
Figure 11B:
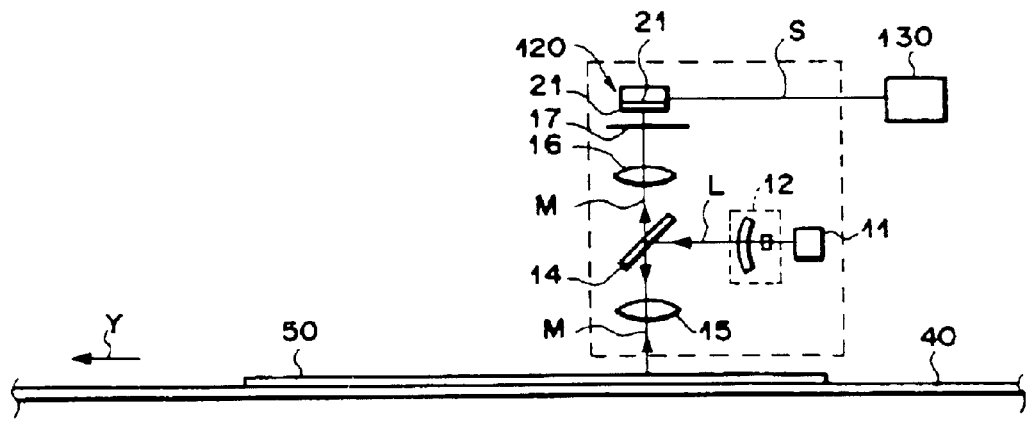
FIG. 11B is a sectional view taken on line I—I of FIG. 11A.
Figure 12:
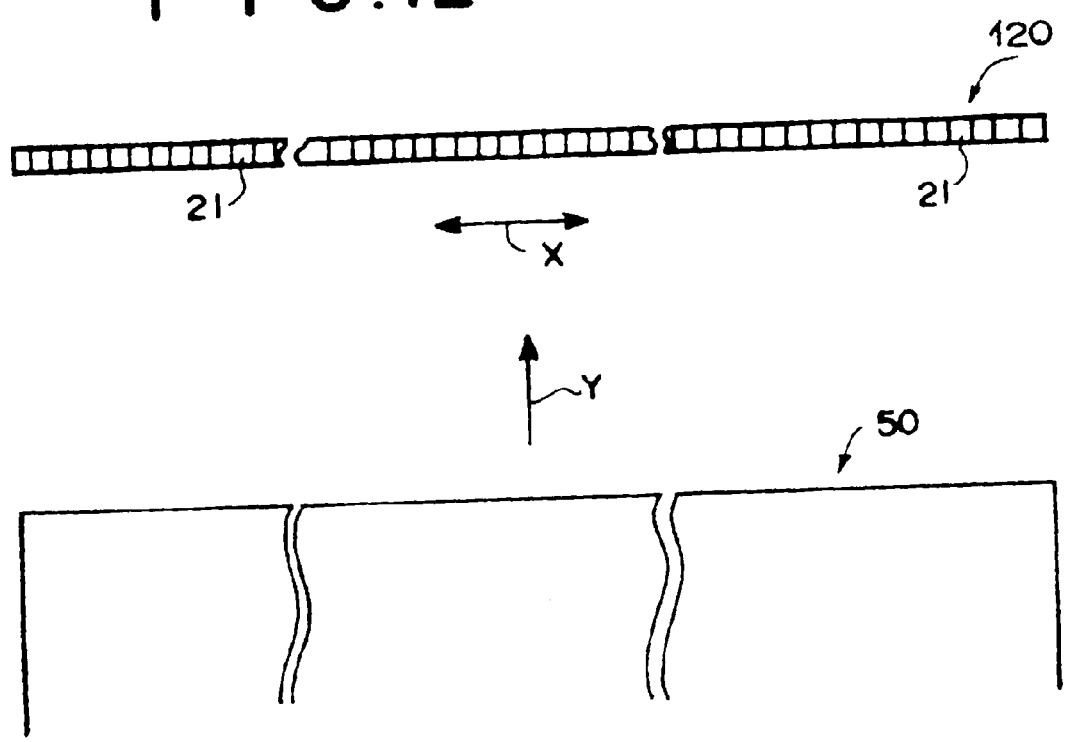
FIG. 12 is an explanatory view showing a line sensor in the embodiment of FIG. 11A.

FIG. 11A is a perspective view showing an embodiment of the second radiation image read-out apparatus in accordance with the present invention. FIG. 11B is a sectional view taken on line I—I of FIG. 11A. FIG. 12 is an explanatory view showing a line sensor in the embodiment of FIG. 11A.

With reference to FIGS. 11A and 11B, the radiation image read-out apparatus comprises the scanning belt 40 for supporting the sheet 50, on which a radiation image has been stored, and conveying the sheet 50 in the direction indicated by the arrow Y. The radiation image read-out apparatus also comprises a broad area semiconductor laser (hereinbelow referred to as the BLD) 11 for radiating out a linear laser beam L having a linear pattern with a line width of approximately 100 µm and having wavelengths falling within the range of 600 nm to 700 nm. The laser beam L is radiated out approximately in parallel with the front surface of the sheet 50. The radiation image read-out apparatus further comprises the optical system 12, which is constituted of a combination of a collimator lens for collimating the linear laser beam L having been radiated out of the BLD 11 and a toric lens for expanding the beam only in one direction. The radiation image read-out apparatus still further comprises the dichroic mirror 14, which is located at an angle of 45 degrees with respect to the front surface of the sheet 50 and which is set so as to reflect the laser beam L and to transmit emitted light M described later. The radiation image read-out apparatus also comprises the first SELFOC lens array 15. The first SELFOC lens array 15 converges the linear laser beam L, which has been reflected from the dichroic mirror 14, into a linear beam (having a line width of approximately 100 µm) extending along the direction indicated by the arrow X on the sheet 50. Also, the first SELFOC lens array 15 collimates the emitted M, which is emitted by the sheet 50 exposed to the linear laser beam L and which carries image information of the radiation image stored on the sheet 50. The radiation image read-out apparatus further comprises the second SELFOC lens array 16 for converging the emitted light M, which has been collimated by the first SELFOC lens array 15 and has then passed through the dichroic mirror 14, onto light receiving surfaces of photoelectric conversion devices 21, 21, . . . constituting a line sensor 120, which will be described later. The radiation image read-out apparatus still further comprises the stimulating ray cut-off filter 17 for transmitting only the emitted light M and filtering out the laser beam L, which has been reflected from the front surface of the sheet 50 and which is mixed slightly in the emitted light M having passed through the second SELFOC lens array 16. The radiation image read-out apparatus also comprises the line sensor 120, which is constituted of a plurality of photoelectric conversion devices 21, 21, . . . for receiving the emitted light M having passed through the stimulating ray cut-off filter 17 and for photoelectrically converting the emitted light M. The radiation image read-out apparatus further comprises image information reading means 130. The image information reading means 130 reads outputs of the photoelectric conversion devices 21, 21, . . . constituting the line sensor 120 and feeds out an image signal, which is made up of the outputs, into an image processing unit, or the like.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the photoelectric conversion devices 21, 21, . . . The optical system 12, which is constituted of the collimator lens and the toric lens, expands the laser beam L, which comes from the BLD 11, into a desired irradiation area on the dichroic mirror 14.

As illustrated in FIG. 12, the line sensor 120 comprises a plurality of (e.g., at least 1,000 pieces of) photoelectric conversion devices 21, 21, . . . arrayed along the direction indicated by the double-headed arrow X. Each of the photoelectric conversion devices 21, 21, . . . constituting the line sensor 120 has the light receiving surface having a size of approximately 100 µm×100 µm. The size of each light receiving surface is the size capable of receiving the emitted light M occurring from part having a size of approximately 100 µm×100 µm on the surface of the sheet 50. As the photoelectric conversion devices 21, 21, . . . , amorphous silicon sensors, CCD image sensors, MOS image sensors, or the like, may be employed.

How this embodiment of the second radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 130.

The BLD 11 radiates out the laser beam L having a linear pattern with a line width of approximately 100 µm. The laser beam L is radiated out approximately in parallel with the front surface of the sheet 50. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the front surface of the sheet 50. The reflected laser beam L is converged by the first SELFOC lens array 15 into a linear beam (having a line width $d_L$ of approximately 100 µm) extending along the direction indicated by the arrow X on the sheet 50.

The laser beam L impinging upon the sheet 50 is coherent light and is advantageous over the fluorescence produced by a fluorescent lamp and light radiated out from an LED array in that the directivity of the stimulating rays is high, the intensity of the stimulating rays is high, and therefore high stimulation energy can be imparted to the stimulable phosphor sheet. Accordingly, the laser beam L can sufficiently stimulate the stimulable phosphor at the exposed area (having a line width $d_L$ of approximately 100 µm). As a result, the light M of high intensity carrying the image information stored on the sheet 50 is emitted by the stimulable phosphor at the exposed area.

The light M emitted by the sheet 50 is collimated by the first SELFOC lens array 15, passes through the dichroic mirror 14, and is converged by the second SELFOC lens array 16 onto each of the light receiving surfaces of the photoelectric conversion devices 21, 21, ... constituting the line sensor 120. At this time, the laser beam L, which has been reflected from the front surface of the sheet 50 and is mixed slightly in the emitted light M having passed through the second SELFOC lens array 16, is filtered out by the stimulating ray cut-off filter 17.

The emitted light M having passed through the stimulating ray cut-off filter 17 is received by the photoelectric conversion devices 21, 21, ... constituting the line sensor 120 and photoelectrically converted into signal components Q, Q, ..... The signal components Q, Q, ... are fed into the image information reading means 130 and fed out into the image processing unit, or the like, such that it may be clear which signal component Q corresponds to which position on the sheet 50 corresponding to the amount of displacement of the scanning belt 40.

An image signal S made up of the signal components Q, Q, ... is the one obtained from the emitted light M caused to occur by being stimulated by the laser beam L having high stimulation energy. Therefore, an image having a higher signal-to-noise ratio can be obtained than with an image signal obtained from the fluorescence produced by a fluorescent lamp or light radiated out from an LED array.

The apparatus may further comprises monitoring means 65 (shown in FIG. 11A) for monitoring the intensity of the laser beam L radiated out of the BLD 11, and BLD modulating means 75 for modulating the BLD 11 in accordance with the results of the monitoring with the monitoring means 65 such that the power of the BLD 11 may become equal to a predetermined value. When fluctuation in intensity of the laser beam L radiated out of the BLD 11 is detected, the BLD 11 may be modulated by the BLD modulating means 75 such that the intensity of the laser beam L may become equal to a predetermined value.

Different embodiments of the second radiation image read-out apparatus in accordance with the present invention may be constituted in the same manner as that in the embodiments of the first radiation image read-out apparatus in accordance with the present invention, which are described above with reference to FIGS. 1A, 1B through FIG. 9.

In such different embodiments of the second radiation image read-out apparatus in accordance with the present invention, the laser beam L impinging upon the sheet 50 is coherent light and is advantageous over the fluorescence produced by a fluorescent lamp and light radiated out from an LED array in that the directivity of the stimulating rays is high, the intensity of the stimulating rays is high, and therefore high stimulation energy can be imparted to the stimulable phosphor sheet. Accordingly, the laser beam L can sufficiently stimulate the stimulable phosphor at the exposed area (having a line width $d_L$ of approximately 100 $\mu$m). As a result, the light M of high intensity carrying the image information stored on the sheet 50 is emitted by the stimulable phosphor at the exposed area.

As described above, in such different embodiments of the second radiation image read-out apparatus in accordance with the present invention, the image signal S made up of the signal components Q, Q, ... is the one obtained from the emitted light M caused to occur by being stimulated by the laser beam L having high stimulation energy. Therefore, an image having a higher signal-to-noise ratio can be obtained than with an image signal obtained from the fluorescence produced by a fluorescent lamp or light radiated out from an LED array.

The embodiment of the second radiation image read-out apparatus in accordance with the present invention, which is described above with reference to FIGS. 11A, 11B and FIG. 12, embraces an embodiment of the third radiation image read-out apparatus in accordance with the present invention.

Figure 14:
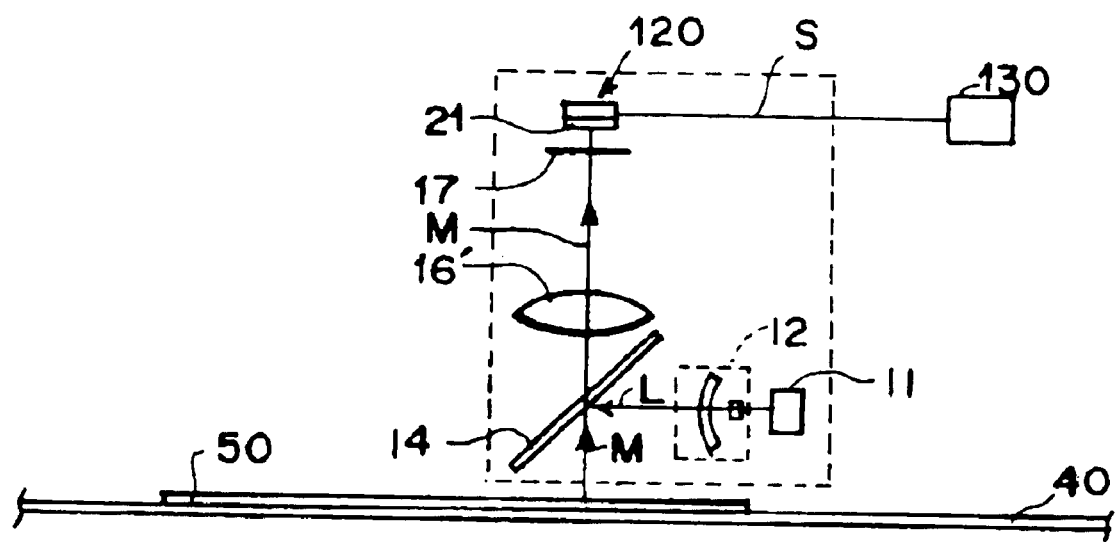
FIG. 14 is a sectional view showing a different embodiment of the third radiation image read-out apparatus in accordance with the present invention.

The embodiment of the third radiation image read-out apparatus in accordance with the present invention may be modified such that, as illustrated in FIG. 14, in lieu of the first SELFOC lens array 15 and the second SELFOC lens array 16 shown in FIG. 11B, a single SELFOC lens array 16' may be employed. The SELFOC lens array 16' acts such that an image of the emission area of the emitted light M on the sheet 50 is formed in one-to-one size relationship on the light receiving surfaces of the photoelectric conversion devices 21, 21, .....

The optical system 12, which is constituted of the collimator lens and the toric lens, expands the laser beam L, which come from the BLD 11, into a desired irradiation area on the dichroic mirror (hot mirror) 14. The optical system 12 is not limited to the combination of the collimator lens and the toric lens and may be constituted of a cylindrical lens, or the like, or one of other combinations, which can expand the laser beam L into a desired irradiation area on the hot mirror 14.

The hot mirror 14 acts as the stimulating ray guiding means for guiding the laser beam L, which serves as the stimulating rays, to the sheet 50, and as the emitted light guiding means for guiding the emitted light M to the line sensor 120. The hot mirror 14 is located such that the optical path of the laser beam L having been reflected by the hot mirror 14 and the optical path of the emitted light M overlap each other.

As described above, in the embodiments of the third radiation image read-out apparatus in accordance with the present invention, the hot mirror 14 and the first SELFOC lens array 15 are located such that part of the optical path of the laser beam L and part of the optical path of the emitted light M overlap each other. Therefore, the spaces occupied by the laser beam L and the emitted light M can be reduced, and the size of the apparatus can be kept smaller than a conventional radiation image read-out apparatus wherein the optical path of the laser beam L and the optical path of the emitted light M do not overlap each other.

Embodiments of the fourth radiation image read-out apparatus in accordance with the present invention are constituted in the same manner as that described above with reference to FIGS. 1A, 1B through FIGS. 7A, 7B.

In such cases, the dichroic mirror (hot mirror) 14 shown in FIG. 1B acts as the stimulating ray guiding means for guiding the laser beam L, which serves as the stimulating rays, to the sheet 50, and as the emitted light guiding means for guiding the emitted light M to the line sensor 20. The hot mirror 14 is located such that the optical path of the laser beam L having been reflected by the hot mirror 14 and the optical path of the emitted light M overlap each other.

As described above, in the embodiments of the fourth radiation image read-out apparatus in accordance with the present invention, the hot mirror 14 and the first SELFOC lens array 15 are located such that part of the optical path of the laser beam L and part of the optical path of the emitted light M overlap each other. Therefore, the spaces occupied by the laser beam L and the emitted light M can be reduced, and the size of the apparatus can be kept smaller than the conventional radiation image read-out apparatus wherein the optical path of the laser beam L and the optical path of the emitted light M do not overlap each other.

In the aforesaid embodiments of the third and fourth radiation image read-out apparatuses in accordance with the present invention, the hot mirror is utilized such that part of the optical path of the laser beam L and part of the optical path of the emitted light M overlap each other. Alternatively, as illustrated in FIG. 13, a cold mirror 14' for transmitting only the laser beam L and reflecting the emitted light M may be utilized such that part of the optical path of the laser beam L and part of the optical path of the emitted light M overlap each other.

Specifically, the radiation image lead-out apparatus illustrated in FIG. 13 comprises the scanning belt 40, and the BLD 11 for radiating out a linear laser beam L in the direction approximately normal to the front surface of the sheet 50. The radiation image read-out apparatus also comprises the optical system 12, which is constituted of a combination of a collimator lens for collimating the linear laser beam L having been radiated out of the BLD 11 and a toric lens for expanding the beam only in one direction, and which causes the linear laser beam L to impinge upon the front surface of the sheet 50. The radiation image read-out apparatus further comprises the cold mirror 14', which is located at an angle of 45 degrees with respect to the front surface of the sheet 50 and which is set so as to transmit the laser beam L and to reflect emitted light M. The radiation image read-out apparatus still further comprises the first SELFOC lens array 15. The first SELFOC lens array 15 converges the linear laser beam L, which has passed through the cold mirror 14', into a linear beam (having a line width of approximately 100 μm) extending along the direction indicated by the arrow X on the sheet 50. Also, the first SELFOC lens array 15 collimates the emitted M, which is emitted by the sheet 50 exposed to the linear laser beam L and which carries image information of the radiation image stored on the sheet 50. The radiation image read-out apparatus also comprises the second SELFOC lens array 16 for converging the emitted light M, which has been collimated by the first SELFOC lens array 15 and has then been reflected from the cold mirror 14', onto the light receiving surfaces of the photoelectric conversion devices 21, 21, . . . constituting the line sensor 120. The radiation image read-out apparatus further comprises the stimulating ray cut-off filter 17 for transmitting only the emitted light M and filtering out the laser beam L, which has been reflected from the front surface of the sheet 50 and which is mixed slightly in the emitted light M having passed through the second SELFOC lens array 16. The radiation image read-out apparatus still further comprises the line sensor 120, which is constituted of the plurality of the photoelectric conversion devices 21, 21, . . . for receiving the emitted light M having passed through the stimulating ray cut-off filter 17 and for photoelectrically converting the emitted light M. The radiation image read-out apparatus also comprises the image information reading means 130. The image information reading means 130 reads outputs of the photoelectric conversion devices 21, 21, . . . constituting the line sensor 120 and feeds out an image signal, which is made up of the outputs, into an image processing unit, or the like.

The third and fourth radiation image read-out apparatuses in accordance with the present invention are not limited to the embodiments utilizing the hot mirror or the cold mirror described above, and may be embodied in various other ways such that part of the optical path of the laser beam L and part of the optical path of the emitted light M overlap each other.

Embodiments of the fifth and sixth radiation image read-out apparatuses in accordance with the present invention will be described hereinbelow.

Figure 15A:
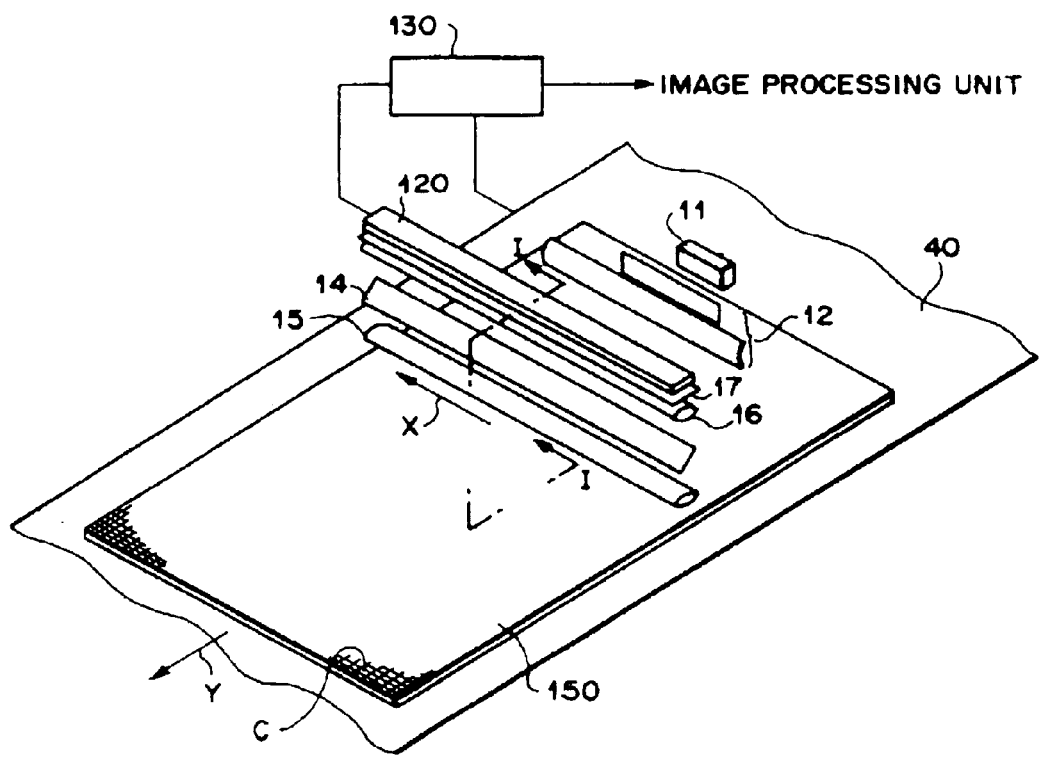
FIG. 15A is a perspective view showing an embodiment of the fifth radiation image read-out apparatus in accordance with the present invention.
Figure 15B:
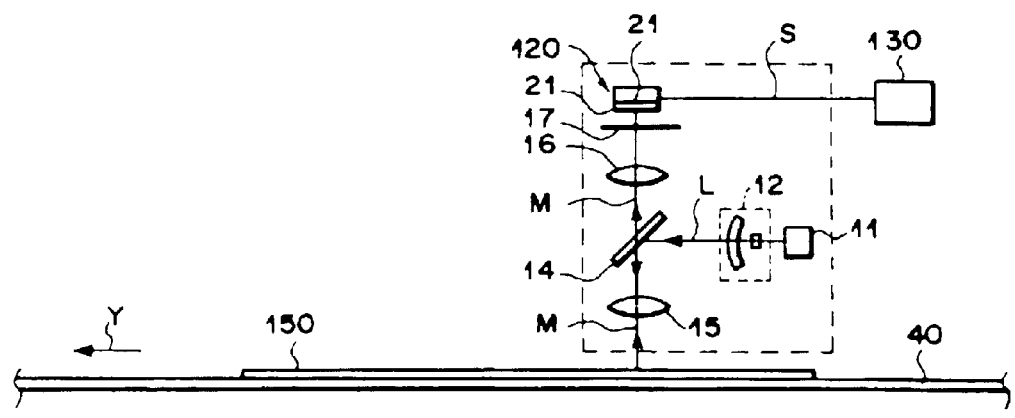
FIG. 15B is a sectional view taken on line I—I of FIG. 15A.
Figure 16:
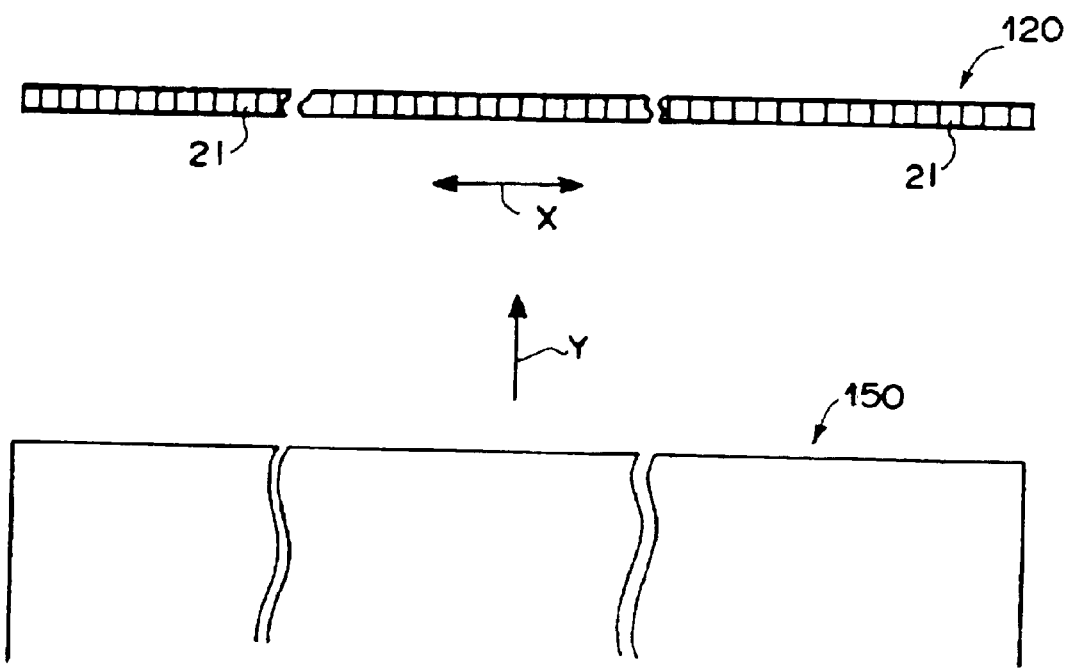
FIG. 16 is an explanatory view showing a line sensor in the embodiment of FIG. 15A.
Figure 17A:
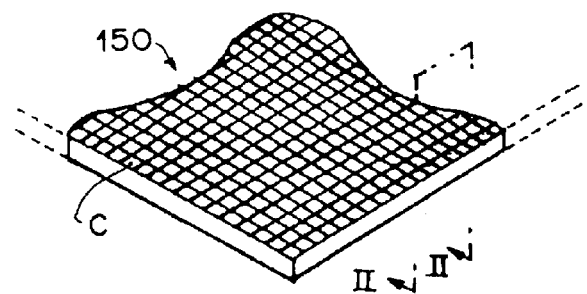
FIG. 17A is a perspective view showing a stimulable phosphor sheet in the embodiment of FIG. 15A, FIGS. 17B and 17C are sectional views showing examples of structures of the stimulable phosphor sheet shown in FIG. 17A.
Figure 17B:
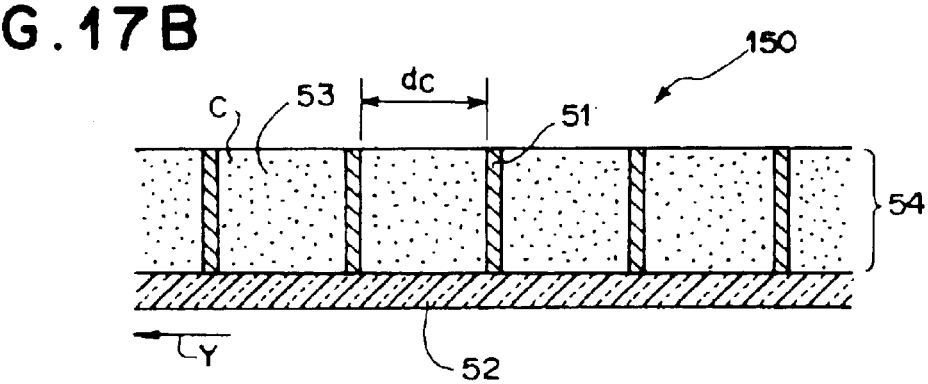
Figure 17C:
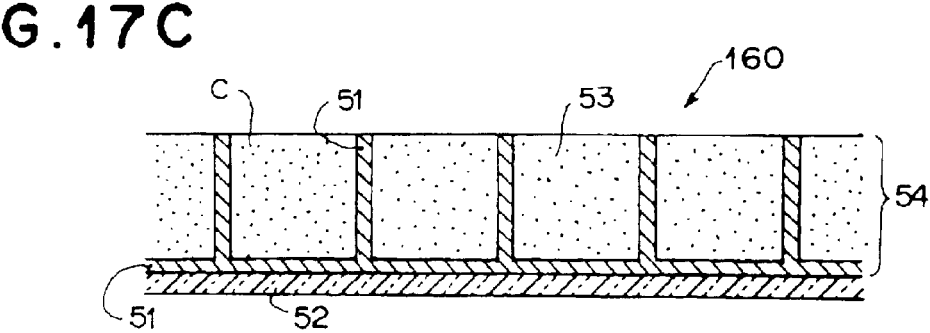

FIG. 15A is a perspective view showing an embodiment of the fifth radiation image read-out apparatus in accordance with the present invention. FIG. 15B is a sectional view taken on line I—I of FIG. 15A. FIG. 16 is an explanatory view showing a line sensor in the embodiment of FIG. 15A. FIG. 17A is a perspective view showing a stimulable phosphor sheet in the embodiment of FIG. 15A. FIGS. 17B and 17C are sectional views showing examples of structures of the stimulable phosphor sheet shown in FIG. 17A.

With reference to FIGS. 15A and 15B, the radiation image read-out apparatus comprises the scanning belt 40 for supporting a stimulable phosphor sheet (hereinbelow referred to simply as the sheet) 150, on which a radiation image has been stored, and conveying the sheet 150 in the direction indicated by the arrow Y. The radiation image read-out apparatus also comprises the broad area laser (hereinbelow referred to as the BLD) 11 for radiating out secondary stimulating rays (hereinbelow referred to simply as the stimulating rays) L having a linear pattern with a line width of approximately 100 μm. The stimulating rays L are radiated out approximately in parallel with the front surface of the sheet 150. The radiation image read-out apparatus further comprises the optical system 12, which is constituted of a combination of a collimator lens for collimating the linear stimulating rays L having been radiated out of the BLD 11 and a toric lens for expanding the beam only in one direction. The radiation image read-out apparatus still further comprises the dichroic mirror 14, which is located at an angle of 45 degrees with respect to the front surface of the sheet 150 and which is set so as to reflect the stimulating rays L and to transmit emitted light M described later. The radiation image read-out apparatus also comprises the first SELFOC lens array 15. The first SELFOC lens array 15 converges the linear stimulating rays L, which have been reflected from the dichroic mirror 14, into a linear beam (having a line width of approximately 100 μm) extending along the direction indicated by the arrow X on the sheet 150. Also, the first SELFOC lens array 15 collimates the emitted M, which is emitted by the sheet 150 exposed to the linear stimulating rays L and which carries image information of the radiation image stored on the sheet 150. The radiation image read-out apparatus further comprises the second SELFOC lens array 16 for converging the emitted light M, which has been collimated by the first SELFOC lens array 15 and has then passed through the dichroic mirror 14, onto the light receiving surfaces of the photoelectric conversion devices 21, 21, . . . constituting the line sensor 120. The radiation image read-out apparatus still further comprises the stimulating ray cut-off filter 17 for transmitting only the emitted light M and filtering out the stimulating rays L, which have been reflected from the front surface of the sheet 150 and which are mixed slightly in the emitted light M having passed through the second SELFOC lens array 16. The radiation image read-out apparatus also comprises the line sensor 120, which is constituted of a plurality of the photoelectric conversion devices 21, 21, . . . for receiving the emitted light M having passed through the stimulating ray cut-off filter 17 and for photoelectrically converting the emitted light M. The radiation image read-out apparatus further comprises the image information reading means 130 for reading outputs of the photoelectric conversion devices 21, 21, . . . constituting the line sensor 120.

The first SELFOC lens array 15 acts such that an image of the emission area of the emitted light M on the sheet 150 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the photoelectric conversion device s 21, 21, . . .

The optical system 12, which is constituted of the collimator lens and the toric lens, expands the stimulating rays L, which come from the BLD 11, into a desired irradiation area on the dichroic mirror 14.

As illustrated in FIG. 16, the line sensor 120 comprises a plurality of (e.g., at least 1,000 pieces of) photoelectric conversion devices 21, 21, . . . arrayed in one row along the direction indicated by the double-headed arrow X. Each of the photoelectric conversion devices 21, 21, . . . constituting the line sensor 120 has the light receiving surface having a size of approximately 100 $\mu$m (=$d_P$) (in the direction indicated by the arrow Y)×100 $\mu$m (in the direction indicated by the arrow X). The size of each light receiving surface is the size capable of receiving the emitted light M occurring from part having a size of approximately 100 $\mu$m×100 $\mu$m on the surface of the sheet 150. As the photoelectric conversion devices 21, 21, . . . , amorphous silicon sensors, CCD image sensors, MOS image sensors, or the like, may be employed.

The sheet 150 is partly shown in FIG. 17A. As illustrated in FIG. 17B (or as shown in the sectional view of a sheet 160 in FIG. 17C), the sheet 150 or 160 comprises a substrate layer 52 and a stimulable phosphor layer 54 overlaid on the substrate layer 52. A stimulable phosphor material 53 in the stimulable phosphor layer 54 is partitioned by a stimulating ray reflecting partition member 51, which extends in the thickness direction of the sheet 150, into a plurality of fine cells C, C, . . . . (The stimulable phosphor sheet having such a structure is referred to as the anisotropic sheet.) As illustrated in FIG. 17B, each fine cell C other than its front surface is surrounded by the stimulating ray reflecting partition member 51 and the substrate layer 52. Alternatively, as illustrated in FIG. 17C, each fine cell C other than its front surface is surrounded by only the stimulating ray reflecting partition member 51. In this embodiment, the sheet 150 having the structure shown in FIG. 17B is employed.

Each fine cell C of the sheet 150 has an approximately square shape having a size of approximately 100 $\mu$m (in the direction indicated by the arrow X)×100 $\mu$m (in the direction indicated by the arrow Y). The stimulating ray reflecting partition member 51 is constituted of a material capable of reflecting the stimulating rays L and suppressing the passage of the stimulating rays L therethrough. The stimulating ray reflecting partition member 51 suppresses the scattering of the stimulating rays L to the direction in which the surface of the sheet 150 extends.

How this embodiment of the fifth radiation image readout apparatus in accordance with the present invention operates will be described hereinbelow.

Firstly, the scanning belt 40 moves in the direction indicated by the arrow Y, and the sheet 150, on which the radiation image has been stored and which is supported on the scanning belt 40, is conveyed in the direction indicated by the arrow Y. The conveyance speed of the sheet 150 is equal to the movement speed of the scanning belt 40. Information representing the movement speed of the scanning belt 40 is fed into the image information reading means 130.

The BLD 11 radiates out the stimulating rays L having a linear pattern with a line width of approximately 100 $\mu$m. The stimulating rays L are radiated out approximately in parallel with the front surface of the sheet 150. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the front surface of the sheet 150. As illustrated in FIG. 18A, the reflected stimulating rays L are converged by the first SELFOC lens array 15 into a linear beam (having a line width $d_L$ of approximately 100 $\mu$m) extending along the direction indicated by the arrow X on the sheet 150. At this time, the line width $d_L$ of the stimulating rays L on the surface of the sheet 150 is equal to approximately 100 $\mu$m, and therefore the stimulating rays L stimulate only the linear area of approximately one row of the fine cells C, C, . . . of the sheet 150 (the size $d_C$ of the linear area in the direction indicated by the arrow Y is equal to approximately 100 $\mu$m).

The linear stimulating rays L impinging upon the fine cells C, C, . . . of the sheet 150 are scattered in the stimulable phosphor layer 54. However, the stimulating rays L are reflected by the stimulating ray reflecting partition member 51, which defines the fine cells C, C, . . . . Therefore, the stimulating rays L are scattered within only the fine cells C, C, . . . upon which the stimulating rays L impinge. As a result, the stimulating rays L stimulate the stimulable phosphor material 53 in only the fine cells C, C, . . . upon which the stimulating rays L impinge. The stimulated stimulable phosphor material 53 emits the light M carrying the image information stored on the sheet 150. Since the stimulable phosphor material 53 is partitioned by the stimulating ray reflecting partition member 51 into the fine cells C, C, . . . , the emitted light M having a beam width $d_M$ approximately equal to the width $d_C$ of each fine cell C emanates from the sheet 150. The emitted light M emanating at this time has an intensity distribution indicated by the solid line in FIG. 18B (the width of distribution $d_M$ is approximately equal to the width $d_C$). In FIG. 18B, the broken line indicates the intensity distribution (having a width of distribution $d_{M0}$) of the light emitted under the same conditions from an ordinary sheet having no stimulating ray reflecting partition member. As illustrated in FIG. 18B, the intensity distribution of the light M emitted by the sheet 150 is narrower than that of the light emitted by the ordinary sheet having no stimulating ray reflecting partition member.

The light M emitted by the sheet 150 is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 120. At this time, the laser beam L, which has been reflected from the front surface of the sheet 150 and is mixed slightly in the emitted light M having passed through the second SELFOC lens array 16, is filtered out by the stimulating ray cut-off filter 17.

In this embodiment, the beam width of the emitted light M on the light receiving surface of the line sensor 120 is set to be equal to the beam width $d_M$ on the front surface of the sheet 150. Therefore, all of the emitted light M impinges upon the respective photoelectric conversion devices 21, 21, . . . (having a width $d_P$ of approximately 100 $\mu$m). The photoelectric conversion devices 21, 21, . . . photoelectrically convert the emitted light M and feed the thus obtained signal components Q, Q, . . . into the image information reading means 130.

The image information reading means 130 feeds out the signal components Q, Q, . . . into the external image processing unit, or the like, such that it may be clear which signal component Q corresponds to which site on the sheet 150 in accordance with the movement speed of the scanning belt 40.

The operation described above is iterated for the respective scanning positions of the sheet 150. In this manner, the radiation image stored on the sheet 150 can be read out as an image signal.

As described above, with this embodiment of the fifth radiation image read-out apparatus in accordance with the present invention, wherein the light emission region (i.e., the stimulable phosphor material 53) of the sheet 150 is partitioned by the stimulating ray reflecting partition member 51 into the plurality of the fine cells C, C, . . . , the stimulating rays L impinging upon the predetermined area (the linear area) of the sheet 150 can be prevented from scattering boundlessly beyond the fine cells C, C, . . . in the sheet 150. Therefore, the light M is emitted from only the line width area (having the line width $d_M$) approximately identical with the linear area (having the line width $d_L$) upon which the stimulating rays L impinge. Accordingly, the light collecting efficiency of the line sensor 120 can be enhanced without the desired resolution becoming low. Also, the emitted light M occurs in units of fine cells C, C, . . . , and therefore the sharpness of the image reproduced from an image signal having been obtained from the photoelectric conversion can be enhanced. In this manner, a radiation image can be obtained, which has good image quality and can serve as an effective tool in, particularly, the efficient and accurate diagnosis of an illness.

Figure 19:
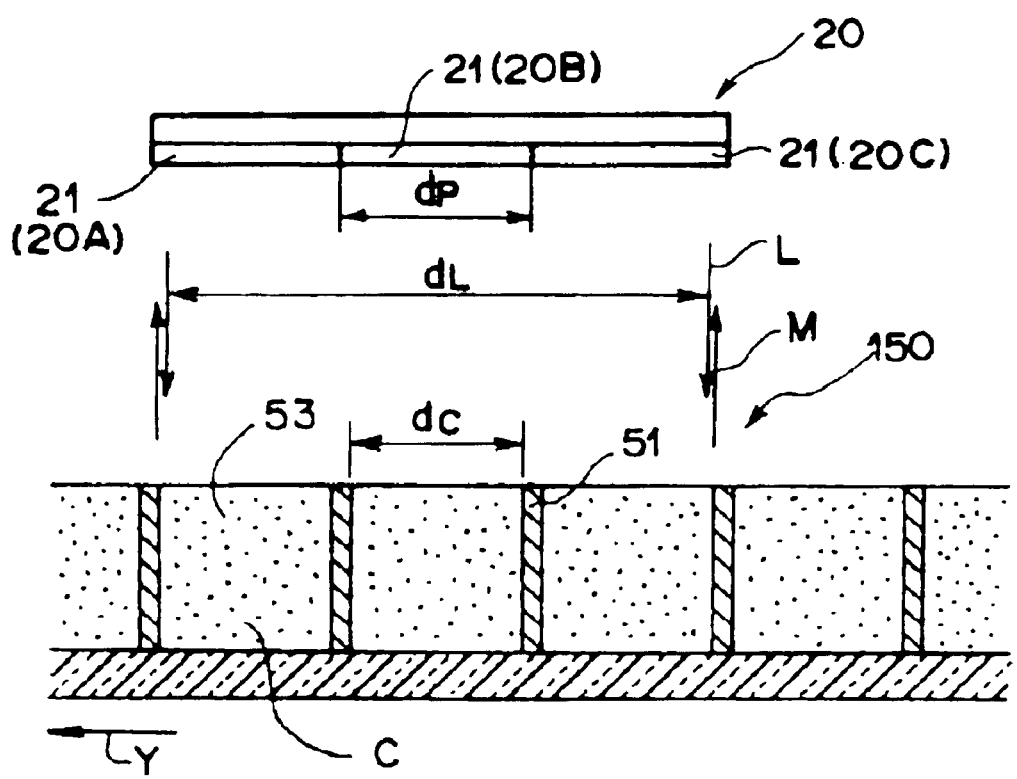
FIG. 19 is an explanatory view showing relationship between a beam width of emitted light and a width of a line sensor in an embodiment of the sixth radiation image read-out apparatus in accordance with the present invention, in which the line sensor comprises a plurality of rows of photoelectric conversion devices.
Figure 20:
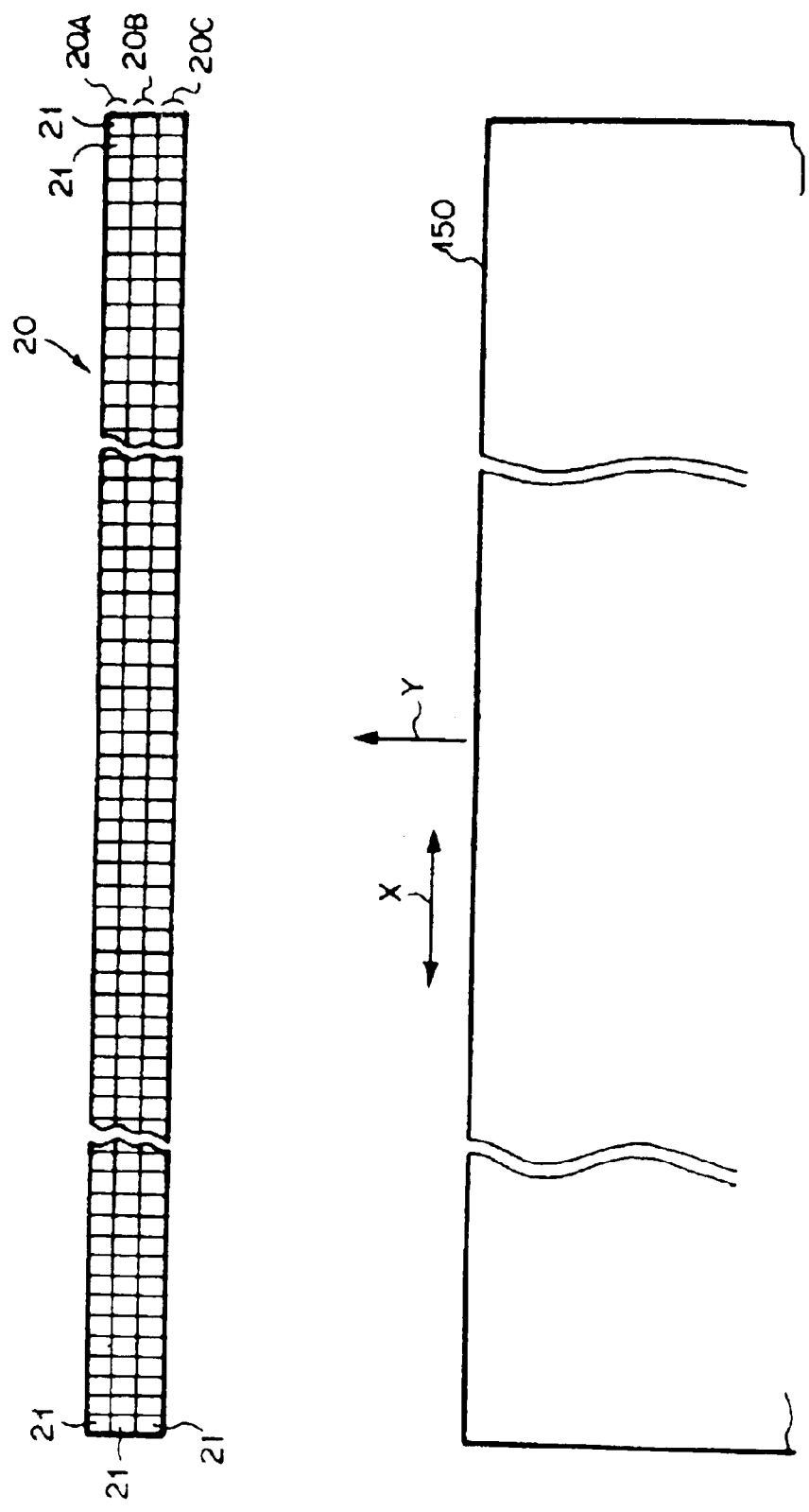
FIG. 20 is an explanatory view showing the line sensor in the embodiment of FIG. 19, FIGS. 21A, 21B, and 21C are explanatory views showing how the embodiment of FIG. 19 operates.

In this embodiment of the fifth radiation image read-out apparatus in accordance with the present invention, the beam width $d_L$ of the stimulating rays L for stimulating the stimulable phosphor material 53 of the sheet 150 is smaller than the width $d_C$ of each fine cell C. In cases where the beam width $d_L$ of the stimulating rays L is larger than the width $d_C$ of each fine cell C (e.g., in cases where, as illustrated in FIG. 19, the stimulating rays L are irradiated simultaneously to the area of three rows of the fine cells C, C, . . . ), as illustrated in FIG. 20, the line sensor 20 may be employed, which comprises three rows 20A, 20B, and 20C of the photoelectric conversion devices 21, 21, . . . . The rows 20A, 20B, and 20C of the photoelectric conversion devices 21, 21, . . . extend in the direction indicated by the arrow X (shown in FIG. 16) and stand side by side along the conveyance direction (indicated by the arrow Y) of the sheet 150. Also, the image information reading means 30 may be employed, which is provided with the addition means 31 for performing addition processing on the outputs of the photoelectric conversion devices 21, 21, . . . , which outputs have been obtained at respective positions of movement of the sheet 150 performed by the scanning belt 40 and correspond to an identical site (in this case, an identical fine cell C) on the sheet 150. Such an embodiment constitutes an embodiment of the sixth radiation image read-out apparatus in accordance with the present invention.

How the embodiment of the sixth radiation image read-out apparatus in accordance with the present invention operates will be described hereinbelow with reference to FIGS. 21 and 22.

Figure 21A:
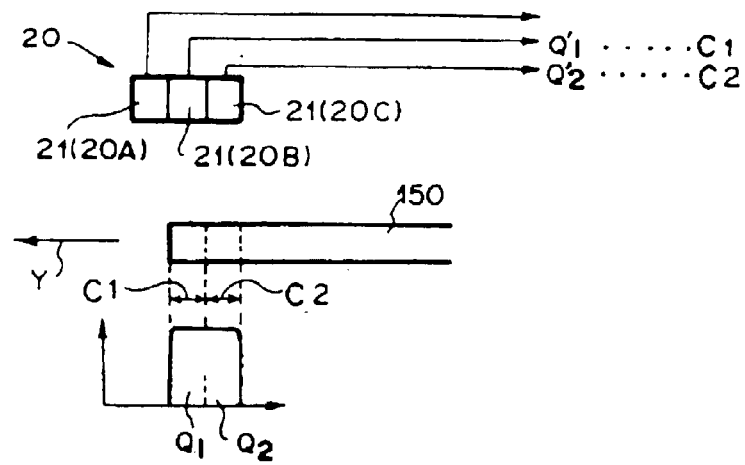

Firstly, as illustrated in FIG. 21A, in cases where the stimulating rays L are converged onto fine cells C1 and C2 at the leading end of the sheet 150, as viewed in the conveyance direction of the sheet 150 (indicated by the arrow Y), the light M having the intensity distribution shown in FIG. 21A is emitted. The light quantity of the light M emitted from the fine cell C1 is equal to Q1. The emitted light M of the light quantity Q1 is received by a photoelectric conversion device 21, which belongs to a photoelectric conversion device row 20B shown in FIG. 20 and which corresponds to the fine cell C1 of the sheet 150. The light quantity of the light M emitted from the fine cell C2 of the sheet 150 is equal to Q2. The emitted light M of the light quantity Q2 is received by a photoelectric conversion device 21, which belongs to a photoelectric conversion device row 20C and which corresponds to the fine cell C2 of the sheet 150.

The photoelectric conversion device 21 of the row 20B photoelectrically converts the emitted light M of the light quantity Q1 into an electric charge Q'1 and transfers the electric charge Q'1 into the addition means 31. As illustrated in FIG. 22, in accordance with the scanning speed of the scanning belt 40, the addition means 31 stores information representing the electric charge Q'1, which has been received from the photoelectric conversion device 21 of the row 20B, in a memory region (in the addition means 31) corresponding to the fine cell C1 of the sheet 150. Also, the photoelectric conversion device 21 of the row 20C photoelectrically converts the emitted light M of the light quantity Q2 into an electric charge Q'2 and transfers the electric charge Q'2 into the addition means 31. The addition means 31 stores the information representing the electric charge Q'2 in a memory region corresponding to the fine cell C2 of the sheet 150.

Figure 21B:
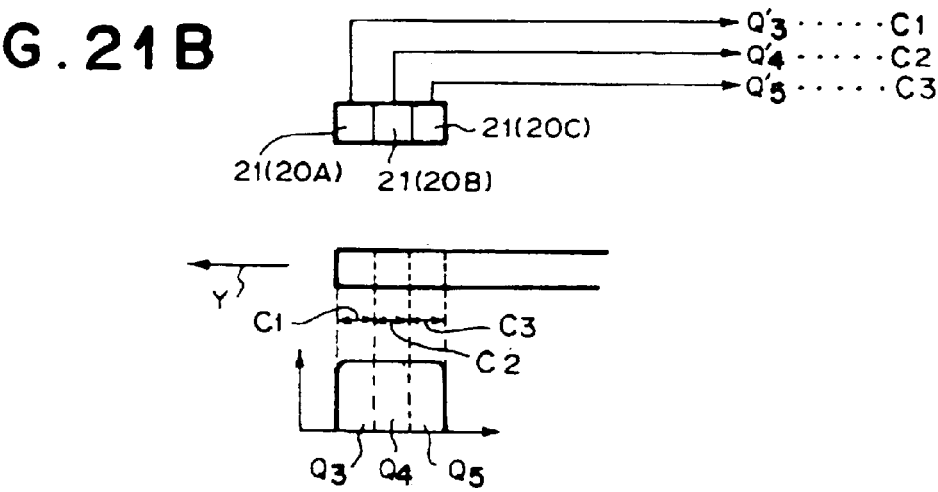

Thereafter, as illustrated in FIG. 21B, the sheet 150 is conveyed, and the stimulating rays L are irradiated onto the fine cells C1, C2, and C3 of the sheet 150. In this state, as described above, the light M is emitted from the fine cells C1, C2, and C3 of the sheet 150. The light M of a light quantity Q3 is emitted from the fine cell C1, the light M of a light quantity Q4 is emitted from the fine cell C2, and the light M of a light quantity Q5 is emitted from the fine cell C3. The emitted light M is received by the corresponding photoelectric conversion device 21 of the row 20A, the corresponding photoelectric conversion device 21 of the row 20B, and the corresponding photoelectric conversion device 21 of the row 20C.

The photoelectric conversion device 21 of the row 20A, the photoelectric conversion device 21 of the row 20B, and the photoelectric conversion device 21 of the row 20C convert the emitted light M into electric charges Q'3, Q'4, and Q'5 and transfer them into the addition means 31.

In accordance with the scanning speed of the scanning belt 40, the addition means 31 stores pieces of information representing the electric charges Q'3, Q'4, and Q'5, which have been received respectively from the photoelectric conversion device 21 of the row 20A, the photoelectric conversion device 21 of the row 2DB, and the photoelectric conversion device 21 of the row 20C, in memory regions (in the addition means 31) corresponding to the fine cells C1, C2, and C3 of the sheet 150. In the memory region corresponding to the fine cell C1, the value of the electric charge Q'3 is added to the previously stored value of the electric charge Q'1. Also, in the memory region corresponding to the fine cell C2, the value of the electric charge Q'4 is added to the previously stored value of the electric charge Q'2.

Figure 21C:
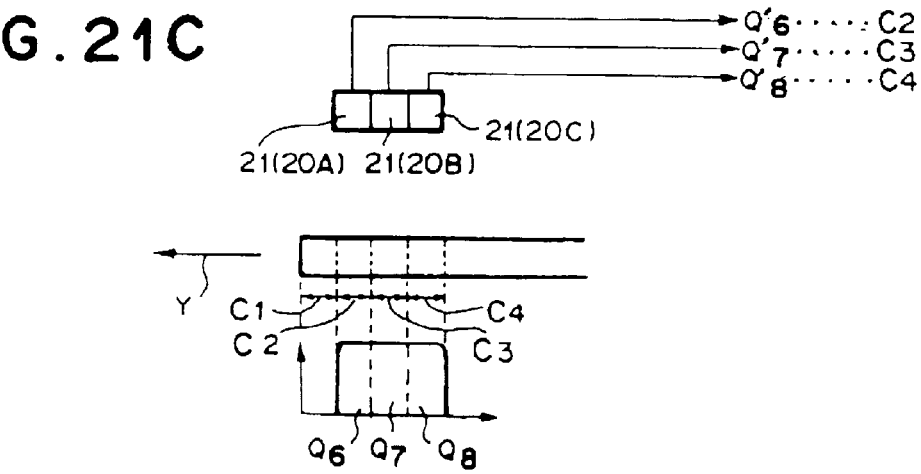

As illustrated in FIG. 21C, the sheet 150 is then conveyed, and the stimulating rays L are irradiated onto the fine cells C2, C3, and C4 of the sheet 150. In this state, in the same manner as that described above, pieces of information representing electric charges Q'6, Q'7, and Q'8, which have been received respectively from the photoelectric conversion device 21 of the row 20A, the photoelectric conversion device 21 of the row 20B, and the photoelectric conversion device 21 of the row 20C, are stored in the memory regions corresponding to the fine cells C2, C3, and C4 of the sheet 150 and added to the previous stored values.

The operation described above is iterated at respective positions of conveyance of the sheet 150. In this manner, as illustrated in FIG. 22, the total sum of the emitted light M having been received at the respective positions of conveyance of the sheet 150 is stored in the memory region of the addition means 31 corresponding to each site on the sheet 150.

The image signal having thus been stored in the memory is fed from the image information reading means 30 into an external image processing unit, or the like, and utilized for reproducing a visible image for diagnosis, or the like.

As described above, with the embodiment of the sixth radiation image read-out apparatus in accordance with the present invention, in cases where the beam width $d_L$ of the stimulating rays L is larger than the width $d_C$ of each fine cell, all of the light M emitted from the fine cells C, C, . . . adjacent to one another in the line width direction can be collected, and the light collecting efficiency can be enhanced.

The utilization of the line sensor 20 comprising the plurality of rows of the photoelectric conversion devices 21, 21, . . . is not limited to the cases where the beam width $d_L$ of the stimulating rays L is larger than the width $d_C$ of each fine cell. As illustrated in FIG. 23, in cases where the beam width $d_L$ of the stimulating rays L is smaller than the width $d_C$ of each fine cell, the emitted light M occurring with a beam width $d_M$ approximately equal to the width $d_C$ of a fine cell C by being stimulated by the stimulating rays L scattering in the fine cell C can be photoelectrically detected by the line sensor 20, which comprises the rows of the photoelectric conversion devices 21, 21, . . . each having a width ($d_P < d_M$) smaller than the beam width $d_M$ of the emitted light M. In this manner, the resolution can be kept high, and the light collecting efficiency can be enhanced.

As illustrated in FIG. 20, the line sensor 20 employed in this embodiment of the sixth radiation image read-out apparatus in accordance with the present invention comprises the plurality of the photoelectric conversion devices 21, 21, . . . arrayed in the matrix-like pattern such that they may stand in a straight line along each of the length direction (i.e., the major axis direction) of the line sensor 20 and the direction (i.e., the minor axis direction) normal to the major axis direction. However, the line sensor employed in the sixth radiation image read-out apparatus is not limited to the constitution shown in FIG. 20. For example, as in the line sensor 80 illustrated in FIG. 7A, the photoelectric conversion devices 21, 21, . . . may be arrayed such that they may stand in a straight line along the major axis direction (indicated by the double-headed arrow X) and in a zigzag pattern along the minor axis direction (indicated by the arrow Y). As another alternative, as in the line sensor 90 illustrated in FIG. 7B, the photoelectric conversion devices 21, 21, . . . may be arrayed such that they may stand in a straight line along the minor axis direction and in a zigzag pattern along the major axis direction.

Also, in lieu of the addition means, one of other kinds of operation means may be provided. Also, simple addition processing, weighted addition processing, or one of various other kinds of operation processing may be employed.

The fifth and sixth radiation image read-out apparatuses in accordance with the present invention are not limited to the embodiments described above and may be embodied in various other ways. For example, various known constitutions may be employed as the light source, the light guiding optical system between the light source and the sheet, the optical systems between the sheet and the line sensor, the line sensor, or the addition means. Also, the radiation image read-out apparatus may further comprise an image processing unit, which performs various kinds of signal processing on the image signal obtained from the image information reading means, and/or erasing means for appropriately releasing radiation energy remaining on the sheet from which the image signal has been detected.

Figure 24:
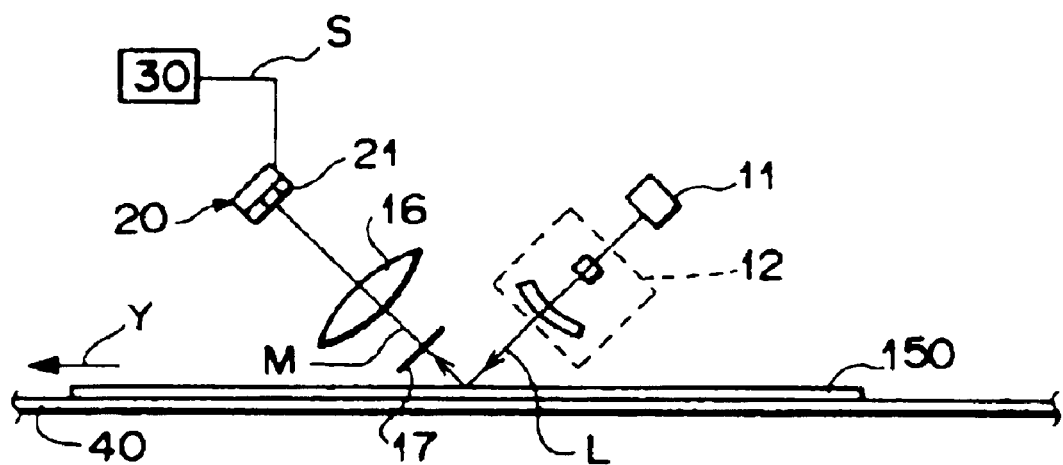
FIG. 24 is a sectional view showing a further different embodiment of the sixth radiation image read-out apparatus in accordance with the present invention.

Also, in the aforesaid embodiments of the fifth and sixth radiation image read-out apparatuses in accordance with the present invention, part of the optical path of the stimulating rays L and part of the optical path of the emitted light M overlap each other, and the size of the apparatus is thereby reduced. Alternatively, for example, as illustrated in FIG. 24, the sixth radiation image read-out apparatus in accordance with the present invention may be constituted such that the optical path of the stimulating rays L and the optical path of the emitted light M may not overlap each other. The apparatus shown in FIG. 24 has basically the same constitution as that of the apparatus shown in FIG. 8.

How the embodiment of the sixth radiation image read-out apparatus in accordance with the present invention, which is shown in FIG. 24, operates will be described hereinbelow.

Firstly, the scanning belt 40 moves in the direction indicated by the arrow Y, and the sheet 150, on which the radiation image has been stored and which is supported on the scanning belt 40, is conveyed in the direction indicated by the arrow Y. The conveyance speed of the sheet 150 is equal to the movement speed of the scanning belt 40. Information representing the movement speed of the scanning belt 40 is fed into the addition means 31.

The BLD 11 radiates out the stimulating rays L having a linear pattern. The stimulating rays L are radiated out at an angle of approximately 45 degrees with respect to the front surface of the sheet 150. The stimulating rays L are collimated by the optical system 12, which is constituted of the collimator lens and the toric lens and is located in the optical path of the stimulating rays L. The collimated stimulating rays L impinge upon the front surface of the sheet 150 at an angle of approximately 45 degrees with respect to the front surface of the sheet 150. At this time, the stimulating rays L impinge upon the linear area on the front surface of the sheet 150, which linear area extends in the direction indicated by the arrow X.

The light M is emitted from the linear area exposed to the stimulating rays L, or from the exposed linear area and the neighboring areas (in cases where the width of the exposed linear area is smaller than the width of each fine cell C). The emitted light M passes through the stimulating ray cut-off filter 17, which filters out the stimulating rays L mixed in the emitted light M. The emitted light M then impinges upon the SELFOC lens array 16 and is converged onto each of the light receiving surfaces of the photoelectric conversion devices 21, 21, . . . constituting the line sensor 20.

The operation performed after the emitted light M is received by the line sensor 20 is the same as that in the aforesaid embodiment of the sixth radiation image read-out apparatus in accordance with the present invention.

FIG. 24 shows the embodiment of the sixth radiation image read-out apparatus in accordance with the present invention, wherein the line sensor 20 comprises a plurality of rows of the photoelectric conversion devices 21, 21, . . . and the addition means 31 is utilized. The constitution shown in FIG. 24 is also applicable to the fifth radiation image read-out apparatus in accordance with the present invention, wherein the line sensor 120 comprises only one row of the photoelectric conversion devices 21, 21, . . . and the addition means 31 is not provided.

As described above, with the embodiment of the sixth radiation image read-out apparatus in accordance with the present invention having the constitution shown in FIG. 24, wherein the photoelectric conversion devices 21, 21, . . . each having a light receiving width $d_P$ ($<d_M$) shorter than the line width $d_M$ of the emitted light M (i.e., the line width on the light receiving surface of each photoelectric conversion device) are employed, a desired level of resolution can be obtained, and the line sensor 20 as a whole can receive the emitted light M over approximately the entire line width of the emitted light. Therefore, the light receiving efficiency can be enhanced. Also, the addition means 31 performs the addition processing on the outputs of the photoelectric conversion devices 21, 21, . . . constituting the line sensor 20, which outputs have been obtained at respective positions of sheet movement performed by the scanning belt 40 and which outputs correspond to an identical site on the sheet 150. Accordingly, the light collecting efficiency at each site on the sheet 150 can be enhanced.

In the aforesaid embodiments of the fifth and sixth radiation image read-out apparatuses in accordance with the present invention, the light source for producing the stimulating rays L and the line sensor are located on the same surface side of the sheet 150, and the emitted light M emanating from the surface of the sheet 150, upon which the stimulating rays L impinge, is received by the line sensor 20. However, the fifth and sixth radiation image read-out apparatuses in accordance with the present invention are not limited to the aforesaid embodiments. For example, as illustrated in FIG. 25, a stimulable phosphor sheet 150' whose substrate is formed from a material permeable to the emitted light M (e.g., the sheet having the same structure as that shown in FIG. 17B) may be employed, and the light source for producing the stimulating rays L and the line sensor may be located on opposite surface sides of the sheet 150'. In this manner, the emitted light M emanating from the surface opposite to the surface of the sheet 150', upon which the stimulating rays L impinge, may be received by the line sensor 20. The apparatus shown in FIG. 25 has basically the same constitution as that of the apparatus shown in FIG. 9.

How the embodiment of the sixth radiation image read-out apparatus in accordance with the present invention, which is shown in FIG. 25, operates will be described hereinbelow.

Firstly, the conveyor belt 40' moves in the direction indicated by the arrow Y, and the sheet 150', on which the radiation image has been stored and which is supported by the conveyor belt 40', is conveyed in the direction indicated by the arrow Y. The conveyance speed of the sheet 150' is equal to the movement speed of the conveyor belt 40'. Information representing the movement speed of the conveyor belt 40' is fed into the addition means 31.

The BLD 11 radiates out the stimulating rays L having a linear pattern. The stimulating rays L are radiated out in the direction approximately normal to the front surface of the sheet 150'. The stimulating rays L are collimated by the optical system 12, which is constituted of the collimator lens and the toric lens and is located in the optical path of the stimulating rays L. The collimated stimulating rays L impinge upon the front surface of the sheet 150' from the direction approximately normal to the front surface of the sheet 150'. At this time, the stimulating rays L impinge upon the linear area on the front surface of the sheet 150', which linear area extends in the direction indicated by the arrow X.

The light M is emitted from the linear area exposed to the stimulating rays L, or from the exposed linear area and the neighboring areas (in cases where the width of the exposed linear area is smaller than the width of each fine cell C). At the same time, the emitted light M' having passed through the transparent substrate of the sheet 150' emanates from a linear area of the back surface of the sheet 150'.

The emitted light M', which emanates from the linear area of the back surface of the sheet 150', passes through the stimulating ray cut-off filter 17, which filters out the stimulating rays L mixed in the emitted light M'. The emitted light M' then impinges upon the SELFOC lens array 16 and is converged onto each of the light receiving surfaces of the photoelectric conversion devices 21, 21, . . . constituting the line sensor 20.

The operation performed after the emitted light M' is received by the line sensor 20 is the same as that in the aforesaid embodiment of the sixth radiation image read-out apparatus in accordance with the present invention.

FIG. 25 shows the embodiment of the sixth radiation image read-out apparatus in accordance with the present invention, wherein the line sensor 20 comprises a plurality of rows of the photoelectric conversion devices 21, 21, . . . and the addition means 31 is utilized. The constitution shown in FIG. 24 is also applicable to the fifth radiation image read-out apparatus in accordance with the present invention, wherein the line sensor 120 comprises only one row of the photoelectric conversion devices 21, 21. . . . and the addition means 31 is not provided.

As described above, with the embodiment of the sixth radiation image read-out apparatus in accordance with the present invention having the constitution shown in FIG. 25, wherein the photoelectric conversion devices 21, 21, . . . each having a light receiving width $d_P$ ($<d_M$) shorter than the line width $d_M$ of the emitted light M (i.e., the line width on the light receiving surface of each photoelectric conversion device) are employed, a desired level of resolution can be obtained, and the line sensor 20 as a whole can receive the emitted light M over approximately the entire line width of the emitted light. Therefore, the light receiving efficiency can be enhanced. Also, the addition means 31 performs the addition processing on the outputs of the photoelectric conversion devices 21, 21, . . . constituting the line sensor 20, which outputs have been obtained at respective positions of sheet movement performed by the conveyor belt 40' and which outputs correspond to an identical site on the sheet 150'. Accordingly, the light collecting efficiency at each site on the sheet 150' can be enhanced.

Embodiments of the seventh, eighth, and ninth radiation image read-out apparatuses in accordance with the present invention will be described hereinbelow.

FIG. 26A is a perspective view showing an embodiment of the seventh radiation image read-out apparatus in accordance with the present invention. FIG. 26B is a sectional view taken on line I—I of FIG. 26A.

With reference to FIGS. 26A and 26B, the radiation image read-out apparatus comprises conveyor belts 40A and 40B for supporting a stimulable phosphor sheet (hereinbelow referred to simply as the sheet) 50', on which a radiation image has been stored, and conveying the sheet 50' in the direction indicated by the arrow Y. The radiation image read-out apparatus also comprises the broad area semiconductor laser (hereinbelow referred to as the BLD) 11 for radiating out a linear laser beam L having a linear pattern with a line width of approximately 100 $\mu$m and having wavelengths falling within the range of 600 nm to 700 nm.

The laser beam L is radiated out approximately in parallel with the front surface of the sheet 50'. The radiation image read-out apparatus further comprises the optical system 12, which is constituted of a combination of a collimator lens for collimating the linear laser beam L having been radiated out of the BLD 11 and a toric lens for expanding the beam only in one direction. The radiation image read-out apparatus still further comprises the dichroic mirror 14, which is located at an angle of 45 degrees with respect to the front surface of the sheet 50' and which is set so as to reflect the laser beam L and to transmit emitted light M described later. The radiation image read-out apparatus also comprises the first SELFOC lens array 15. The first SELFOC lens array 15 converges the linear laser beam L, which has been reflected from the dichroic mirror 14, into a linear beam (having a line width of approximately 100 µm) extending along the direction indicated by the arrow X (parallel to the side edge of the sheet 50') on the sheet 50'. Also, the first SELFOC lens array 15 collimates the emitted M, which is emitted from the front surface (i.e., the upper surface in FIG. 26A) of the sheet 50' exposed to the linear laser beam L and which carries image information of the radiation image stored on the sheet 50'. The radiation image read-out apparatus further comprises the second SELFOC lens array 16 for converging the emitted light M, which has been collimated by the first SELFOC lens array 15 and has then passed through the dichroic mirror 14, onto light receiving surfaces of photoelectric conversion devices 21, 21, . . . constituting a line sensor 120, which will be described later. The radiation image read-out apparatus still further comprises the stimulating ray cut-off filter 17 for transmitting only the emitted light M and filtering out the laser beam L, which has been reflected from the front surface of the sheet 50' and which is mixed slightly in the emitted light M having passed through the second SELFOC lens array 16. The radiation image read-out apparatus also comprises the line sensor 120, which is constituted of a plurality of photoelectric conversion devices 21, 21, . . . for receiving the emitted light M having passed through the stimulating ray cut-off filter 17 and for photoelectrically converting the emitted light M. The radiation image read-out apparatus further comprises a stimulating ray cut-off filter 17'. The stimulating ray cut-off filter 17' transmits only the emitted light M', which emanates from the back surface (i.e., the lower surface in FIG. 26A) of the sheet 50'. The stimulating ray cut-off filter 17' filters out the laser beam L, which has passed through the sheet 50' and emanates slightly from the back surface of the sheet 50' together with the emitted light M'. The radiation image read-out apparatus also comprises a third SELFOC lens array 16' for converging the emitted light M', which has passed through the stimulating ray cut-off filter 17', onto light receiving surfaces of photoelectric conversion devices 21', 21', . . . constituting a line sensor 120', which will be described later. The radiation image read-out apparatus further comprises the line sensor 120', which is constituted of a plurality of the photoelectric conversion devices 21', 21', . . . for receiving the emitted light M' having passed through the third SELFOC lens array 16' and for photoelectrically converting the emitted light M'. The radiation image read-out apparatus still further comprises image information reading means 130. The image information reading means 130 reads an image signal made up of signal components (outputs) obtained from the photoelectric conversion devices 21, 21, . . . constituting the line sensor 120 and an image signal made up of signal components (outputs) obtained from the photoelectric conversion devices 21', 21', . . . constituting the line sensor 120'. Also, the image information reading means 130 performs predetermined weighted addition processing on signal components of the two image signals, which image signal components represent corresponding pixels on the front and back surfaces of the sheet 50'.

The sheet 50' employed in the embodiment of the seventh radiation image read-out apparatus in accordance with the present invention comprises a substrate layer and a stimulable phosphor layer overlaid on the substrate layer. The substrate layer is formed from a material permeable to the light emitted by the sheet 50'.

The first SELFOC lens array 15 acts such that an image of the emission area of the emitted light M on the sheet 50' is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the photoelectric conversion devices 21, 21, . . . . The third SELFOC lens array 16' acts such that an image of the emitted light M' on the back surface of the sheet 50' is formed in one-to-one size relationship on the image surface at the light receiving surfaces of the photoelectric conversion devices 21', 21', . . . of the line sensor 120'.

Figure 27:
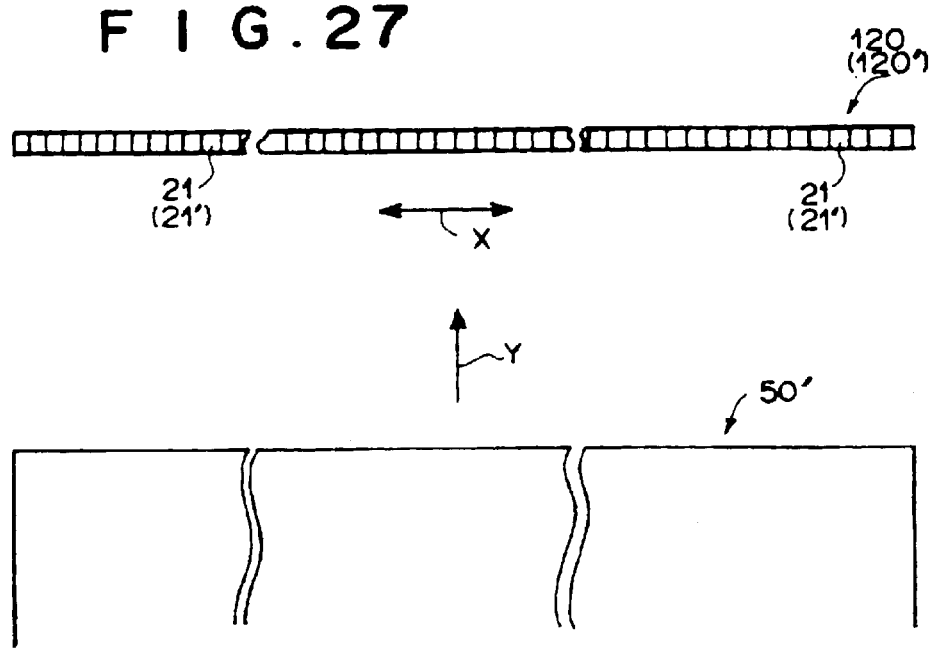
FIG. 27 is an explanatory view showing relationship between a line sensor 20 and a direction of movement of a stimulable phosphor sheet 50'.

As illustrated in FIG. 27, the line sensor 120 and the line sensor 120' comprise a plurality of (e.g., at least 1,000 pieces of) the photoelectric conversion devices 21, 21, . . . or the photoelectric conversion devices 21', 21', . . . arrayed along the direction indicated by the double-headed arrow X. Each of the photoelectric conversion devices 21, 21, . . . constituting the line sensor 120 or each of the photoelectric conversion devices 21', 21', . . . constituting the line sensor 120' has the light receiving surface having a size of approximately 100 µm×100 µm. The size of each light receiving surface is the size capable of receiving the emitted light M occurring from part having a size of approximately 100 µm×100 µm on the surface of the sheet 50'. As the photoelectric conversion devices 21, 21, . . . and the photoelectric conversion devices 21', 21', . . . , amorphous silicon sensors, CCD image sensors, MOS image sensors, or the like, may be employed.

How this embodiment of the seventh radiation image read-out apparatus in accordance with the present invention operates will be described hereinbelow.

Firstly, the conveyor belts 40A and 40B move in the direction indicated by the arrow Y, and the sheet 50', on which the radiation image has been stored and which is supported on the conveyor belts 40A and 40B, is conveyed in the direction indicated by the arrow Y. The conveyance speed of the sheet 50' is equal to the movement speed of the conveyor belts 40A and 40B. Information representing the movement speed of the conveyor belts 40A and 40B is fed into the image information reading means 130.

The BLD 11 radiates out the laser beam L having a linear pattern with a line width of approximately 100 µm. The laser beam L is radiated out approximately in parallel with the front surface of the sheet 50'. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the front surface of the sheet 50'. The reflected laser beam L is converged by the first SELFOC lens array 15 into a linear beam (having a line width $d_L$ of approximately 100 µm) extending along the direction indicated by the arrow X on the sheet 50'.

The laser beam L impinging upon the sheet 50' stimulates the stimulable phosphor at the exposed area of the sheet 50'.

As a result, the light M and the light M' carrying the image information stored on the sheet 50' is emitted respectively from the front and back surfaces of the sheet 50'.

The light M emitted from the front surface of the sheet 50' is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 120. At this time, the laser beam L, which has been reflected from the front surface of the sheet 50' and is mixed slightly in the emitted light M having passed through the second SELFOC lens array 16, is filtered out by the stimulating ray cut-off filter 17.

The emitted light M having passed through the stimulating ray cut-off filter 17 is received by the photoelectric conversion devices 21, 21, . . . constituting the line sensor 120 and photoelectrically converted into signal components Q, Q, . . . . An image signal S made up of the signal components Q, Q, . . . is fed into the image information reading means 130.

The light M' emitted from the back surface of the sheet 50' passes through the stimulating ray cut-off filter 17' and impinges upon the third SELFOC lens array 16'. At this time, the laser beam L having passed through the sheet 50' is slightly radiated from the back surface of the sheet 50' together with the emitted light M'. The laser beam L mixed in the emitted light M' is filtered out by the stimulating ray cut-off filter 17'.

The emitted light M' having passed through the stimulating ray cut-off filter 17' is converged by the third SELFOC lens array 16' onto each of the light receiving surfaces of the photoelectric conversion devices 21', 21', . . . constituting the line sensor 120'. The emitted light Ml having thus been converged is received by the photoelectric conversion devices 21', 21', . . . constituting the line sensor 120' and photoelectrically converted into signal components Q', Q', . . . . An image signal S' made up of the signal components Q', Q', . . . is fed into the image information reading means 130.

The image information reading means 130 receives the image signal S from the line sensor 120 and receives the image signal S' from the line sensor 120'. The image information reading means 130 discriminates which signal component Q or Q' corresponds to which pixel on the sheet 50' corresponding to the amount of displacement of the conveyor belts 40A and 40B. Also, the image information reading means 130 performs weighted addition processing with a predetermined addition ratio on the signal components of the two image signals S and S', which image signal components represent corresponding pixels on the front and back surfaces of the sheet 50'. In this manner, an addition signal is obtained.

As described above, with this embodiment of the seventh radiation image read-out apparatus in accordance with the present invention, the addition signal is obtained from the addition processing of the two image signals S and S' detected from the front and back surfaces of the sheet 50'. In the addition signal, noise occurring at random on the front and back surfaces of the sheet 50' is dispersed in the effective image storing region of the sheet 50'. Therefore, noise components can be rendered imperceptible with respect to the entire sheet 50'. Also, since the light M emitted from the front surface of the sheet 50' and the light M' emitted from the back surface of the sheet 50' are respectively collected at the front and back surfaces of the sheet 50', the light collecting efficiency can be enhanced. As a result, an image signal having a markedly enhanced signal-to-noise ratio can be obtained.

Figure 28:
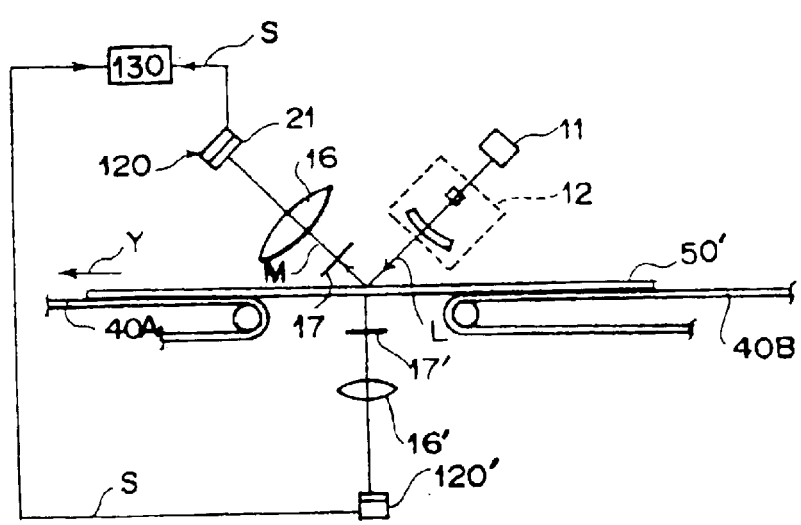
FIG. 28 is a sectional view showing a different embodiment of the seventh radiation image read-out apparatus in accordance with the present invention.

In the aforesaid embodiment of the seventh radiation image read-out apparatus in accordance with the present invention, part of the optical path of the laser beam L and part of the optical path of the light M emitted from the front surface of the sheet 50' overlap each other, and the size of the apparatus is reduced. Alternatively, as illustrated in FIG. 28, the seventh radiation image read-out apparatus in accordance with the present invention may be constituted such that the optical path of the laser beam L and the optical path of the light emitted M do not overlap each other. Also, the embodiment of FIG. 28 may be modified such that a line light source is located also on the back surface side of the sheet 50'. In such a modification, it is necessary for a sheet provided with a substrate formed from a material permeable to the stimulating rays to be employed.

In the seventh radiation image read-out apparatus in accordance with the present invention, in lieu of the line sensors 120 and 120', the line sensor 20 having the constitution shown in FIG. 2 and a line sensor 20' of the same type may be employed.

With the embodiment of the seventh radiation image read-out apparatus in accordance with the present invention, wherein the line sensors 20 and 20' comprising a plurality of rows of photoelectric conversion devices 21, 21, . . . or a plurality of rows of photoelectric conversion devices 21', 21', . . . are employed, the same effects as those of the aforesaid embodiment of the seventh radiation image read-out apparatus in accordance with the present invention can be obtained. Also, in cases where the light receiving width (i.e., the width in the minor axis direction of the line sensor 20) of each of the photoelectric conversion devices 21, 21, . . . is shorter than the line width of the emitted light M (i.e., the distribution width shown in the emitted light intensity distribution diagram in FIG. 2) the line sensor 20 as a whole can receive the emitted light M over approximately the entire line width of the emitted light. Therefore, the light receiving efficiency can be enhanced. Accordingly, for example, in cases where, after the laser beam L having the beam width $d_L$ (shown in FIG. 3A) approximately equal to the light receiving width of the photoelectric conversion device row 20B impinges upon the sheet 50', the laser beam L is scattered in the sheet 50' and stimulates the area having a width (the width $d_M$) larger than the beam width $d_L$, and the light M (with the intensity distribution shown in FIG. 3C) having a beam width $d_M$ larger than the light receiving width of the photoelectric conversion device row 20B is emitted as illustrated in FIG. 3B, the emitted light M having the wide beam width can be received efficiently.

As each of the line sensors 20 and 20' comprising a plurality of rows of photoelectric conversion devices 21, 21, . . . or a plurality of rows of photoelectric conversion devices 21', 21', . . . , the line sensor 80 shown in FIG. 7A or the line sensor 90 shown in FIG. 7B may be employed.

Also, as the sheet 50', the sheet (the anisotropic sheet) 150 shown in FIG. 17A may also be employed. The sheet 150 has the sectional structure shown in FIG. 17B or the sectional structure of the sheet 160 shown in FIG. 17C. In such cases, the stimulating ray reflecting partition member 51 is formed from a material capable of reflecting the laser beam L and transmitting the emitted light M. The stimulating ray reflecting partition member 51 suppresses the scattering of the laser beam L to the direction in which the sheet surface extends. Therefore, the sharpness of the image reproduced from the image signal having been obtained from the photoelectric conversion can be enhanced.

Figure 29A:
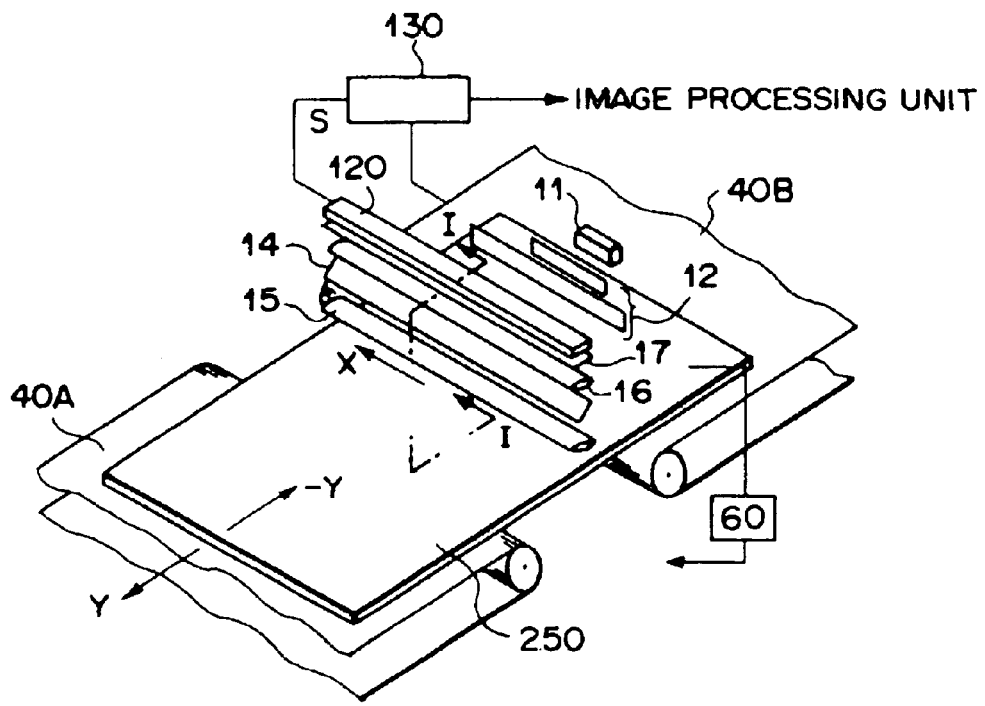
FIG. 29A is a perspective view showing an embodiment of the eighth radiation image read-out apparatus in accordance with the present invention.
Figure 29B:
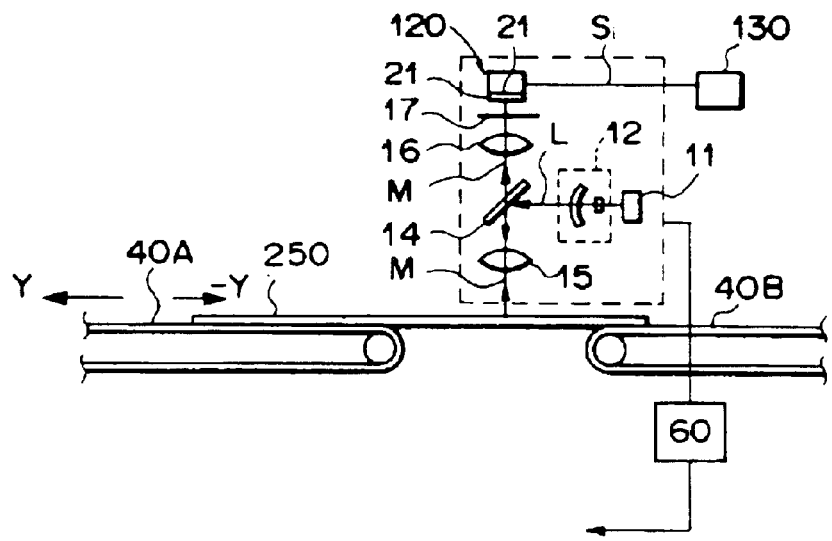
FIG. 29B is a sectional view taken on line I—I of FIG. 29A.

FIG. 29A is a perspective view showing an embodiment of the eighth radiation image read-out apparatus in accordance with the present invention. FIG. 29B is a sectional view taken on line I—I of FIG. 29A.

With reference to FIGS. 29A and 29B, the radiation image read-out apparatus comprises the conveyor belts 40A and 40B for supporting a stimulable phosphor sheet (hereinbelow referred to simply as the sheet) 250, on which a radiation image has been stored, and conveying the sheet 250 in the direction indicated by the arrow Y and in the direction indicated by the arrow −Y. The radiation image read-out apparatus also comprises the BLD 11 for radiating out a linear laser beam L having a linear pattern with a line width of approximately 100 μm and having wavelengths falling within the range of 600 nm to 700 nm. The laser beam L is radiated out approximately in parallel with the front surface of the sheet 250. The radiation image read-out apparatus further comprises the optical system 12, which is constituted of a combination of a collimator lens for collimating the linear laser beam L having been radiated out of the BLD 11 and a toric lens for expanding the beam only in one direction. The radiation image read-out apparatus still further comprises the dichroic mirror 14, which is located at an angle of 45 degrees with respect to the front surface of the sheet 250 and which is set so as to reflect the laser beam L and to transmit emitted light M described later. The radiation image read-out apparatus also comprises the first SELFOC lens array 15. The first SELFOC lens array 15 converges the linear laser beam L, which has been reflected from the dichroic mirror 14, into a linear beam (having a line width of approximately 100 μm) extending along the direction indicated by the arrow X (parallel to the side edge of the sheet 250) on the sheet 250. Also, the first SELFOC lens array 15 collimates the emitted M, which is emitted from the front surface (i.e., the upper surface in FIG. 29A) of the sheet 250 exposed to the linear laser beam L and which carries image information of the radiation image stored on the sheet 250. The radiation image read-out apparatus further comprises the second SELFOC lens array 16 for converging the emitted light M, which has been collimated by the first SELFOC lens array 15 and has then passed through the dichroic mirror 14, onto the light receiving surfaces of the photoelectric conversion devices 21, 21, . . . constituting the line sensor 120. The radiation image read-out apparatus still further comprises the stimulating ray cut-off filter 17 for transmitting only the emitted light M and filtering out the laser beam L, which has been reflected from the front surface of the sheet 250 and which is mixed slightly in the emitted light M having passed through the second SELFOC lens array 16. The radiation image read-out apparatus also comprises the line sensor 120, which is constituted of a plurality of the photoelectric conversion devices 21, 21, . . . for receiving the emitted light M having passed through the stimulating ray cut-off filter 17 and for photoelectrically converting the emitted light M. The radiation image read-out apparatus further comprises a shifting means 60 for shifting the light guiding optical system, which contains the line sensor 120 and the BLD 11, to the back surface side of the sheet 250 after the emitted light M has been detected from the front surface of the sheet 250. The radiation image read-out apparatus also comprises the image information reading means 130. The image information reading means 130 receives the image signals S and S' having been detected respectively from the front and back surfaces of the sheet 250 by the line sensor 120. Also, the image information reading means 130 performs predetermined weighted addition processing on signal components of the two image signals S and S', which image signal components represent corresponding pixels on the front and back surfaces of the sheet 250.

The sheet 250 employed in the embodiment of the eighth radiation image read-out apparatus in accordance with the present invention comprises a substrate layer, which is formed from a material blocking the stimulating rays, and two stimulable phosphor layers formed on the front and back surface sides of the sheet 250 with the substrate layer intervening therebetween.

How this embodiment of the eighth radiation image read-out apparatus in accordance with the present invention operates will be described hereinbelow.

Firstly, the conveyor belts 40A and 40B move in the direction indicated by the arrow Y, and the sheet 250, on which the radiation image has been stored and which is supported on the conveyor belts 40A and 40B, is conveyed in the direction indicated by the arrow Y. The conveyance speed of the sheet 250 is equal to the movement speed of the conveyor belts 40A and 40B. Information representing the movement speed of the conveyor belts 40A and 40B is fed into the image information reading means 130.

The BLD 11 radiates out the laser beam L having a linear pattern with a line width of approximately 100 m. The laser beam L is radiated out approximately in parallel with the front surface of the sheet 250. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the front surface of the sheet 250. The reflected laser beam L is converged by the first SELFOC lens array 15 into a linear beam extending along the direction indicated by the arrow X on the front surface of the sheet 250.

The laser beam L impinging upon the sheet 250 stimulates the stimulable phosphor at the exposed area of the front surface of the sheet 250. As a result, the light M carrying the image information stored on the sheet 250 is emitted from the front surface of the sheet 250. At this time, since the laser beam L does not pass through the substrate layer of the sheet 250, it does not stimulate the stimulable phosphor at the back surface of the sheet 250. Therefore, no light is emitted from the back surface of the sheet 250.

The light M emitted from the front surface of the sheet 250 is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 120. At this time, the laser beam L, which has been reflected from the front surface of the sheet 250 and is mixed slightly in the emitted light M having passed through the second SELFOC lens array 16, is filtered out by the stimulating ray cut-off filter 17.

The emitted light M having passed through the stimulating ray cut-off filter 17 is received by the photoelectric conversion devices 21, 21, . . . constituting the line sensor 120 and photoelectrically converted into signal components Q, Q, . . . . The image signal S made up of the signal components Q. Q, . . . is fed into the image information reading means 130.

When the image signal S has been detected from the entire front surface of the sheet 250, the shifting means 60 shifts the light guiding optical system, which contains the line sensor 120 and the BLD 11, to the back surface side of the sheet 250.

Also, the conveyor belts 40A and 40B moves reversely in the direction indicated by the arrow −Y, and the sheet 250, which is supported on the conveyor belts 40A and 40B, is conveyed in the direction indicated by the arrow −Y. The BLD 11 having been shifted to the back surface side of the sheet 250 radiates out the laser beam L having a linear pattern with a line width of approximately 100 μm. The laser beam L is radiated out approximately in parallel with the back surface of the sheet 250. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the back surface of the sheet 250. The reflected laser beam L is converged by the first SELFOC lens array 15 into a linear beam extending along the direction indicated by the arrow X on the back surface of the sheet 250.

The laser beam L impinging upon the sheet 250 stimulates the stimulable phosphor at the exposed area of the back surface of the sheet 250. As a result, the light M' carrying the image information stored on the sheet 250 is emitted from the back surface of the sheet 250.

The light M' emitted from the back surface of the sheet 250 is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 120. At this time, the laser beam L, which has been reflected from the back surface of the sheet 250 and is mixed slightly in the emitted light M having passed through the second SELFOC lens array 16, is filtered out by the stimulating ray cut-off filter 17.

The emitted light M' having passed through the stimulating ray cut-off filter 17 is received by the photoelectric conversion devices 21, 21, . . . constituting the line sensor 120 and photoelectrically converted into signal components Q', Q', . . . . The image signal S' made up of the signal components Q', Q', . . . is fed into the image information reading means 130.

The image information reading means 130 receives the image signal S, which has been obtained from the line sensor 120 when the front surface of the sheet 250 was exposed to the laser beam L, and the image signal S', which has been obtained from the line sensor 120 when the back surface of the sheet 250 was exposed to the laser beam L. The image information reading means 130 discriminates which signal component Q or Q' corresponds to which pixel on the sheet 250 corresponding to the amount of displacement of the conveyor belts 40A and 40B. Also, the image information reading means 130 performs weighted addition processing with a predetermined addition ratio on the signal components of the two image signals S and S', which image signal components represent corresponding pixels on the front and back surfaces of the sheet 250. In this manner, an addition signal is obtained.

As described above, with this embodiment of the eighth radiation image read-out apparatus in accordance with the present invention, the addition signal is obtained from the addition processing of the two image signals S and S' detected from the front and back surfaces of the sheet 250. In the addition signal, noise occurring at random on the front and back surfaces of the sheet 250 is dispersed in the effective image storing region of the sheet 250. Therefore, noise components can be rendered imperceptible with respect to the entire sheet 250. Also, since the light M emitted from the front surface of the sheet 250 and the light M' emitted from the back surface of the sheet 250 are respectively collected at the front and back surfaces of the sheet 250, the light collecting efficiency can be enhanced. As a result, an image signal having a markedly enhanced signal-to-noise ratio can be obtained.

Figure 30:
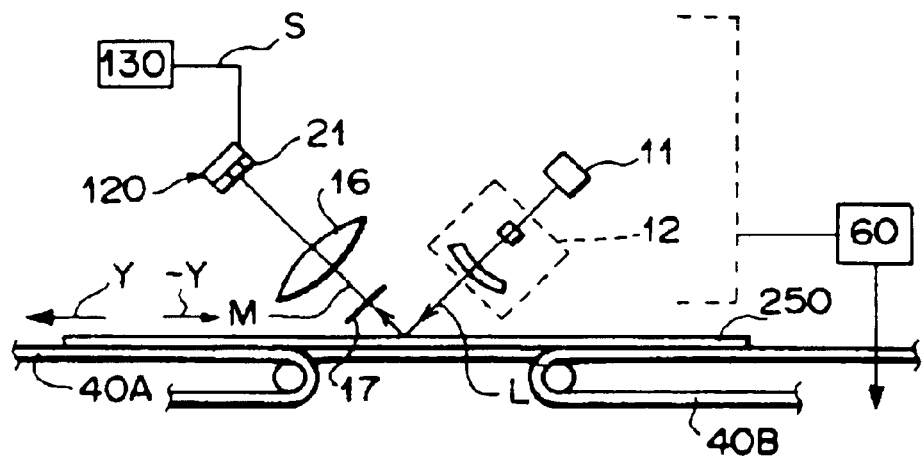
FIG. 30 is a sectional view showing a different embodiment of the eighth radiation image read-out apparatus in accordance with the present invention.
Figure 31:
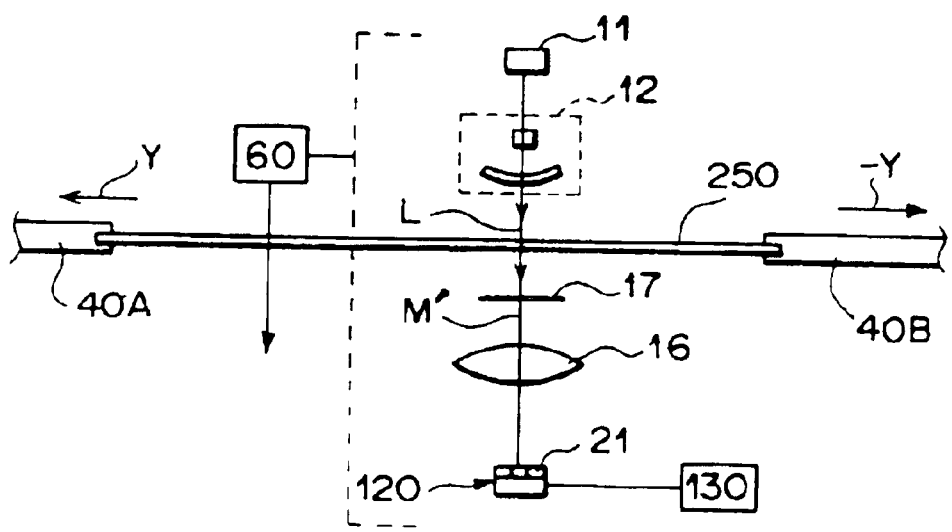
FIG. 31 is a sectional view showing a further different embodiment of the eighth radiation image read-out apparatus in accordance with the present invention.

In the aforesaid embodiment of the eighth radiation image read-out apparatus in accordance with the present invention, part of the optical path of the laser beam L and part of the optical path of the light M emitted from the front surface of the sheet 250 overlap each other, and the size of the apparatus is reduced. Alternatively, as illustrated in FIG. 30, the eighth radiation image read-out apparatus in accordance with the present invention may be constituted such that the optical path of the laser beam L and the optical path of the light emitted M do not overlap each other. Also, as illustrated in FIG. 31, the BLD 11 and the line sensor 120 may be located on opposite surface sides of the sheet 250.

In the aforesaid embodiments of the eighth radiation image read-out apparatus in accordance with the present invention, the line sensor comprising a plurality of rows of the photoelectric conversion devices 21, 21, . . . as shown in FIG. 2, 7A, or 7B, and the anisotropic sheet shown in FIGS. 17A and 17B or FIG. 17C may also be employed.

Figure 32A:
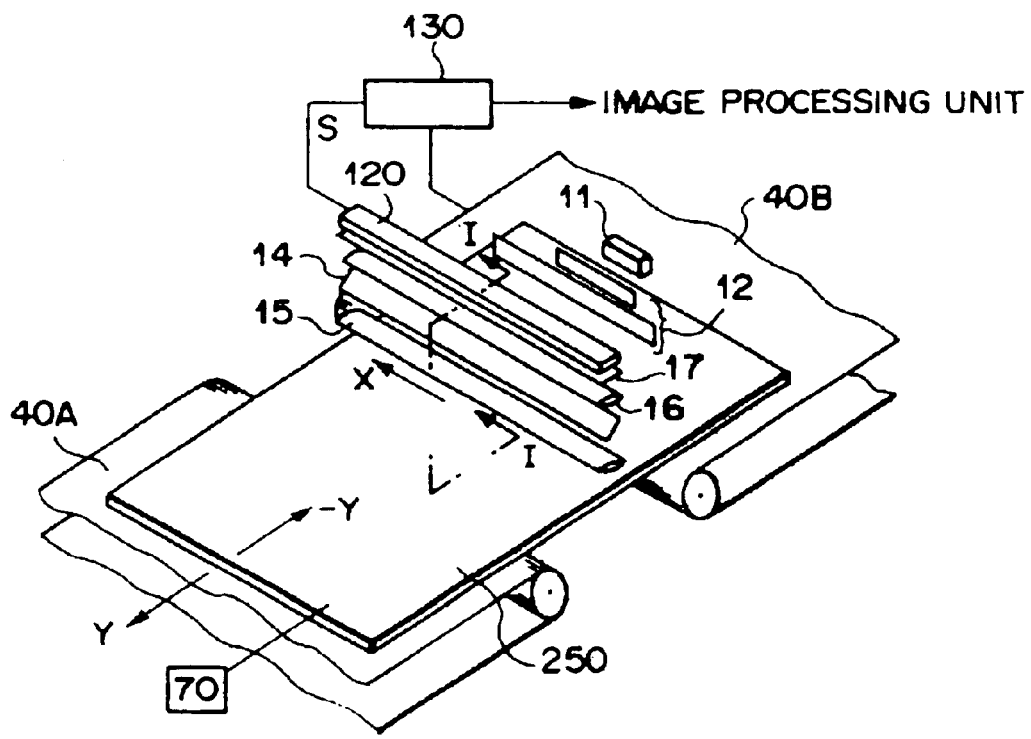
FIG. 32A is a perspective view showing an embodiment of the ninth radiation image read-out apparatus in accordance with the present invention.
Figure 32B:
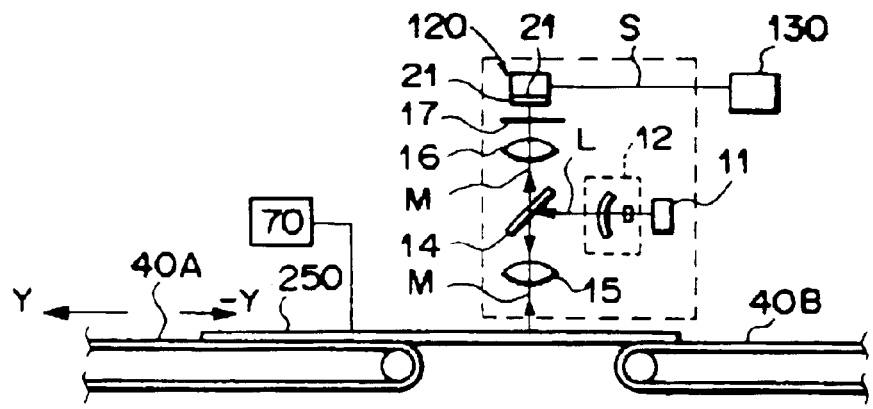
FIG. 32B is a sectional view taken on line I—I of FIG. 32A.

FIG. 32A is a perspective view showing an embodiment of the ninth radiation image read-out apparatus in accordance with the present invention. FIG. 32B is a sectional view taken on line I—I of FIG. 32A.

The radiation image read-out apparatus shown in FIGS. 32A and 32B is constituted in the same manner as that in the embodiment of the eighth radiation image read-out apparatus in accordance with the present invention, which is shown in FIGS. 29A and 29B, except that, in lieu of the shifting means 60, a sheet reversing means 70 is employed. The sheet reversing means 70 reverses the front and back surfaces of the sheet 250 after the emitted light M has been detected from the front surface (i.e., the upper surface in FIG. 32A) of the sheet 250.

Specifically, in this embodiment of the ninth radiation image read-out apparatus in accordance with the present invention, the laser beam L is irradiated to the front surface of the sheet 250, and the light M emitted from the front surface of the sheet 250 is detected. The image signal S corresponding to the emitted light M is fed into the image information reading means 130. Thereafter, the sheet reversing means 70 reverses the front and back surfaces of the sheet 250. Also, the direction of conveyance of the conveyor belts 40A and 40B is reversed. The laser beam L is irradiated to the back surface of the sheet 250, and the light M' emitted from the back surface of the sheet 250 is detected. The image signal S' corresponding to the emitted light M' is fed into the image information reading means 130.

The image information reading means 130 receives the image signal S, which has been obtained from the line sensor 120 when the front surface of the sheet 250 was exposed to the laser beam L, and the image signal S', which has been obtained from the line sensor 120 when the back surface of the sheet 250 was exposed to the laser beam L. The image information reading means 130 discriminates which signal component Q or Q' corresponds to which pixel on the sheet 250 corresponding to the amount of displacement of the conveyor belts 40A and 40B. Also, the image information reading means 130 performs weighted addition processing with a predetermined addition ratio on the signal components of the two image signals S and S', which image signal components represent corresponding pixels on the front and back surfaces of the sheet 250. In this manner, an addition signal is obtained.

As described above, with this embodiment of the ninth radiation image read-out apparatus in accordance with the present invention, the addition signal is obtained from the addition processing of the two image signals S and S' detected from the front and back surfaces of the sheet 250. In the addition signal, noise occurring at random on the front and back surfaces of the sheet 250 is dispersed in the effective image storing region of the sheet 250. Therefore, noise components can be rendered imperceptible with respect to the entire sheet 250. Also, since the light M emitted from the front surface of the sheet 250 and the light M' emitted from the back surface of the sheet 250 are respectively collected at the front and back surfaces of the sheet 250, the light collecting efficiency can be enhanced. As a result, an image signal having a markedly enhanced signal-to-noise ratio can be obtained.

In the aforesaid embodiment of the ninth radiation image read-out apparatus in accordance with the present invention, part of the optical path of the laser beam L and part of the optical path of the light M emitted from the front surface of the sheet 250 overlap each other, and the size of the apparatus is reduced. However, the ninth radiation image read-out apparatus in accordance with the present invention is not limited to such a constitution. Also, in the aforesaid embodiments of the ninth radiation image read-out apparatus in accordance with the present invention, the line sensor comprising a plurality of rows of the photoelectric conversion devices 21, 21, . . . as shown in FIG. 2, 7A, or 7B, and the anisotropic sheet shown in FIGS. 17A and 17B or FIG. 17C may also be employed.

Embodiments of the tenth, eleventh, and twelfth radiation image read-out apparatuses in accordance with the present invention will be described hereinbelow.

Figure 33A:
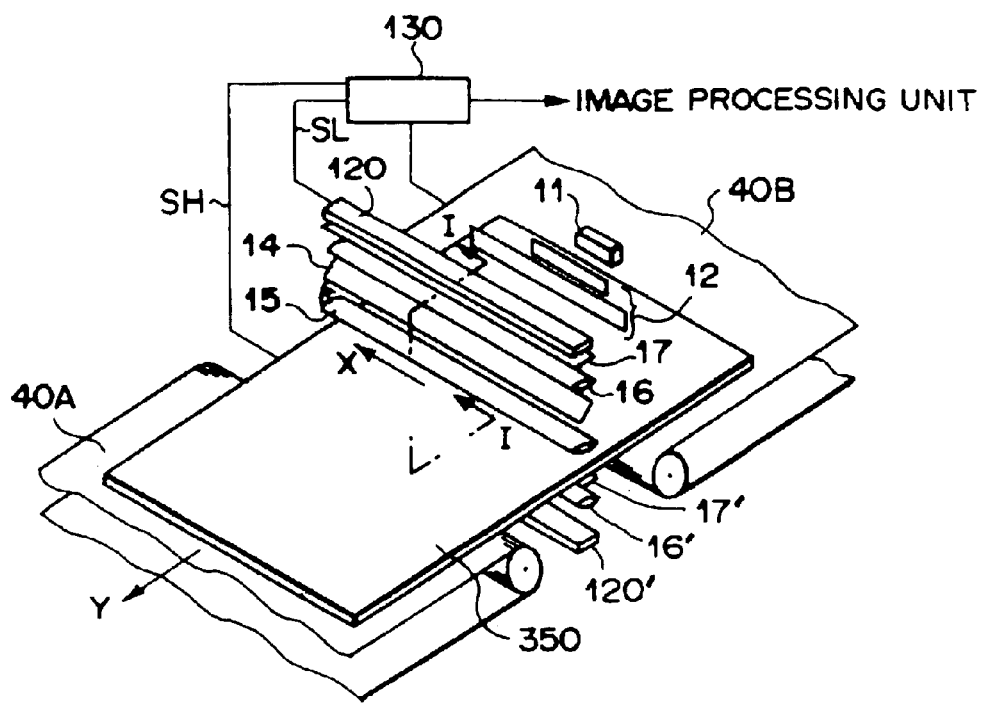
FIG. 33A is a perspective view showing an embodiment of the tenth radiation image read-out apparatus in accordance with the present invention.
Figure 33B:
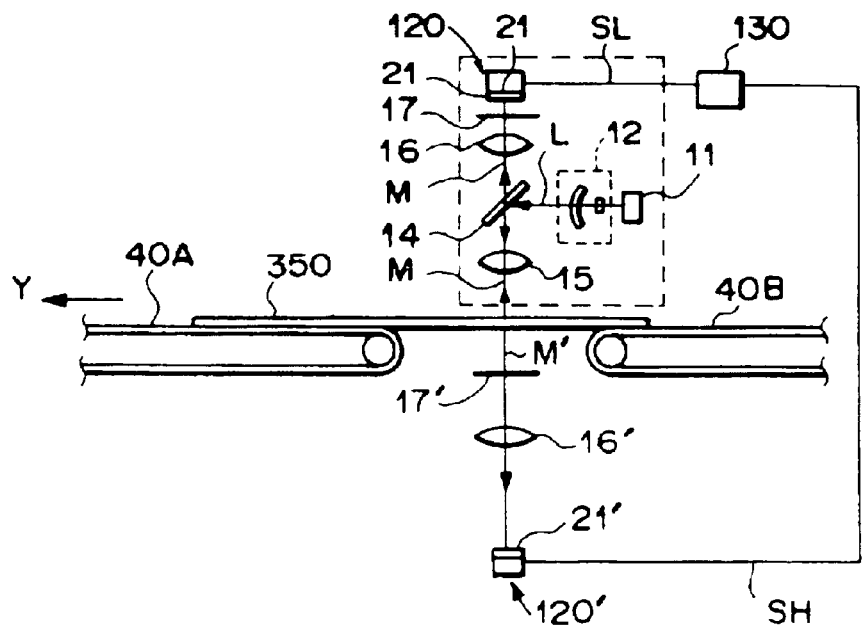
FIG. 33B is a sectional view taken on line I—I of FIG. 33A, FIGS. 34A and 34B are sectional views showing examples of stimulable phosphor sheets for energy subtraction processing.
Figure 34A:
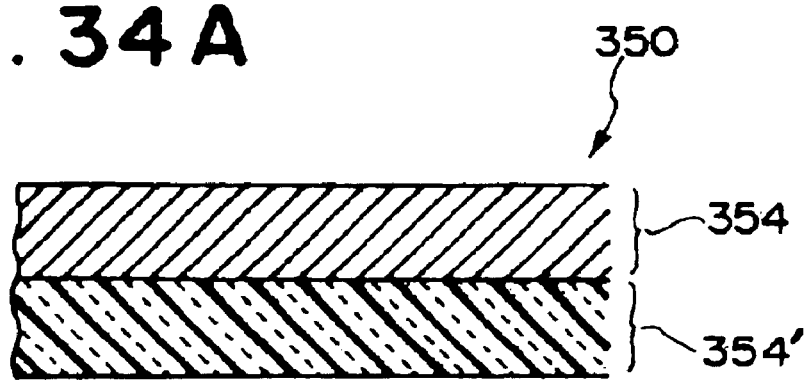
Figure 34B:
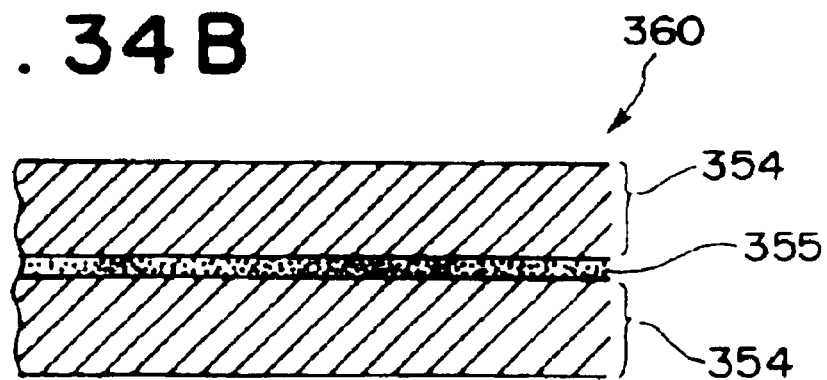

FIG. 33A is a perspective view showing an embodiment of the tenth radiation image read-out apparatus in accordance with the present invention. FIG. 33B is a sectional view taken on line I—I of FIG. 33A. FIGS. 34A and 34B are sectional views showing examples of stimulable phosphor sheets for energy subtraction processing, which may be employed in the embodiment of FIGS. 33A and 33B.

A stimulable phosphor sheet 350 shown in FIG. 34A comprises two stimulable phosphor layers 354 and 354', which are formed from materials having different radiation energy absorption characteristics. When radiation carrying image information of a single object is irradiated onto one surface side of the stimulable phosphor sheet 350, two radiation images are formed with radiation having different energy distributions on the stimulable phosphor layer 354, which is located on the front surface side (i.e., the upper side in FIG. 34A) of the sheet 350, and the stimulable phosphor layer 354', which is located on the back surface side (i.e., the lower side in FIG. 34A) of the sheet 350. A stimulable phosphor sheet 360 shown in FIG. 34B comprises two stimulable phosphor layers 354, 354, which are formed from the same material, and a radiation energy separation filter 355 intervening between the two stimulable phosphor layers 354, 354. As in the cases of the sheet 350 shown in FIG. 34A, when radiation carrying image information of a single object is irradiated onto one surface side of the stimulable phosphor sheet 360, two radiation images are formed with radiation having different energy distributions on the stimulable phosphor layer 354, which is located on the front surface side of the sheet 360, and the stimulable phosphor layer 354, which is located on the back surface side of the sheet 360.

In this embodiment, the sheet 350 shown in FIG. 34A is employed. However, it is also possible to employ the sheet 360 shown in FIG. 34B.

With reference to FIGS. 33A and 33B, the radiation image read-out apparatus comprises the conveyor belts 40A and 40B for supporting the sheet 350 for energy subtraction processing, which is shown in FIG. 34A, and conveying the sheet 350 in the direction indicated by the arrow Y. On the front stimulable phosphor layer 354 and the back stimulable phosphor layer 354' of the sheet 350, two radiation images of a single object have been formed with radiation having different energy distributions. The radiation image read-out apparatus also comprises the broad area semiconductor laser (hereinbelow referred to as the BLD) 11 for radiating out a linear laser beam L having a linear pattern with a line width of approximately 100 µm and having wavelengths falling within the range of 600 nm to 700 nm. The laser beam L is radiated out approximately in parallel with the front surface of the sheet 350. The radiation image read-out apparatus further comprises the optical system 12, which is constituted of a combination of a collimator lens for collimating the linear laser beam L having been radiated out of the BLD 11 and a toric lens for expanding the beam only in one direction. The radiation image read-out apparatus still further comprises the dichroic mirror 14, which is located at an angle of 45 degrees with respect to the front surface of the sheet 350 and which is set so as to reflect the laser beam L and to transmit emitted light M described later. The radiation image read-out apparatus also comprises the first SELFOC lens array 15. The first SELFOC lens array 15 converges the linear laser beam L, which has been reflected from the dichroic mirror 14, into a linear beam (having a line width of approximately 100 µm) extending along the direction indicated by the arrow X (parallel to the side edge of the sheet 350) on the sheet 350. Also, the first SELFOC lens array 15 collimates the emitted M, which is emitted from the front surface (i.e., the upper surface in FIG. 33A) of the sheet 350 exposed to the linear laser beam L and which carries image information of the radiation image stored on the sheet 350. The radiation image read-out apparatus further comprises the second SELFOC lens array 16 for converging the emitted light M, which has been collimated by the first SELFOC lens array 15 and has then passed through the dichroic mirror 14, onto light receiving surfaces of photoelectric conversion devices 21, 21, . . . constituting the line sensor 120, which will be described later. The radiation image read-out apparatus still further comprises the stimulating ray cut-off filter 17 for transmitting only the emitted light M and filtering out the laser beam L, which has been reflected from the front surface of the sheet 350 and which is mixed slightly in the emitted light M having passed through the second SELFOC lens array 16. The radiation image read-out apparatus also comprises the line sensor 120, which is constituted of a plurality of photoelectric conversion devices 21, 21, . . . for receiving the emitted light M having passed through the stimulating ray cut-off filter 17 and for photoelectrically converting the emitted light M. The radiation image read-out apparatus further comprises the stimulating ray cut-off filter 17'. The stimulating ray cut-off filter 17' transmits only the emitted light M', which emanates from the back surface (i.e., the lower surface in FIG. 33A) of the sheet 350. The stimulating ray cut-off filter 17' filters out the laser beam L, which has passed through the sheet 350 and emanates slightly from the back surface of the sheet 350 together with the emitted light M'. The radiation image read-out apparatus also comprises the third SELFOC lens array 16' for converging the emitted light M', which has passed through the stimulating ray cut-off filter 17', onto the light receiving surfaces of the photoelectric conversion devices 21', 21', . . . constituting the line sensor 120', which will be described later. The radiation image read-out apparatus further comprises the line sensor 120', which is constituted of a plurality of the photoelectric conversion devices 21', 21', ... for receiving the emitted light M' having passed through the third SELFOC lens array 16' and for photoelectrically converting the emitted light M'. The radiation image read-out apparatus still further comprises image information reading means 130. The image information reading means 130 reads an image signal SL made up of signal components (outputs) obtained from the photoelectric conversion devices 21, 21, ... constituting the line sensor 120 and an image signal SH made up of signal components (outputs) obtained from the photoelectric conversion devices 21', 21', ... constituting the line sensor 120'. Also, the image information reading means 130 performs a subtraction process on signal components of the two image signals SL and SH, which image signal components represent corresponding pixels on the front and back surfaces of the sheet 350. The subtraction process is performed with Formula (1) shown below.

$$Sproc = Ka \cdot SH - Kb \cdot SL + Kc \quad (1)$$

in which Sproc represents the subtraction image signal obtained from the subtraction process, each of Ka and Kb represents the weight factor, and Kc represents the bias component (Ka, Kb, and Kc will hereinbelow be referred to as the parameters for the subtraction process), SH represents the image signal made up of signal components obtained from the photoelectric conversion devices 21', 21', ... constituting the line sensor 120' (i.e., the high energy image signal representing the radiation image formed with radiation having a high energy level), and SL represents the image signal made up of signal components obtained from the photoelectric conversion devices 21, 21, ... constituting the line sensor 120 (i.e., the low energy image signal representing the radiation image formed with radiation having a low energy level). The subtraction process is performed by subtraction processing means. (not shown) incorporated in the image information reading means 130.

The first SELFOC lens array 15 acts such that an image of the emission area of the emitted light M on the sheet 350 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surfaces of the photoelectric conversion devices 21, 21, ... The third SELFOC lens array 16' acts such that an image of the emitted light M' on the back surface of the sheet 350 is formed in one-to-one size relationship on the image surface at the light receiving surfaces of the photoelectric conversion devices 21', 21', ... of the line sensor 120'.

The line sensor 120 and the line sensor 120' are constituted in the same manner as that illustrated in FIG. 27.

As described above, on the front stimulable phosphor layer 354 and the back stimulable phosphor layer 354' of the sheet 350, two radiation images have been formed with radiation having different energy distributions. Specifically, when radiation carrying image information of a single object is irradiated onto the stimulable phosphor layer 354, which is located on the front surface side of the sheet 350, the two radiation images are formed with radiation having different energy distributions on the front stimulable phosphor layer 354 and the back stimulable phosphor layer 354' of the sheet 350. On the back stimulable phosphor layer 354', the radiation image is formed with radiation having an energy distribution, in which the low energy components of the radiation have been suppressed comparatively. On the front stimulable phosphor layer 354, the radiation image is formed with radiation having an energy distribution, in which the low energy components of the radiation have been enhanced in comparison with the back stimulable phosphor layer 354'.

How this embodiment of the tenth radiation image read-out apparatus in accordance with the present invention operates will be described hereinbelow.

Firstly, the conveyor belts 40A and 40B move in the direction indicated by the arrow Y, and the sheet 350, on which the radiation images have been stored and which is supported on the conveyor belts 40A and 40B, is conveyed in the direction indicated by the arrow Y. The conveyance speed of the sheet 350 is equal to the movement speed of the conveyor belts 40A and 40B. Information representing the movement spaced of the conveyor belts 40A and 40B is fed into the image information reading means 130.

The BLD 11 radiates out the laser beam L having a linear pattern with a line width of approximately 100 $\mu$m. The laser beam L is radiated out approximately in parallel with the front surface of the sheet 350. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the front surface of the sheet 350. The reflected laser beam L is converged by the first SELFOC lens array 15 into a linear beam (having a line width $d_L$ of approximately 100 $\mu$m) extending along the direction indicated by the arrow X on the sheet 350.

The laser beam L impinging upon the sheet 350 stimulates the areas of the stimulable phosphor layers 354 and 354', which areas correspond to the exposed area of the sheet 350. As a result, the light M, which carries the image information stored on the stimulable phosphor layer 354, is emitted from the front surface of the sheet 350. Also, the light M', which carries the image information stored on the stimulable phosphor layer 354', is emitted from the back surface of the sheet 350.

The light M emitted from the front surface of the sheet 350 is collimated by the first SELFOC lens array 15, passes through the dichroic mirror 14, and is converged by the second SELFOC lens array 16 onto each of the light receiving surfaces of the photoelectric conversion devices 21, 21, ... constituting the line sensor 120. At this time, the laser beam L, which has been reflected from the front surface of the sheet 350 and is mixed slightly in the emitted light M having passed through the second SELFOC lens array 16, is filtered out by the stimulating ray cut-off filter 17.

The emitted light M having passed through the stimulating ray cut-off filter 17 is received by the photoelectric conversion devices 21, 21, ... constituting the line sensor 120 and photoelectrically converted into signal components Q, Q, .... The image signal SL made up of the signal components Q, Q, ... is fed into the image information reading means 130.

The light M' emitted from the back surface of the sheet 350 passes through the stimulating ray cut-off filter 17' and impinges upon the third SELFOC lens array 16'. At this time, the laser beam L having passed through the sheet 350 is slightly radiated from the back surface of the sheet 350 together with the emitted light M'. The laser beam L mixed in the emitted light M' is filtered out by the stimulating ray cut-off filter 17'.

The emitted light M' having passed through the stimulating ray cut-off filter 17' is converged by the third SELFOC lens array 16' onto each of the light receiving surfaces of the photoelectric conversion devices 21', 21', ... constituting the line sensor 120'. The emitted light M' having thus been converged is received by the photoelectric conversion devices 21', 21', ... constituting the line sensor 120' and photoelectrically converted into signal components Q', Q', .... The image signal SH made up of the signal components Q', Q', ... is fed into the image information reading means 130.

The image information reading means 130 receives the image signal SL from the line sensor 120 and receives the image signal SH from the line sensor 120'. The image information reading means 130 discriminates which signal component Q or Q' corresponds to which pixel on the sheet 350 corresponding to the amount of displacement of the conveyor belts 40A and 40B. Also, the subtraction processing means (not shown) incorporated in the image information reading means 130 performs the subtraction process on the signal components of the two image signals SL and SH, which signal components represent corresponding pixels on the front and back surfaces of the sheet 350. The subtraction process is performed with Formula (1) shown above.

As described above, with this embodiment of the tenth radiation image read-out apparatus in accordance with the present invention, the subtraction image signal Sproc can be obtained easily from the image signals SL and SH having been detected from the front and back surfaces of the sheet 350.

In the aforesaid embodiment of the tenth radiation image read-out apparatus in accordance with the present invention, part of the optical path of the laser beam L and part of the optical path of the light M emitted from the front surface of the sheet 350 overlap each other, and the size of the apparatus is reduced. Alternatively, as illustrated in FIG. 35, the tenth radiation image read-out apparatus in accordance with the present invention may be constituted such that the optical path of the laser beam L and the optical path of the light emitted M do not overlap each other. Also, the embodiment of FIG. 35 may be modified such that a line light source is located also on the back surface side of the sheet 350. In such a modification, it is necessary for a sheet provided with a substrate formed from a material permeable to the stimulating rays to be employed.

In the tenth radiation image read-out apparatus in accordance with the present invention, in lieu of the line sensors 120 and 120', the line sensor 20 having the constitution shown in FIG. 2 and a line sensor 20' of the same type may be employed.

With the embodiment of the tenth radiation image read-out apparatus in accordance with the present invention, wherein the line sensors 20 and 20' comprising a plurality of rows of photoelectric conversion devices 21, 21, ... or a plurality of rows of photoelectric conversion devices 21', 21', ... are employed, the same effects as those of the aforesaid embodiment of the tenth radiation image read-out apparatus in accordance with the present invention can be obtained. Also, in cases where the light receiving width (i.e., the width in the minor axis direction of the line sensor 20) of each of the photoelectric conversion devices 21, 21, ... is shorter than the line width of the emitted light M (i.e., the distribution width shown in the emitted light intensity distribution diagram in FIG. 2) the line sensor 20 as a whole can receive the emitted light M over approximately the entire line width of the emitted light. Therefore, the light receiving efficiency can be enhanced. Accordingly, for example, in cases where, after the laser beam L having the beam width $d_L$ (shown in FIG. 3A) approximately equal to the light receiving width of the photoelectric conversion device row 20B impinges upon the sheet 350, the laser beam L is scattered in the sheet 350 and stimulates the area having a width (the width $d_M$) larger than the beam width $d_L$, and the light M and the light M' (with the intensity distribution shown in FIG. 3C) having a beam width $d_M$ larger than the light receiving width of the photoelectric conversion device row 20B are emitted as illustrated in FIG. 3B, the emitted light M and the emitted light M' having the wide beam width can be received efficiently.

As each of the line sensors 20 and 20' comprising a plurality of rows of photoelectric conversion devices 21, 21, ... or a plurality of rows of photoelectric conversion devices 21', 21', ..., the line sensor 80 shown in FIG. 7A or the line sensor 90 shown in FIG. 7B may be employed.

Figure 36A:
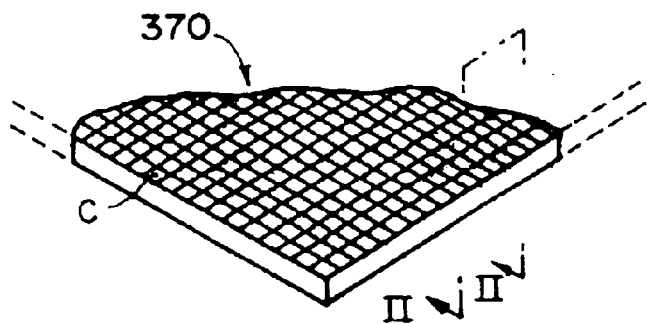
FIG. 36A is a perspective view showing an anisotropic stimulable phosphor sheet.
Figure 36B:
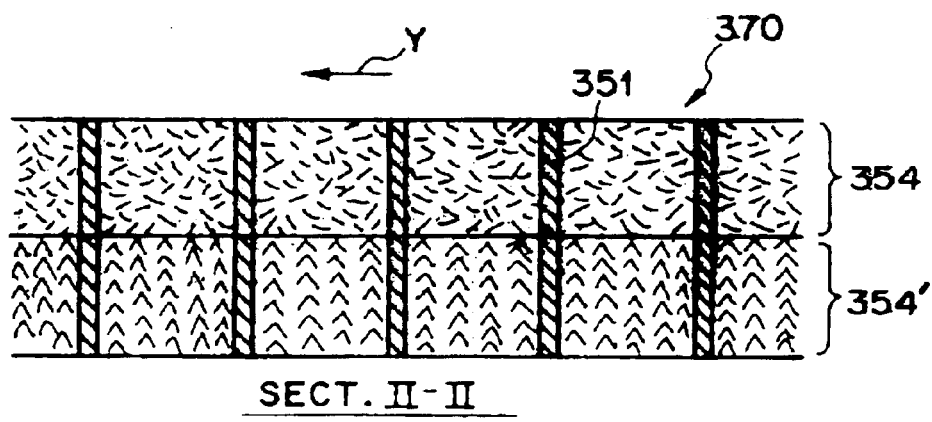
FIGS. 36B and 36C are sectional views showing examples of structures of the anisotropic stimulable phosphor sheet shown in FIG. 36A.
Figure 36C:
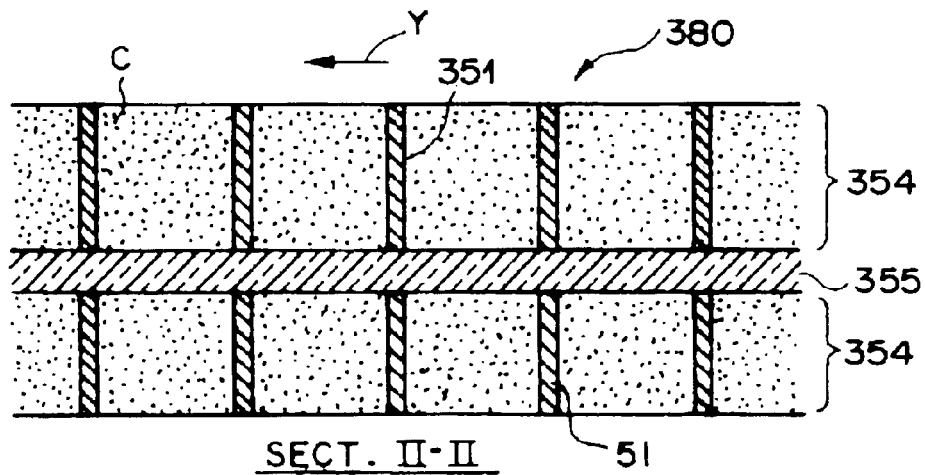

Also, in the embodiments of the tenth radiation image read-out apparatus in accordance with the present invention, as the sheet 350, the anisotropic sheet 370 shown in FIG. 36A and 36B or the anisotropic sheet 380 shown in FIG. 36C may also be employed. Specifically, in the sheet 370, each of the stimulable phosphor layers 354 and 354' is partitioned by a stimulating ray reflecting partition member 351, which extends in the thickness direction of the sheet 370, into a plurality of fine cells C, C, .... As in the sheet 350 shown in FIG. 34A, the sheet 370 having the sectional structure shown in FIG. 36B comprises the two stimulable phosphor layers 354 and 354' formed from materials having different radiation energy absorption characteristics. Also, each of the stimulable phosphor layers 354 and 354' is partitioned by the stimulating ray reflecting partition member 351 into the plurality of the fine cells C, C, ... As in the sheet 360 shown in FIG. 34B, the sheet 380 having the sectional structure shown in FIG. 36C comprises the two stimulable phosphor layers 354, 354, which are formed from the same material, and the radiation energy separation filter 355 intervening between the two stimulable phosphor layers 354, 354. Also, each of the two stimulable phosphor layers 354, 354 is partitioned by the stimulating ray reflecting partition member 351 into the plurality of the fine cells C, C, ....

The stimulating ray reflecting partition member 351 constituting the anisotropic sheet is formed from a material capable of reflecting the laser beam L and transmitting the emitted light M and the emitted light M'. The stimulating ray reflecting partition member 351 suppresses the scattering of the laser beam L to the direction in which the sheet surface extends. Therefore, the sharpness of the image reproduced from the image signal having been obtained from the photoelectric conversion can be enhanced.

Figure 37A:
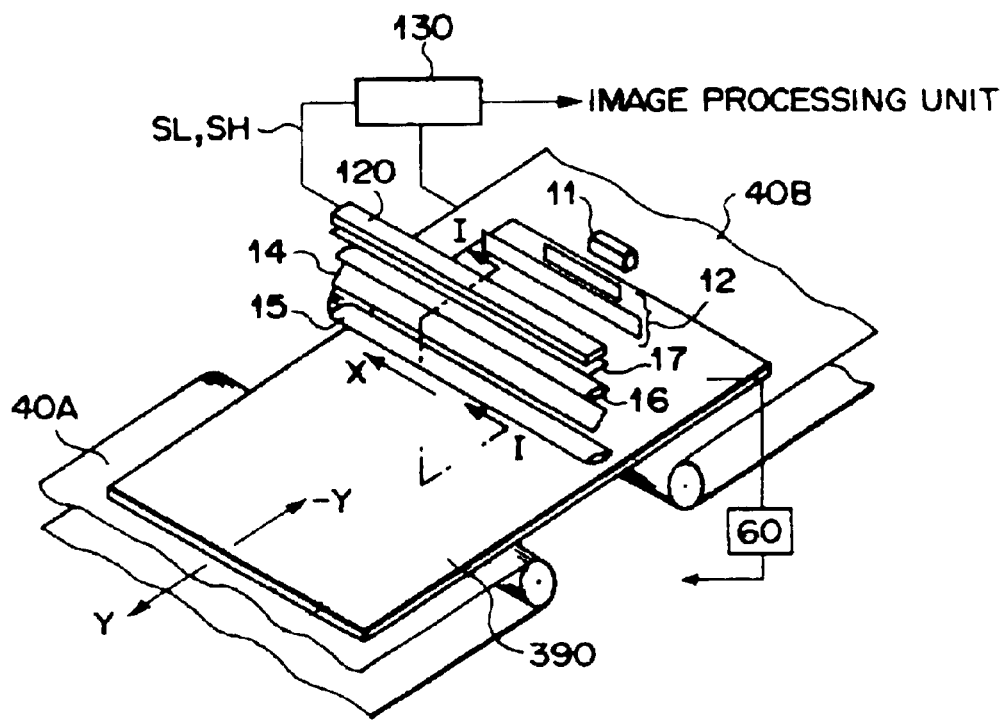
FIG. 37A is a perspective view showing an embodiment of the eleventh radiation image read-out apparatus in accordance with the present invention.
Figure 37B:
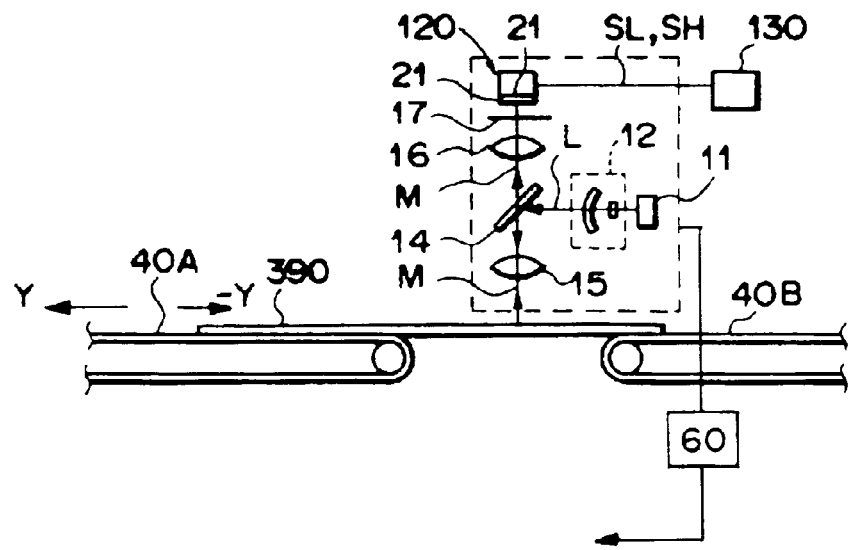
FIG. 37B is a sectional view taken on line I—I of FIG. 37A.

FIG. 37A is a perspective view showing an embodiment of the eleventh radiation image read-out apparatus in accordance with the present invention. FIG. 37B is a sectional view taken on line I—I of FIG. 37A.

The embodiment of FIGS. 37A and 37B has basically the same constitution as that of the embodiment shown in FIGS. 29A and 29B.

A sheet 390 employed in the embodiment of the eleventh radiation image read-out apparatus in accordance with the present invention may have one of structures shown in FIGS. 34A, 34B, 36A, 36B, and 36C. In the sheet 390, an intermediate layer, which is formed from a material blocking the stimulating rays, or a radiation energy separation filter containing such a material is formed between the front stimulable phosphor layer 354 and the back stimulable phosphor layer 354 or 354'.

How this embodiment of the eleventh radiation image read-out apparatus in accordance with the present invention operates will be described hereinbelow.

Firstly, the conveyor belts 40A and 40B move in the direction indicated by the arrow Y, and the sheet 390, on which the radiation images have been stored and which is supported on the conveyor belts 40A and 40B, is conveyed in the direction indicated by the arrow Y. The conveyance speed of the sheet 390 is equal to the movement speed of the conveyor belts 40A and 40B. Information representing the movement speed of the conveyor belts 40A and 40B is fed into the image information reading means 130.

The BLD 11 radiates out the laser beam L having a linear pattern with a line width of approximately 100 $\mu$m. The laser beam L is radiated out approximately in parallel with the front surface of the sheet 390. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the front surface of the sheet 390. The reflected laser beam L is converged by the first SELFOC lens array 15 into a linear beam extending along the direction indicated by the arrow X on the front surface of the sheet 390.

The laser beam L impinging upon the sheet 390 stimulates the stimulable phosphor layer 354 at the exposed area of the front surface of the sheet 390. As a result, the light M carrying the image information stored on the stimulable phosphor layer 354 is emitted from the front surface of the sheet 390. At this time, since the laser beam L does not pass through the intermediate layer (or the radiation energy separation filter) of the sheet 390, it does not stimulate the stimulable phosphor layer 354 (or 354') at the back surface of the sheet 390. Therefore, no light is emitted from the back surface of the sheet 390.

The light M emitted from the front surface of the sheet 390 is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 120. At this time, the laser beam L, which has been reflected from the front surface of the sheet 390 and is mixed slightly in the emitted light M having passed through the second SELFOC lens array 16, is filtered out by the stimulating ray cut-off filter 17.

The emitted light M having passed through the stimulating ray cut-off filter 17 is received by the photoelectric conversion devices 21, 21, . . . constituting the line sensor 120 and photoelectrically converted into signal components Q, Q, . . . . The image signal SL made up of the signal components Q, Q, . . . is fed into the image information reading means 130.

When the image signal SL has been detected from the entire front surface of the sheet 390, the shifting means 60 shifts the light guiding optical system, which contains the line sensor 120 and the BLD 11, to the back surface side of the sheet 390.

Also, the conveyor belts 40A and 40B moves reversely in the direction indicated by the arrow −Y, and the sheet 390, which is supported on the conveyor belts 40A and 40B, is conveyed in the direction indicated by the arrow −Y. The BLD 11 having been shifted to the back surface side of the sheet 390 radiates out the laser beam L having a linear pattern with a line width of approximately 100 $\mu$m. The laser beam L is radiated out approximately in parallel with the back surface of the sheet 390. The laser beam L is collimated by the optical system 12, which is constituted of the collimator lens and the toric lens and is located in the optical path of the laser beam L. The collimated laser beam L is reflected from the dichroic mirror 14 to the direction that impinges perpendicularly upon the back surface of the sheet 390. The reflected laser beam L is converged by the first SELFOC lens array 15 into a linear beam extending along the direction indicated by the arrow X on the back surface of the sheet 390.

The laser beam L impinging upon the sheet 390 stimulates the stimulable phosphor layer 354 (or 354') at the exposed area of the back surface of the sheet 390. As a result, the light M' carrying the image information stored on the stimulable phosphor layer 354 (or 354') is emitted from the back surface of the sheet 390.

The light M' emitted from the back surface of the sheet 390 is collimated by the first SELFOC lens array 15, passes through the dichroic mirror 14, and is converged by the second SELFOC lens array 16 onto each of the light receiving surfaces of the photoelectric conversion devices 21, 21, . . . constituting the line sensor 120. At this time, the laser beam L, which has been reflected from the back surface of the sheet 390 and is mixed slightly in the emitted light M having passed through the second SELFOC lens array 16, is filtered out by the stimulating ray cut-off filter 17.

The emitted light M' having passed through the stimulating ray cut-off filter 17 is received by the photoelectric conversion devices 21, 21, . . . constituting the line sensor 120 and photoelectrically converted into signal components Q', Q', . . . . The image signal SH made up of the signal components Q', Q', . . . is fed into the image information reading means 130.

The image information reading means 130 receives the image signal SL, which has been obtained from the line sensor 120 when the front surface of the sheet 390 was exposed to the laser beam L, and the image signal SH, which has been obtained from the line sensor 120 when the back surface of the sheet 390 was exposed to the laser beam L. The image information reading means 130 discriminates which signal component Q or Q' corresponds to which pixel on the sheet 390 corresponding to the amount of displacement of the conveyor belts 40A and 40B. Also, the subtraction processing means (not shown) incorporated in the image information reading means 130 performs the subtraction process on the signal components of the two image signals SL and SH, which signal components represent corresponding pixels on the front and back surfaces of the sheet 390.

As described above, with this embodiment of the eleventh radiation image read-out apparatus in accordance with the present invention, the subtraction image signal Sproc can be obtained easily from the image signals SL and SH having been detected from the front and back surfaces of the 390.

Figure 38:
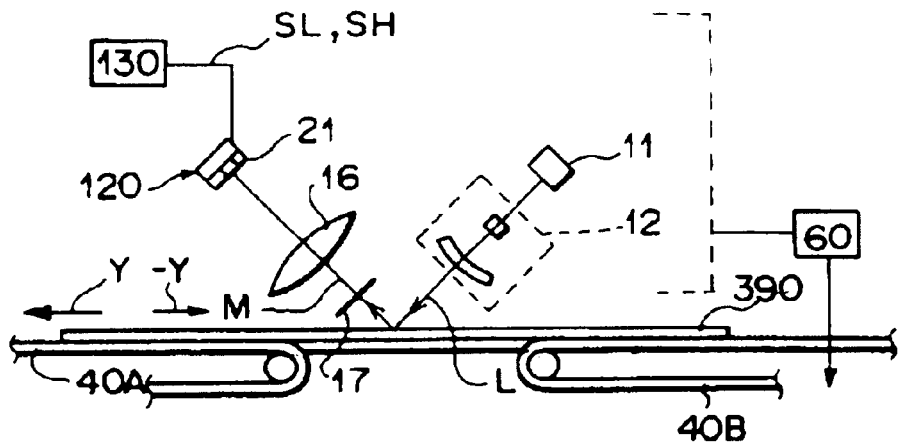
FIG. 38 is a sectional view showing a different embodiment of the eleventh radiation image read-out apparatus in accordance with the present invention.
Figure 39:
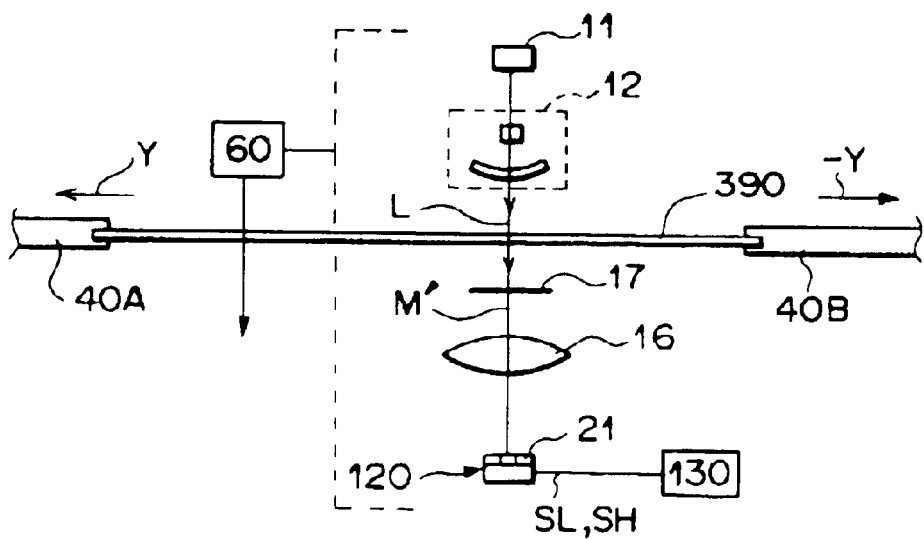
FIG. 39 is a sectional view showing a further different embodiment of the eleventh radiation image read-out apparatus in accordance with the present invention.

In the aforesaid embodiment of the eleventh radiation image read-out apparatus in accordance with the present invention, part of the optical path of the laser beam L and part of the optical path of the light M emitted from the front surface of the sheet 390 overlap each other, and the size of the apparatus is reduced. Alternatively, as illustrated in FIG. 38, the eleventh radiation image read-out apparatus in accordance with the present invention may be constituted such that the optical path of the laser beam L and the optical path of the light emitted M do not overlap each other. Also, as illustrated in FIG. 39, the BLD 11 and the line sensor 120 may be located on opposite surface sides of the sheet 390.

In the aforesaid embodiments of the eleventh radiation image read-out apparatus in accordance with the present invention, the line sensor comprising a plurality of rows of the photoelectric conversion devices 21, 21, . . . as shown in FIG. 2, 7A, or 7B, and the anisotropic sheet shown in FIG. 36A, 36B, or 36C may also be employed.

FIG. 40A is a perspective view showing an embodiment of the twelfth radiation image read-out apparatus in accordance with the present invention. FIG. 40B is a sectional view taken on line I—I of FIG. 40A.

The radiation image read-out apparatus shown in FIGS. 40A and 40B is constituted in the same manner as that in the embodiment of the eleventh radiation image read-out apparatus in accordance with the present invention, which is shown in FIGS. 37A and 37B, except that, in lieu of the shifting means 60, the sheet reversing means 70 is employed. The sheet reversing means 70 reverses the front and back surfaces of the sheet 390 after the emitted light M has been detected from the front surface (i.e., the upper surface in FIG. 40A) of the sheet 390.

Specifically, in this embodiment of the twelfth radiation image read-out apparatus in accordance with the present invention, the laser beam L is irradiated to the front surface of the sheet 390, and the light M emitted from the front surface of the sheet 390 is detected. The image signal SL corresponding to the emitted light M is fed into the image information reading means 130. Thereafter, the sheet reversing means 70 reverses the front and back surfaces of the sheet 390. Also, the direction of conveyance of the conveyor belts 40A and 40B is reversed. The laser beam L is irradiated to the back surface of the sheet 390, and the light M' emitted from the back surface of the sheet 390 is detected. The image signal SH corresponding to the emitted light M' is fed into the image information reading means 130.

The image information reading means 130 receives the image signal SL, which has been obtained from the line sensor 120 when the front surface of the sheet 390 was exposed to the laser beam L, and the image signal SH, which has been obtained from the line sensor 120 when the back surface of the sheet 390 was exposed to the laser beam L. The image information reading means 130 discriminates which signal component Q or Q' corresponds to which pixel on the sheet 390 corresponding to the amount of displacement of the conveyor belts 40A and 40B. Also, the subtraction processing means (not shown) incorporated in the image information reading means 130 performs the subtraction process on the signal components of the two image signals SL and SH, which signal components represent corresponding pixels on the front and back surfaces of the sheet 390.

As described above, with this embodiment of the twelfth radiation image read-out apparatus in accordance with the present invention, the subtraction image signal Sproc can be obtained easily from the image signals SL and SH having been detected from the front and back surfaces of the sheet 350.

In the aforesaid embodiment of the twelfth radiation image read-out apparatus in accordance with the present invention, part of the optical path of the laser beam L and part of the optical path of the light M emitted from the front surface of the sheet 390 overlap each other, and the size of the apparatus is reduced. However, the twelfth radiation image read-out apparatus in accordance with the present invention is not limited to such a constitution. Also, in the aforesaid embodiments of the twelfth radiation image read-out apparatus in accordance with the present invention, the line sensor comprising a plurality of rows of the photoelectric conversion devices 21, 21, . . . as shown in FIG. 2, 7A, or 7B, and the anisotropic sheet shown in FIG. 36A, 36B, or 36C may also be employed.

Embodiments of the fourteenth radiation image read-out apparatus in accordance with the present invention will be described hereinbelow.

In the embodiments of the fourteenth radiation image read-out apparatus in accordance with the present invention, a back illuminated type of CCD image sensor (hereinbelow referred to as the BT-CCD image sensor) is employed as the line sensor 20 in the embodiments described above with reference to FIGS. 1A, 1B and FIGS. 2 through 9 and as the line sensor 120 in the embodiments described above with reference to FIGS. 11A, 11B and FIG. 12.

In this case, the line sensor 20 or 120 is supported on cooling means (not shown) utilizing a Peltier device and is cooled when the apparatus is operating. Besides the cooling means utilizing the Peltier device, one of various known cooling techniques, such- as a cooling technique utilizing a heat sink, may be employed.

FIG. 41 is a graph showing typical spectral sensitivity characteristics of the BT-CCD image sensor and spectral sensitivity characteristics of an ordinarily utilized front illuminated type of CCD image sensor for comparison. As shown in FIG. 41, the quantum efficiency of the BT-CCD image sensor is higher than that of the ordinarily utilized front illuminated type of CCD image sensor over the ultraviolet to infrared region. Therefore, it is possible to obtain an image signal having a higher level than with the ordinarily utilized front illuminated type of CCD image sensor. As a result, an image having good image quality with a high signal-to-noise ratio can be obtained.

Also, the BT-CCD image sensor has the characteristic features in that, in the ultraviolet to blue region, the quantum efficiency is markedly high (e.g., at least 50%). (In the ultraviolet to blue region, the quantum efficiency of the front illuminated type of CCD image sensor is approximately zero.) Therefore, in cases where the BT-CCD image sensor is utilized as the line sensor 20 or 120 and in combination with a stimulable phosphor sheet emitting blue light, the emitted light utilization efficiency can be enhanced markedly, and markedly large effects of obtaining images having good quality can be obtained.

The line sensor 20 or 120 is cooled by the cooling means (not shown), and thermal noise is thereby suppressed. FIG. 42 is a graph showing typical dark output (logarithmic scale)—temperature characteristics of the BT-CCD image sensor. As shown in FIG. 42, in cases where the BT-CCD image sensor is cooled, the dark output can be reduced, and an image having good image quality with suppressed noise can be obtained. In the embodiments, the setting temperature of the cooling means is set at approximately −20° C., and the dark output is approximately 10 (e/pixel/sec).

The detection limit of the BT-CCD image sensor cooled for suppressing thermal noise is 20 (electron/pixel). Since the CCD photoelectric conversion efficiency is equal to 0.995 and the quantum efficiency at a wavelength of 400 nm is equal to 0.6, the detection limit photon number of the BT-CCD image sensor is equal to 34 (photon/pixel). The detection limit of the BT-CCD image sensor is higher than the detection limit of a photomultiplier, but is not markedly different from the detection limit of the photomultiplier. Therefore, in cases where the BT-CCD image sensor is utilized, the same level of image quality as that with an apparatus utilizing the photomultiplier can be obtained.

In cases where a photodiode array with an amplifier is utilized, its detection limit is, for example, approximately 1,250 (electron/pixel). Since the quantum efficiency of the photodiode array with an amplifier at a wavelength of 400 nm is equal to 0.57, if the photoelectric conversion efficiency is approximately equal to 1, the detection limit photon number of the photodiode array with an amplifier is equal to approximately 2,000 (photon/pixel). However, this value contains an increase in noise due to array formation. Therefore, in cases where the photodiode array with an amplifier is utilized as the light receiving device, the detection limit value decreases by 2 to 3 orders of ten, and the same level of image quality as that with an apparatus utilizing the photomultiplier cannot be obtained. In the cases of the photomultiplier, 6.4 photons emitted from a 50 $\mu$-size pixel sheet can be detected.

The image signal S obtained in the manner described above is obtained by detecting blue light emitted by the sheet 50 by utilizing the BT-CCD image sensor as the line sensor 20 or 120. Therefore, the efficiency with which the emitted light is utilized can be enhanced markedly, and an image having a high signal-to-noise ratio can be obtained.

The line sensor 20 or 120 described above is illustrated as being one which is produced as a long line sensor having a length corresponding to the width of the stimulable phosphor sheet with a single production process. Currently, it is not impossible but is not easy to produce the long line sensor as a single member due to limitation upon the current CCD production techniques, such as pixel shift and location of the cooling means. FIGS. 43A through 43J show a technique for solving the technical problems described above. With the technique shown in FIGS. 43A through 43J, a plurality of back illuminated type of CCD image sensor chips (hereinbelow referred to as the BT-CCD image sensor chips), each of which is smaller than the width of the stimulable phosphor sheet, are utilized. The plurality of the BT-CCD image sensor chips are arrayed along the length direction of the linear area of the stimulable phosphor sheet, i.e., along the major axis direction (indicated by the arrow X), such that they may have a total length corresponding to the width of the stimulable phosphor sheet. In this manner, a single BT-CCD image sensor is constituted. FIG. 43A shows a BT-CCD line sensor 520 comprising a plurality of BT-CCD image sensor chips 522, 522, . . . arrayed in a straight line along the major axis direction (indicated by the arrow X). FIG. 43B shows a BT-CCD line sensor 530 comprising a plurality of BT-CCD image sensor chips 522, 522, . . . arrayed in a zigzag pattern along the major axis direction (indicated by the arrow X), such that adjacent BT-CCD image sensor chips 522, 522 do not overlap each other. FIG. 43C shows a BT-CCD line sensor 540 comprising a plurality of BT-CCD image sensor chips 522, 522, . . . arrayed in a zigzag pattern along the major axis direction (indicated by the arrow X), such that adjacent BT-CCD image sensor chips 522, 522 partly overlap each other. In FIGS. 43B and 43C, at free regions indicated by the "*" mark, which are not occupied by the BT-CCD image sensor chips 522, 522, . . . , electric circuits for pixel shift compensation, electric circuits for cooling, and other elements can be located.

FIGS. 43D, 43E, 43F, and 43G show examples of array patterns of the photoelectric conversion devices 21, 21, . . . constituting each of the BT-CCD image sensor chips 522, 522, . . . . The BT-CCD image sensor chip 522 shown in FIG. 43D employs the array pattern in the line sensor 120 shown in FIG. 12. In the BT-CCD image sensor chip 522 shown in FIG. 43D, a plurality of the photoelectric conversion devices 21, 21, . . . are arrayed in a straight line along the direction indicated by the arrow X. The BT-CCD image sensor chip 522 shown in FIG. 43E employs the array pattern in the line sensor 20 shown in FIG. 2. In the BT-CCD image sensor chip 522 shown in FIG. 43E, a plurality of rows of the photoelectric conversion devices 21, 21, . . . are located in parallel. Specifically, in the BT-CCD image sensor chip 522 shown in FIG. 43E, the photoelectric conversion devices 21, 21, . . . are arrayed along the direction indicated by the arrow X and thus constitute one row. A plurality of (in this case, three) such rows of the photoelectric conversion devices 21, 21, . . . extending along the direction indicated by the arrow X stand side by side in the direction of sheet conveyance (indicated by the arrow Y). The BT-CCD image sensor chip 522 shown in FIG. 43F employs the array pattern in the line sensor 80 shown in FIG. 7A. Specifically, in the BT-CCD image sensor chip 522 shown in FIG. 43F, the photoelectric conversion devices 21, 21, . . . are arrayed in a straight line along the major axis direction (indicated by the arrow X) and in a zigzag pattern along the minor axis direction (indicated by the arrow Y). The BT-CCD image sensor chip 522 shown in FIG. 43G employs the array pattern in the line sensor 90 shown in FIG. 7B. Specifically, in the BT-CCD image sensor chip 522 shown in FIG. 43G, the photoelectric conversion devices 21, 21, . . . are arrayed in a straight line along the minor axis direction (indicated by the arrow Y) and in a zigzag pattern along the major axis direction (indicated by the arrow X). By way of example, in cases where the number of the photoelectric conversion devices 21, 21, . . . arrayed in each row along the major axis direction (indicated by the arrow X) in the line sensor 520, 530, or 540 is equal to 1,000, the number of the photoelectric conversion devices 21, 21, . . . arrayed along the major axis direction (indicated by the arrow X) in one BT-CCD image sensor chip 522 may fall within the range of $\frac{1}{100}$ to $\frac{1}{10}$.

The BT-CCD image sensor chips 522, 522, . . . constituting each of the line sensors 520, 530, and 540 shown in FIGS. 43A, 43B, and 43C may take one of array patterns shown in FIGS. 43D, 43E, 43F, and 43G. Also, in the line sensors 520, 530, and 540 shown in FIGS. 43A, 43B, and 43C, the BT-CCD image sensor chips 522, 522, . . . are arrayed such that the length direction (indicated by the arrow X) of each BT-CCD image sensor chip 522 may coincide with the length direction (indicated by the arrow X) of the line sensor. Alternatively, as in line sensors 550, 560, and 570 illustrated in FIGS. 43H, 43I, and 43J, the BT-CCD image sensor chips 522, 522, . . . may be arrayed such that the width direction (indicated by the arrow Y) of each BT-CCD image sensor chip 522 may coincide with the length direction (indicated by the arrow X) of the line sensor. With the line sensors shown in FIGS. 43A, 43B, 43C, 43H, 43I, and 43J, in accordance with the array patterns of the BT-CCD image sensor chips 522, 522, . . . , the same effects as those of the line sensors 20, 80, 90, and 120 shown in FIGS. 2, 7A, 7B, and 12 can be obtained.

With the technique described above, wherein one BT-CCD line sensor is constituted by arraying plurality of the BT-CCD image sensor chips along the major axis direction (indicated by the arrow X) such that they may have a total length corresponding to the width of the stimulable phosphor sheet, the line sensor can be produced with a simple production process, the yield of the products in the production process can be enhanced, and the cost can be kept low.

Further, signal components can be taken from each of the BT-CCD image sensor chips, and therefore compensation for pixel shift can be performed more easily than when the entire line sensor is produced as a single member. Particularly, as illustrated in FIG. 43C, in cases where the BT-CCD image sensor chips 522, 522, . . . are arrayed in a zigzag pattern such that adjacent BT-CCD image sensor chips 522, 522 partly overlap each other, the compensation for pixel shift becomes more easy by the utilization of data at the overlapping portions.

In cases where a plurality of BT-CCD image sensor chips are arrayed along the major axis direction (indicated by the arrow X), the arraying should preferably be performed such that no insensible zone may occur at joints. If such arraying is difficult to perform, processing for compensation for the insensible zone should preferably be performed on the image signal such that the joints may be connected smoothly in the reproduced image.

The stimulable phosphor sheet utilized in the fourteenth radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from a front surface, and emitting light, which carries information of the other radiation image, from a back surface. Also, two line sensors constituted of the BT-CCD image sensors may be utilized, each of which is located on one of the front and back surface sides of the stimulable phosphor sheet, the two line sensors detecting two image signals, each of which is made up of a series of image signal components representing pixels in the radiation image, from the front and back surfaces of the stimulable phosphor sheet. Further, the apparatus may be provided with reading means for performing a subtraction process on image signal components of the two image signals, which image signal components represent corresponding pixels on the front and back surfaces of the stimulable phosphor sheet. In such cases, as each of the two line sensors located on opposite surface sides of the stimulable phosphor sheet, a BT-CCD image sensor, which is constituted in the manner described above by arraying plurality of the BT-CCD image sensor chips along the length direction of the linear area of the stimulable phosphor sheet such that they may have a total length corresponding to the width of the stimulable phosphor sheet, may be utilized.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

In the aforesaid embodiments of the fourteenth radiation image read-out apparatus in accordance with the present invention, wherein the line light source and the line sensor are utilized, the back illuminated type of CCD image sensor is employed as the line sensor. In an embodiment of the thirteenth radiation image read-out apparatus in accordance with the present invention, wherein the light emitted by a stimulable phosphor sheet, on which a radiation image has been stored, is detected with an area sensor, the back illuminated type of CCD image sensor may also be employed as the area sensor.

In such cases, instead of the area sensor covering the entire surface of the stimulable phosphor sheet being produced with a single production process, the back illuminated type of CCD image sensor covering the entire surface of the stimulable phosphor sheet as a whole may be produced by arraying a plurality of BT-CCD image sensor chips each having a small area.

Embodiments of the fifteenth radiation image read-out apparatus in accordance with the present invention will be described hereinbelow.

In the embodiments of the fifteenth radiation image read-out apparatus in accordance with the present invention, an organic EL device is employed as the line light source in lieu of the BLD 11 in the embodiments described above with reference to FIGS. 1A, 1B and FIGS. 2 through 9 and as the line sensor 120 in the embodiments described above with reference to FIGS. 11A, 11B and FIG. 12.

The organic EL device 11 may be one which produces linear stimulating rays L having a line width of approximately 100 $\mu$m and wavelengths falling within the range of 600 nm to 700 nm (red light). The organic EL device 11 may be of one of various materials and one of various structures and may be produced by one of various production processes. As the material for red light emission, Rhodamine dielectrics, oxazine dielectrics, Eu (III) complexes, and the like, are preferable. The organic EL device 11 may be constituted of a combination of a white light emitting device and a red color filter.

In the embodiments of the fifteenth radiation image read-out apparatus in accordance with the present invention, the linear stimulating rays L impinging upon the sheet 50 is produced by the organic EL device 11 capable of undergoing high luminance emission and is advantageous over the fluorescence produced by a fluorescent lamp and light radiated out from an LED array in that the directivity of the stimulating rays is high, the intensity of the stimulating rays is high, and therefore high stimulation energy can be imparted to the stimulable phosphor sheet. Accordingly, the stimulating rays L can sufficiently stimulate the stimulable phosphor at the exposed area (having a line width $d_L$ of approximately 100 $\mu$m). As a result, the blue light M of high intensity carrying the image information stored on the sheet 50 is emitted by the stimulable phosphor at the exposed area.

Ordinarily, in the cases of a broad area laser, the size of the system containing a control system is comparatively large, and the broad area laser is not very easy to process. Also, a laser system is comparatively expensive. The organic EL device 11 is advantageous in that it is compact (thin), cheap, and easy to process.

As described above, in the embodiments of the fifteenth radiation image read-out apparatus in accordance with the present invention, the image signal S made up of the signal components Q, Q, . . . is the one obtained from the emitted light M caused to occur by being stimulated by the stimulating rays L having high stimulation energy. Therefore, an image having a higher signal-to-noise ratio can be obtained than with an image signal obtained from the fluorescence produced by a fluorescent lamp or light radiated out from an LED array.

The apparatus may further comprises the monitoring means 65 (shown in FIG. 11A) for monitoring the intensity of the stimulating rays L radiated out of the organic EL device 11, and the modulating means 75 for modulating the emission intensity of the organic EL device 11 in accordance with the results of the monitoring with the monitoring means 65 such that the power of the organic EL device 11 may become equal to a predetermined value. When fluctuation in intensity of the stimulating rays L radiated out of the organic EL device 11 is detected, the organic EL device 11 may be modulated by the modulating means 75 such that the intensity of the stimulating rays L may become equal to a predetermined value.

The fifteenth radiation image read-out apparatus in accordance with the present invention is not limited to the embodiments described above and may be embodied in various other ways. For example, in the embodiments described above, the red stimulating rays having wavelengths falling within the range of 600 nm to 700 nm are utilized. However, the stimulating rays are not limited to such stimulating rays and may be selected from those having wavelengths appropriate for the stimulation wavelength range for the stimulable phosphor sheet utilized.

For example, as the carrier transporting layer or light emission layer of the organic EL device, it is possible to utilize anthracene dielectrics, perylene dielectrics, azomethine-zinc complexes, N-arylbenzimidazole, beryllium and Sc complexes of 5-hydroxy-chromone, distyrylallylene dielectrics, and the like. In such cases, blue light emission can be effected with the organic EL device, and therefore the blue light can be utilized as the stimulating rays.

Also, it is possible to utilize metal complexes such as $Alq_3$, coumarin dielectrics, quinacridone dielectrics, tris(2, 4-pentadieno)-1,10-phenanthrolineterbium, naphthalimide dielectrics, coronene dielectrics, and the like. In such cases, the blue light emitted by the organic EL device can be utilized as the stimulating rays. In cases where rubrene dielectrics are utilized, yellow light can be utilizedas the stimulating rays. However, the materials are not limited to those described above. Also, doping materials should preferably be utilized in order to enhance the light emission efficiency.

Ordinarily, basic device structures of the organic EL device include DL-H, DL-E, and TL structures. However, the structures are not limited to these structures and may be or may not be a laminated structure. As the production process, any of various processes, such as a vacuum evaporation process and casting process, may be employed.

The technique for utilizing the organic EL device as the stimulating ray source is not limited to the constitution utilizing the line light source and the line sensor and may be employed in various radiation image read-out apparatuses for detecting the light emitted by a stimulable phosphor sheet, on which a radiation image has been stored. In such various apparatuses, the organic EL device may be utilized as the stimulating ray source.

Embodiments of the seventeenth radiation image read-out apparatus in accordance with the present invention will be described hereinbelow.

Figure 45:
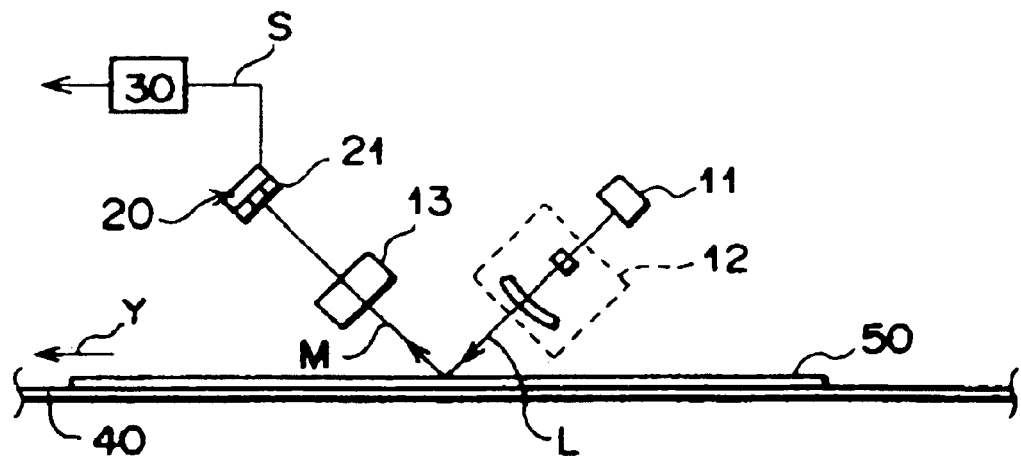
FIG. 45 is a side view showing the embodiment of FIG. 44.

FIG. 44 is a perspective view showing an embodiment of the seventeenth radiation image read-out apparatus in accordance with the present invention. FIG. 45 is a side view showing the embodiment of FIG. 44.

With reference to FIGS. 44 and 45, the radiation image read-out apparatus comprises the scanning belt 40 for supporting the sheet 50, on which a radiation image has been stored, and conveying the sheet 50 in the direction indicated by the arrow Y. The radiation image read-out apparatus also comprises a broad area semiconductor laser (hereinbelow referred to as the BLD) 11 for radiating out a linear laser beam L having a linear pattern with a limb width of approximately 100 μm and having wavelengths falling within the range of 600 nm to 700 nm (or 500 nm to 800 nm). The laser beam L is radiated out at an angle of approximately 45 degrees with respect to the front surface of the sheet 50. The radiation image read-out apparatus further comprises the optical system 12, which is constituted of a combination of a converging lens for converging the linear laser beam L having been radiated out of the BLD 11 and a toric lens for expanding the beam only in one direction. The radiation image read-out apparatus still further comprises a converging lens array (i.e., a lens comprising a plurality of arrayed converging lenses) 13 for converging the emitted light M emitted by the sheet 50 stimulated by the laser beam L coming from the optical system 12. The radiation image read-out apparatus also comprises the line sensor 20, which is constituted of a plurality of the arrayed photoelectric conversion devices 21, 21, . . . for receiving the emitted light M having been converged by the converging lens array 13.

The radiation image read-out apparatus further comprises the image information reading means 30. The image information reading means 30 reads outputs of the photoelectric conversion devices 21, 21, . . . constituting the line sensor 20 and feeds out an image signal, which is made up of the outputs, into an image processing unit, or the like.

The converging lens array 13 converges the light M, which is emitted from the linear area of the sheet 50 exposed to the laser beam L, onto each of the light receiving surfaces of the photoelectric conversion devices 21, 21, . . . constituting the line sensor 20. The converging lens array 13 has been subjected to coloring so as to have the characteristics of the stimulating ray cut-off filter for filtering out the laser beam L and transmitting only the emitted light M. Therefore, the converging lens array 13 attenuates and blocks the laser beam L, which has been reflected from the front surface of the sheet 50 and is mixed in the emitted light M.

Further, the converging lens array 13 constitutes an image forming optical system for forming an image (an erect equi-magnification image) of the emission area of the emitted light M on the sheet 50 in one-to-one size relationship on the light receiving surfaces of the photoelectric conversion devices 21, 21, . . . No optical part, or the like, is inserted between the sheet 50 and the converging lens array 13 as well as between the converging lens array 13 and the line sensor 20. Therefore, the angular aperture (the numerical aperture) of each converging lens constituting the converging lens array 13 may be set to be large, and the spacing between the sheet 50 and the converging lens array 13 and the spacing between the converging lens array 13 and the line sensor 20 may be kept small. In this manner, the optical system for forming an erect equi-magnification image on each photoelectric conversion device 21 with a high light collecting efficiency and high resolution can be formed easily.

Each of the photoelectric conversion devices 21, 21, . . . constituting the line sensor 20 has the light receiving surface having a size of approximately 100 μm×100 μm. Also, the magnification of the converging lens array 13 constituting the image forming optical system is equal to 1. Therefore, each photoelectric conversion device 21 receives the light emitted from the site having a size of approximately 100 μm×100 μm on the front surface of the sheet 50. As the photoelectric conversion devices 21, 21, . . . amorphous silicon sensors, CCD image sensors, MOS image sensors, or the like, may be employed.

How this embodiment of the seventeenth radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 30.

The BLD 11 radiates out the laser beam L having a linear pattern with a line width of approximately 100 μm. The laser beam L is radiated out at an angle of approximately 45 degrees with respect to the front surface of the sheet 50. The laser beam L is collected and expanded in one direction by the optical system 12, which is constituted of the converging lens and the toric lens and is located in the optical path of the laser beam L. In this manner, the linear laser beam L (having a line width of approximately 100 μm) extending along the direction indicated by the arrow X impinges upon the sheet 50.

The laser beam L impinging upon the sheet 50 is advantageous over the fluorescence produced by a fluorescent lamp and light radiated out from an LED array in that the directivity of the stimulating rays is high, the intensity of the stimulating rays is high, and therefore high stimulation energy can be imparted to the stimulable phosphor sheet. Accordingly, the laser beam L can sufficiently stimulate the stimulable phosphor at the exposed area (having a line width of approximately 100 $\mu$m). As a result, the light M of high intensity carrying the image information stored on the sheet 50 is emitted by the stimulable phosphor at the exposed area. The image of the emission area of the light M on the sheet 50 is formed on the light receiving surfaces of the photoelectric conversion devices 21, 21, . . . . At this time, the laser beam L, which has been reflected from the front surface of the sheet 50 and is mixed in the emitted light M, is filtered out by the converging lens array 13.

The converging lens array 13 has been subjected to coloring so as to have the characteristics of the stimulating ray cut-off filter for filtering out the laser beam L and transmitting only the emitted light M. The filter characteristics are such that the light having wavelengths longer than the wavelengths of the emitted light M is blocked as much as possible (e.g., attenuated to an intensity of $\frac{1}{10,000}$ to $\frac{1}{1,000,000}$), and light having short wavelengths is transmitted. For example, in cases where the converging lens array 13 is formed from a glass material, the coloring may be performed by adding a pigment and forming a mixed crystal. In cases where the converging lens array 13 is formed from a plastic material, the coloring may be performed by adding a dye, or the like. In this manner, the characteristics equivalent to those described above can be obtained.

The emitted light M having converged by the converging lens array 13 onto the photoelectric conversion devices 21, 21, . . . is photoelectrically converted into signal components Q, Q, . . . . The signal components Q, Q, . . . are fed as an image signal S into the image information reading means 30 and fed out into the image processing unit, or the like, such that it may be clear which signal component Q corresponds to which site on the sheet 50.

As described above, with this embodiment of the seventeenth radiation image read-out apparatus in accordance with the present invention, the light guiding optical system having the filter characteristics for transmitting only the emitted light and blocking the stimulating rays is located between the sheet 50 and the line sensor 20. Therefore, it is not necessary for a particular stimulating ray cut-off filter to be inserted in the light guiding optical system, and the converging lens array 13 can be located at a position close to the emission area of the sheet 50. Accordingly, a converging lens array having a large angular aperture (a large numerical aperture) can be employed. As a result, the intensity and the position of the light emitted from the exposed area of the sheet can be detected with a high light collecting efficiency and high resolution, and an image having high sharpness can be obtained from the thus detected image signal.

As the converging lens array 13, it is possible to employ a distributed index lens array having a refractive index distribution in the radial direction, a flat-plate microlens array utilizing three flat-plate lenses having a refractive index distribution in the axial direction, a spherical lens array constituted by combining a plurality of spherical lenses, or the like.

A different embodiment of the seventeenth radiation image read-out apparatus in accordance with the present invention will be described hereinbelow.

Figure 46:
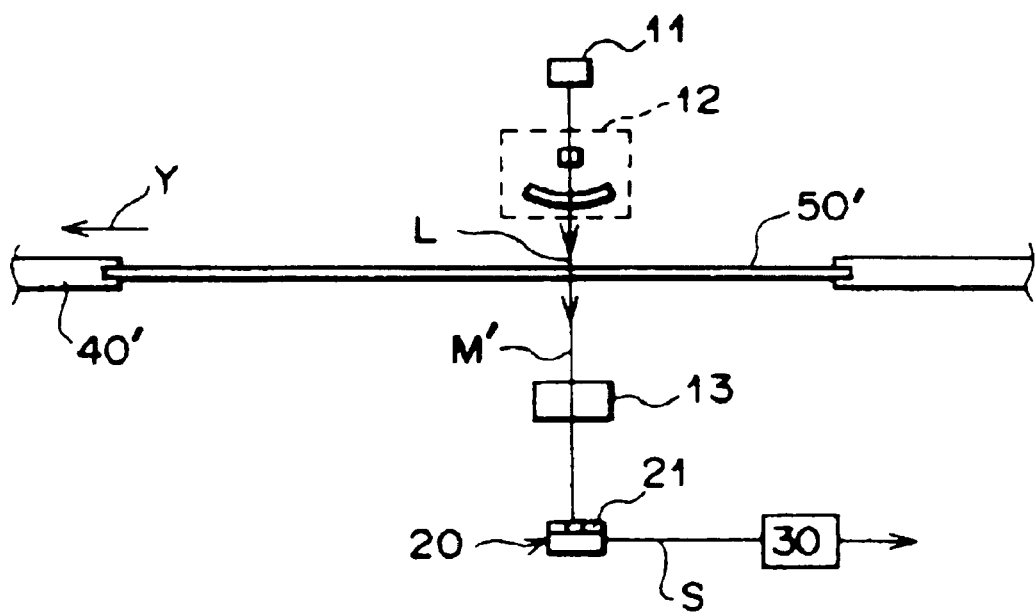
FIG. 46 is a side view showing a different embodiment of the seventeenth radiation image read-out apparatus in accordance with the present invention.

FIG. 46 is a side view showing the different embodiment of the seventeenth radiation image read-out apparatus in accordance with the present invention. In this embodiment, a stimulable phosphor sheet 50' whose substrate is formed from a material permeable to the emitted light M is employed. The stimulating rays are irradiated onto the front surface of the sheet 50', and the emitted light is detected from the back surface of the sheet 50'.

Specifically, the radiation image read-out apparatus illustrated in FIG. 9 comprises the conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50') The radiation image read-out apparatus also comprises the BLD 11 for radiating out the linear laser beam L along the direction approximately normal to the front surface of the sheet 50'. The radiation image read-out apparatus further comprises the optical system 12, which is constituted of a combination of a converging lens for converging the linear-laser beam L having been radiated out of the BLD 11 and a toric lens for expanding the beam only in one direction, and which causes the linear laser beam L to impinge upon the front surface of the sheet 50'. The radiation image read-out apparatus still further comprises the converging lens array 13 having an optical axis, which is approximately normal to the front surface of the sheet 50'. The converging lens array 13 converges the light M', which is emitted from the back surface of the sheet 50' when the sheet 50' is exposed to the laser beam L, onto the light receiving surfaces of the photoelectric conversion devices 21, 21, . . . constituting the line sensor 20. The radiation image read-out apparatus also comprises the line sensor 20, which is constituted of the plurality of the photoelectric conversion devices 21, 21, . . . for receiving the emitted light M' having been converged by the converging lens array 13 and for photoelectrically converting the emitted light M'. The radiation image read-out apparatus further comprises the image information reading means 30. The image information reading means 30 receives the signal components Q, Q, . . . from the photoelectric conversion devices 21, 21, . . . constituting the line sensor 20 and feeds them into the image processing unit, or the like, such that it may be clear which signal component Q corresponds to which site on the sheet 50'. The other constitutions and the operation are the same as in the aforesaid embodiment of the seventeenth radiation image read-out apparatus in accordance with the present invention.

As in the embodiment described above, the converging lens array 13 comprises a plurality of arrayed image forming lenses for forming an image (an erect equi-magnification image) of the emission area of the emitted light M on the sheet 50 in one-to-one size relationship on the light receiving surfaces of the photoelectric conversion devices 21, 21, . . . . Also, the converging lens array 13 has the characteristics of a stimulating ray cut-off filter for filtering out the laser beam L serving as the stimulating rays and transmitting only the emitted light M'.

With the constitution of FIG. 46, the light guiding optical system for forming the image of the emission area of the emitted light M' can be located such that the optical axis may be normal to the surface of the sheet 50'. Therefore, the converging lens array 13 can be located at a position closer to the sheet 50', and the angular aperture (the numerical aperture) can be set to be large. As a result, the intensity and the position of the light emitted from the exposed area of the sheet can be detected with a light collecting efficiency and resolution enhanced even further, and an image having high sharpness can be obtained from the thus detected image signal.

A further different embodiment of the seventeenth radiation image read-out apparatus in accordance with the present invention will be described hereinbelow.

Figure 47:
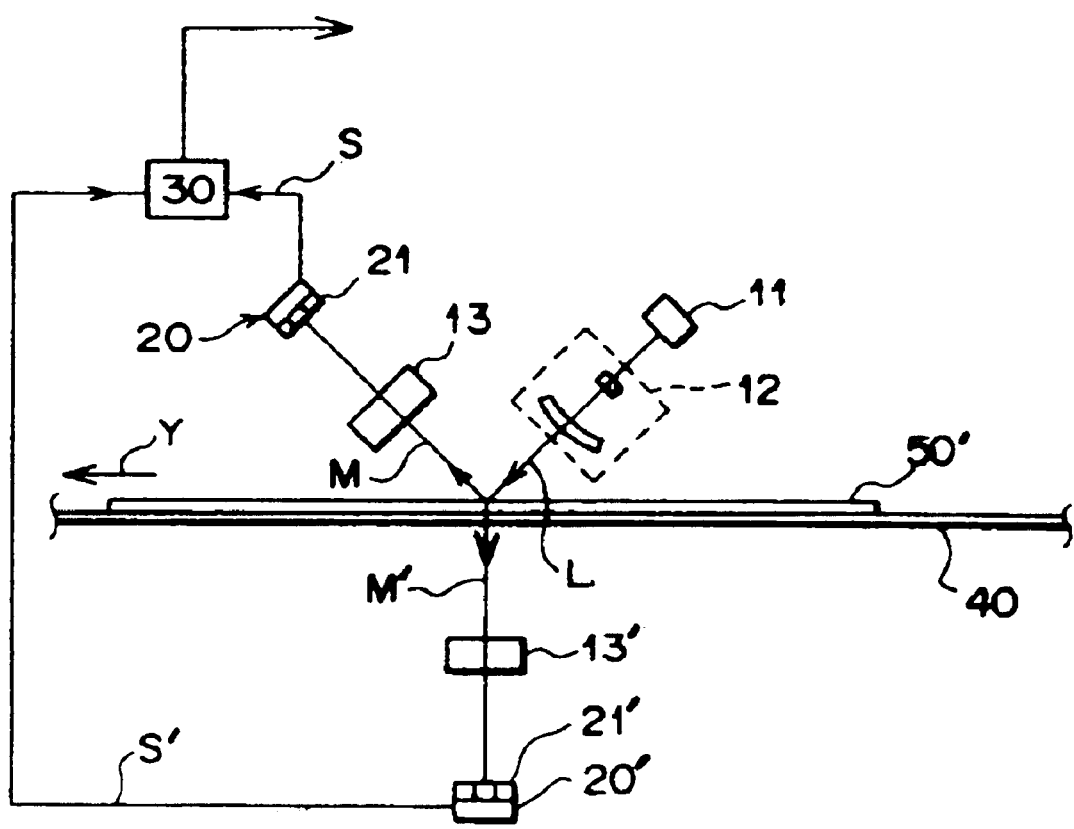
FIG. 47 is a side view showing a further different embodiment of the seventeenth radiation image read-out apparatus in accordance with the present invention.

FIG. 47 is a side view showing the further different embodiment of the seventeenth radiation image read-out apparatus in accordance with the present invention. In this embodiment, the two embodiments of the seventeenth radiation image read-out apparatus in accordance with the present invention are combined with each other. In this embodiment, a stimulable phosphor sheet 50' is employed, which emits light from the front and back surfaces when the stimulating rays are irradiated to one surface side. The emitted light M and the emitted light M' are detected respectively from the front and back surfaces of the sheet 50'.

Specifically, when the linear laser beam L is irradiated from the BLD 11 at an angle of approximately 45 degrees with respect to the front surface of the sheet 50', the light M and the light M' are emitted respectively from the front and back surfaces of the sheet 50'. The emitted light M is detected by the photoelectric conversion devices 21, 21, ... of the line sensor 20 located on the front surface side of the sheet 50' and is converted into signal components Q, Q, .... The emitted light M' is detected by the photoelectric conversion devices 21', 21', ... of the line sensor 20' located on the back surface side of the sheet 50' and is converted into signal components Q', Q', .... The signal components Q, Q, ... and the signal components Q', Q', ... are fed into the image information reading means 30. The image information reading means 30 carries out signal processing in order to clarify which signal component Q corresponds to which site on the front surface of the sheet 50' and to clarify which signal component Q' corresponds to which site on the back surface of the sheet 50'. Also, the image information reading means 30 performs addition processing on signal components Q and Q', which correspond to the light emitted from an identical site on the sheet 50' to the front surface side and the back surface side. The image signal obtained from the addition processing is fed into the image processing unit, or the like. The other constitutions and the operation are the same as those in the aforesaid two embodiments of the seventeenth radiation image read-out apparatus in accordance with the present invention.

With the embodiment of the seventeenth radiation image read-out apparatus in accordance with the present invention, wherein the emitted light is detected from both the front and back surfaces of the sheet 50', the light collecting efficiency can be enhanced even further.

The seventeenth radiation image read-out apparatus in accordance with the present invention is not limited to the embodiments described above and may be embodied in various other ways. For example, various known constitutions may be employed as the line light source, the line sensor, or the operation means. Also, the radiation image read-out apparatus may further comprise an image processing unit, which performs various kinds of signal processing on the image signal obtained from the image information reading means, and/or erasing means for appropriately releasing radiation energy remaining on the sheet from which the image signal has been detected.

Also, in the embodiments of the seventeenth radiation image read-out apparatus in accordance with the present invention, the plurality of the photoelectric conversion devices of the line sensor 20 or 20' and the lenses constituting the converging lens array 13 may be arrayed in a matrix-like pattern such that they may stand in a straight line along each of the major axis direction and the minor axis direction. Alternatively, the photoelectric conversion devices and the lenses may be arrayed such that they may stand in a straight line along the major axis direction and in a zigzag pattern along the minor axis direction. As another alternative, the photoelectric conversion devices and the lenses may be arrayed such that they may stand in a straight line along the major axis and may be arrayed obliquely with respect to the minor axis direction.

As described above, with the embodiments of the seventeenth radiation image read-out apparatus in accordance with the present invention, the intensity and the position of the light emitted from the exposed area of the sheet can be detected with a high light collecting efficiency and high resolution, and an image having high sharpness can be obtained from the thus detected image signal.

Figure 48:
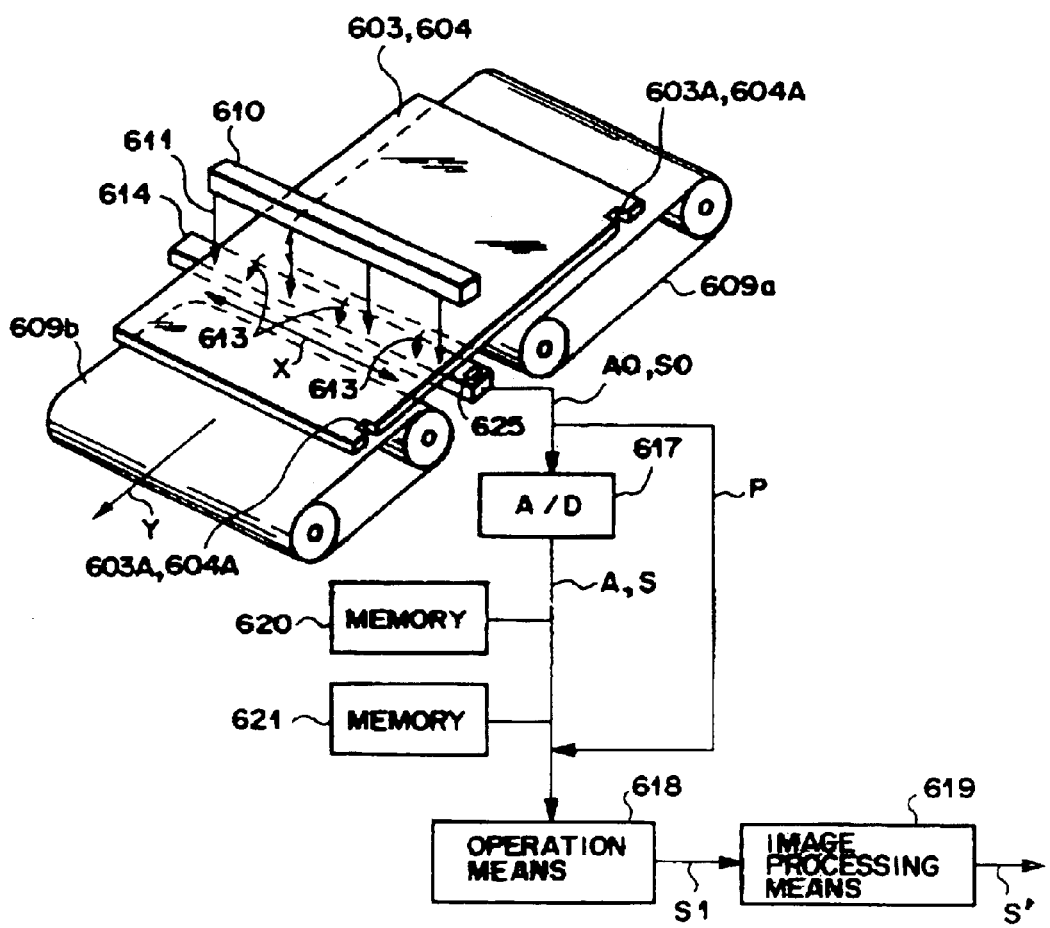
FIG. 48 is a perspective view showing a different embodiment of the radiation image read-out apparatus in accordance with the present invention.

FIG. 48 is a perspective view showing a different embodiment of the radiation image read-out apparatus in accordance with the present invention. The embodiment of FIG. 48 is provided with endless belts 609*a* and 609*b,* which are rotated by motors (not shown) and convey a reference image storage sheet 603 or a stimulable phosphor sheet 604 in the direction indicated by the arrow Y. An array light source 610, which comprises LED' arrayed linearly so as to radiate out linear stimulating rays 611, is located above the endless belts 609*a* and 609*b.* In this embodiment, as an aid in facilitating the explanation, the array light source 610 is located at the position spaced apart from the stimulable phosphor sheet 604. However, the array light source 610 and the stimulable phosphor sheet 604 should preferably be located close to each other. A line sensor 614 for receiving emitted light 613 from below is located under the position that is scanned with the linear stimulating rays 611. The line sensor 614 extends in the direction normal to the direction of conveyance of the reference image storage sheet 603 and the stimulable phosphor sheet 604. The line sensor 614 is connected to an analog-to-digital converter 617. The analog-to-digital converter 617 is connected to operation means 618, and the operation means 618 is connected to image processing means 619. The radiation image read-out apparatus also comprises a first memory 620, which stores a reference image signal A detected from the reference image storage sheet 603 constituted of a stimulable phosphor sheet having been uniformly exposed to radiation in the manner described later, and a second memory 621 for storing an image signal S detected from the stimulable phosphor sheet 604, on which a radiation image has been stored.

The line sensor 614 comprises linearly arrayed solid-state photoelectric conversion devices, such as photoconductors or photodiodes. The signal component obtained from photoelectric conversion of the emitted light performed by each device represents one pixel. The light receiving surface of the line sensor 614 is provided with a filter for filtering out the linear stimulating rays 611 and transmitting only the emitted light.

As illustrated in FIG. 48, the stimulable phosphor sheet 604 has two cut-away portions 604A, 604A, and the reference image storage sheet 603 has two cut-away portions 603A, 603A. The positions of the cut-away portions 604A, 604A and the cut-away portions 603A, 603A are detected by a position sensor 625 provided on the line sensor 614. As will be described later, the positions of the cut-away portions 604A, 604A and the cut-away portions 603A, 603A detected by the position sensor 625 are taken as reference positions in shading compensation.

How this embodiment operations will be described hereinbelow.

Firstly, the reference image storage sheet 603 constituted of a stimulable phosphor sheet having been uniformly exposed to radiation is set on the endless belts 609a and 609b. The reference image storage sheet 603 having been set at the predetermined position is conveyed by the endless belts 609a and 609b in the direction (sub-scanning direction) indicated by the arrow Y. Also, the linear stimulating rays 611 radiated out from the array light source 610 impinges upon the reference image storage sheet 603 along the direction indicated by the arrow X, which is approximately normal to the sub-scanning direction (indicated by the arrow Y). When the reference image storage sheet 603 is exposed to the linear stimulating rays 611, the exposed area emits light 613 carrying the stored image information. The emitted light 613 is received by the line sensor 614, and the intensity of the emitted light 613 carrying the stored image information is converted by the solid-stage photoelectric conversion devices, which constitute the line sensor 614, into an analog reference image signal A0. Further, the cut-away portions 603A, 603A of the reference image storage sheet 603 are detected by the position sensor 625. The thus obtained position signal P is fed into the operation means 618.

The analog reference image signal A0, which has been obtained from the line sensor 614, is fed into the analog-to-digital converter 617 and converted into a digital reference image signal A. The reference image signal A is stored in the first memory 620. The reference image signal A has the signal wave form (the shading wave form) with an intensity distribution shown in FIG. 49 due to nonuniformity in irradiation of radiation to the stimulable phosphor sheet (two-dimensional nonuniformity), nonuniformity in sensitivity of the stimulable phosphor sheet (two-dimensional nonuniformity), nonuniformity in irradiation of the linear stimulating rays 611 (one-dimensional nonuniformity), nonuniformity in efficiency of impingement of the emitted light 613 upon the line sensor 614 (one-dimensional nonuniformity), nonuniformity in sensitivity of the line sensor 614 (one-dimensional nonuniformity), and the like. In FIG. 49, as an aid in facilitating the explanation, the shading wave form is illustrated in two-dimensional pattern. Actually, the shading wave form is in three-dimensional pattern on the surface of the reference image storage sheet 603.

Thereafter, in the same manner as that described above, the stimulable phosphor sheet 604, on which a radiation image has been stored, is set on the endless belts 609a and 609b and scanned with the linear stimulating rays 611, and the radiation image is thereby read out. In the same manner as that in the reference image storage sheet 603, the light 613, which is emitted by the stimulable phosphor sheet 604 scanned with the linear stimulating rays 611, is detected by the line sensor 614 and converted into an analog image signal S0. The analog image signal S0 is fed into the analog-to-digital converter 617 and converted into a digital image signal S. The digital image signal S is stored on the second memory 621. The image signal S has a wave form resulting from superposition of the image signal, which is to be obtained during the scanning of the stimulable phosphor sheet 604, upon the wave form of the reference image signal A shown in FIG. 49.

Thereafter, the reference image signal A stored on the first memory 620 and the image signal S stored on the second memory 621 are fed into the operation means 618. The operation means 618 performs the operation on signal components of the reference image signal A and the image signal S, which signal components represent corresponding pixels on the reference image storage sheet 603 and the stimulable phosphor sheet 604. The operation is performed with Formula (2) shown below. In this manner, a corrected signal S1 is obtained from the shading compensation.

$$S1(x, y)=S(x, y)/A(x, y) \quad (2)$$

in which (x, y) represents the coordinates of the pixel.

The position signal P, which represents the positions of the cut-away portions 603A, 603A of the reference image storage sheet 603 and the cut-away portions 604A, 604A of the stimulable phosphor sheet 604, has been fed into the operation means 618. Position matching is performed on the reference image signal A and the image signal S by taking the position signal P as reference, and the operation with Formula (2) shown above is carried out.

The corrected signal S1 is fed into the image processing means 619. In the image processing means 619, image processing is performed on the corrected signal S1, and a processed image signal S' is obtained. The processed image signal S' is fed into image reproducing means (not shown) and utilized for reproducing a visible image. Alternatively, the processed image signal S' is stored on storage means (not shown). The image reproduced from the processed image signal S' is free from image density nonuniformity due to nonuniformity in irradiation of radiation, nonuniformity in sensitivity of the stimulable phosphor sheet, nonuniformity in irradiation of the linear stimulating rays 611, nonuniformity in efficiency of impingement of the emitted light 613 upon the line sensor 614, nonuniformity in sensitivity of the line sensor 614, and the like. Therefore, the image has good image quality and can serve as an effective tool in, particularly, the efficient and accurate diagnosis of an illness.

In this embodiment, the image signal S is obtained by reading out the radiation image stored on the stimulable phosphor sheet 604 and is stored on the second memory 621. Thereafter, shading compensation is performed by the operation means 618. Alternatively, while the radiation image is being read out from the stimulable phosphor sheet 604, the operation with Formula (2) shown above may be performed on the real time basis on the signal components of the image signal S that is being obtained and of the reference image signal A, which signal components represent corresponding pixels on the stimulable phosphor sheet 604 and the reference image storage sheet 603. In such cases, the operation with Formula (2) shown above may be performed for each pixel or for one scanning line. In cases where the corrected signal S1 is obtained in this manner, the second memory 621 becomes unnecessary, and the apparatus constitution can be kept simple. Also, since it is unnecessary for the image signal S to be stored on the second memory 621, the corrected signal S1 can be obtained quickly.

In this embodiment, the radiation image stored on the stimulable phosphor sheet is read out. However, this embodiment is also applicable when a radiation image recorded on X-ray film is read out and when other kinds of images are read out.

Also, in this embodiment, the linear stimulating rays 611 produced by the array light source 610 is irradiated to the reference image storage sheet 603 and the stimulable phosphor sheet 604. Alternatively, one of other kinds of light sources may be employed. For example, the linear stimulating rays may be formed by a combination of a divergent light source and a slit.

Further, in this embodiment, the position matching of pixels represented by the reference image signal A and the image signal S is performed by utilizing the cut-away portions 603A, 603A of the reference image storage sheet 603 and the cut-away portions 604A, 604A of the stimulable phosphor sheet 604. Alternatively, in lieu of the cut-away portions 603A, 603A and the cut-away portions 604A, 604A, the reference image storage sheet 603 and the stimulable phosphor sheet 604 may be provided with holes, optical markers, or the like, and the position matching of the reference image signal A and the image signal S may thereby be effected.

What is claimed is:

1. A radiation image read-out method, comprising the steps of:
    i) linearly irradiating stimulating rays, which have been produced by a line light source, onto an area of a front surface of a stimulable phosphor sheet, on which a radiation image has been stored, the stimulating rays causing the stimulable phosphor sheet to emit light in proportion to an amount of energy stored thereon during its exposure to radiation,
    ii) receiving light, which is emitted from the linear area of the front surface of the stimulable phosphor sheet exposed to the linear stimulating rays, with a line sensor comprising a plurality of photoelectric conversion devices arrayed along a length direction of said linear area of the stimulable phosphor sheet, the received light being subjected to photoelectric conversion performed by said line sensor,
    iii) moving the stimulable phosphor sheet with respect to said line light source and said line sensor and in a direction different from a length direction of said linear area of the stimulable phosphor sheet, and
    iv) successively reading outputs of said photoelectric conversion devices of said line sensor in accordance with said movement, wherein said line light source is constituted of an organic EL device.

2. The method of claim 1, further comprising the step of monitoring an intensity of the stimulating rays emitted from the organic EL device.

3. The method of claim 2, further comprising the step of modulating the emission intensity of the organic EL device in accordance with a result of the monitoring step.

4. The method of claim 3, wherein the modulating step is performed such that the emission intensity of the organic EL device becomes equal to a predetermined value.

5. The method of claim 1, further comprising reflecting the stimulating rays toward a surface of the stimulable phosphor sheet with a mirror, and wherein light emitted from the stimulable phosphor sheet is transmitted through the mirror to provide optical path overlap between emitted light and light output from the light source.

6. The method of claim 1, wherein the stimulable phosphor sheet is permeable to the emitted light and the emitted light is received from the front surface of the the stimulable phosphor sheet and a back surface of the stimulable phosphor sheet.

7. The method of claim 1, wherein the organic EL device comprises a white light emitting device and a red color filter.

8. The method of claim 1, wherein the organic EL device produces stimulating light rays having a line width of approximately 100 micrometers.

9. A radiation image read-out method, comprising the steps of:
    i) irradiating stimulating rays, which have been produced by a surface light source, onto a front surface of a stimulable phosphor sheet, on which a radiation image has been stored, the stimulating rays causing the stimulable phosphor sheet to emit light in proportion to an amount of energy stored thereon during its exposure to radiation,
    ii) receiving light, which is emitted from the area of the front surface of the stimulable phosphor sheet exposed to the stimulating rays, with an area sensor comprising a plurality of arrayed photoelectric conversion devices, the received light being subjected to photoelectric conversion performed by said area sensor, and
    iii) reading outputs of said photoelectric conversion devices constituting said area sensor,
    wherein said surface light source is constituted of an organic EL device.

10. The method of claim 9, further comprising the step of monitoring an intensity of the stimulating rays emitted from the organic EL device.

11. The method of claim 10, further comprising the step of modulating the emission intensity of the organic EL device in accordance with a result of the monitoring step.

12. The method of claim 11, wherein the modulating step is performed such that the emission intensity of the organic EL device becomes equal to a predetermined value.

13. The method of claim 9, further comprising reflecting the stimulating rays toward a surface of the stimulable phosphor sheet with a mirror, and wherein light emitted from the stimulable phosphor sheet is transmitted through the mirror to provide optical path overlap between emitted light and light output from the light source.

14. The method of claim 9, wherein the stimulable phosphor sheet is permeable to the emitted light and the emitted light is received from the front surface of the the stimulable phosphor sheet and a back surface of the stimulable phosphor sheet.

15. The method of claim 9, wherein the organic EL device comprises a white light emitting device and a red color filter.

16. The method of claim 9, wherein the organic EL device produces stimulating light rays having a line width of approximately 100 micrometers.

17. A radiation image read-out apparatus, comprising:
    i) a line light source for linearly irradiating stimulating rays onto an area of a front surface of a stimulable phosphor sheet, on which a radiation image has been stored, the stimulating rays causing the stimulable phosphor sheet to emit light in proportion to an amount of energy stored thereon during its exposure to radiation,
    ii) a line sensor for receiving light, which is emitted from the linear area of the front surface of the stimulable phosphor sheet exposed to the linear stimulating rays, and performing photoelectric conversion of the received light, said line sensor comprising a plurality of photoelectric conversion devices arrayed along a length direction of said linear area of the stimulable phosphor sheet,
    iii) scanning means for moving the stimulable phosphor sheet with respect to said line light source and said line sensor and in a direction different from a length direction of said linear area of the stimulable phosphor sheet, and
    iv) reading means for successively reading outputs of said photoelectric conversion devices of said line sensor in accordance with said movement,
    wherein said line light source is constituted of an organic EL device.

18. The apparatus of claim 17, further comprising a monitoring means for monitoring an intensity of the stimulating rays emitted from the organic EL device.

19. The apparatus of claim 18, further comprising a modulating means for modulating the emission intensity of the organic EL device in accordance with the monitored intensity.

20. The apparatus of claim 19, wherein the emission intensity of the organic EL device is modulated to be equal to a predetermined value.

21. The apparatus of claim 17, further comprising a mirror disposed to direct light from the line light source to a surface of the stimulable phosphor sheet, said mirror transmitting light emitted from the stimulable phosphor sheet, said mirror causing at least partial optical path overlap of the emitted light and light from the light source.

22. The apparatus of claim 17, wherein the stimulable phosphor sheet is permeable to the emitted light and the emitted light is received from the front surface of the the stimulable phosphor sheet and a back surface of the stimulable phosphor sheet.

23. The apparatus of claim 17, wherein the organic EL device comprises a white light emitting device and a red color filter.

24. The apparatus of claim 17, wherein the organic EL device produces stimulating light rays having a line width of approximately 100 micrometers.

25. A radiation image read-out apparatus, comprising:
 i) a surface light source for irradiating stimulating rays onto a front surface of a stimulable phosphor sheet, on which a radiation image has been stored, the stimulating rays causing the stimulable phosphor sheet to emit light in proportion to an amount of energy stored thereon during its exposure to radiation,
 ii) an area sensor for receiving light, which is emitted from the area of the front surface of the stimulable phosphor sheet exposed to the stimulating rays, and performing photoelectric conversion of the received light, said area sensor comprising a plurality of arrayed photoelectric conversion devices, and
 iii) reading means for reading outputs of said photoelectric conversion devices constituting said area sensor,
 wherein said surface light source is constituted of an organic EL device.

26. The apparatus of claim 25, further comprising a monitoring means for monitoring an intensity of the stimulating rays emitted from the organic EL device.

27. The apparatus of claim 26, further comprising a modulating means for modulating the emission intensity of the organic EL device in accordance with the monitored intensity.

28. The apparatus of claim 27, wherein the emission intensity of the organic EL device is modulated to be equal to a predetermined value.

29. The apparatus of claim 25, further comprising a mirror disposed to direct light from the surface light source to a surface of the stimulable phosphor sheet, said mirror transmitting light emitted from the stimulable phosphor sheet, said mirror causing at least partial optical path overlap of the emitted light and light from the light source.

30. The apparatus of claim 25, wherein the stimulable phosphor sheet is permeable to the emitted light and the emitted light is received from the front surface of the the stimulable phosphor sheet and a back surface of the stimulable phosphor sheet.

31. The apparatus of claim 25, wherein the organic EL device comprises a white light emitting device and a red color filter.

32. The apparatus of claim 25, wherein the organic EL device produces stimulating light rays having a line width of approximately 100 micrometers.

* * * * *